United States Patent
Visser et al.

(10) Patent No.: US 10,540,979 B2
(45) Date of Patent: Jan. 21, 2020

(54) USER INTERFACE FOR SECURE ACCESS TO A DEVICE USING SPEAKER VERIFICATION

(71) Applicant: QUALCOMM Incorporated, San Diego, CA (US)

(72) Inventors: Erik Visser, San Diego, CA (US); Lae-Hoon Kim, San Diego, CA (US); Minho Jin, Seoul (KR); Yinyi Guo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 272 days.

(21) Appl. No.: 14/688,974

(22) Filed: Apr. 16, 2015

(65) Prior Publication Data
US 2015/0301796 A1    Oct. 22, 2015

Related U.S. Application Data

(60) Provisional application No. 61/981,030, filed on Apr. 17, 2014, provisional application No. 61/981,018, filed on Apr. 17, 2014.

(51) Int. Cl.
*G10L 17/22* (2013.01)
*G06F 3/16* (2006.01)
*G10L 15/22* (2006.01)

(52) U.S. Cl.
CPC ............. *G10L 17/22* (2013.01); *G06F 3/167* (2013.01); *G10L 15/22* (2013.01)

(58) Field of Classification Search
CPC ......... G10L 15/22; G10L 17/04; G10L 17/08; G10L 17/22; G06F 3/167
See application file for complete search history.

(56) References Cited

U.S. PATENT DOCUMENTS

| | | | | |
|---|---|---|---|---|
| 6,006,183 | A * | 12/1999 | Lai .......................... | G10L 15/22 704/235 |
| 6,539,352 | B1 * | 3/2003 | Sharma .................. | G10L 15/04 704/249 |

(Continued)

FOREIGN PATENT DOCUMENTS

| EP | 0924687 A2 * | 6/1999 | ............. G10L 15/22 |
|---|---|---|---|
| EP | 0924687 A2 | 6/1999 | |

(Continued)

OTHER PUBLICATIONS

Akula, A., et al., "Speaker Identification in Room Reverberation Using GMM-UBM," Digital Signal Processing Workshop and 5th IEEE Signal Processing Education Workshop, Jan. 2009, IEEE, Piscataway, NJ, pp. 37-41.

(Continued)

*Primary Examiner* — Justin R. Blaufeld
(74) *Attorney, Agent, or Firm* — Toler Law Group

(57) ABSTRACT

A device includes a memory, a receiver, a processor, and a display. The memory is configured to store a speaker model. The receiver is configured to receive an input audio signal. The processor is configured to determine a first confidence level associated with a first portion of the input audio signal based on the speaker model. The processor is also configured to determine a second confidence level associated with a second portion of the input audio signal based on the speaker model. The display is configured to present a graphical user interface associated with the first confidence level or associated with the second confidence level.

16 Claims, 42 Drawing Sheets

(56) References Cited

U.S. PATENT DOCUMENTS

| | | | |
|---|---|---|---|
| 6,804,647 B1 | 10/2004 | Heck et al. | |
| 7,039,951 B1* | 5/2006 | Chaudhari | G10L 17/06 340/5.84 |
| 7,865,362 B2* | 1/2011 | Braho | G10L 15/08 704/251 |
| 8,438,023 B1* | 5/2013 | Hamilton | G10L 15/22 704/231 |
| 8,620,672 B2 | 12/2013 | Visser et al. | |
| 8,694,315 B1 | 4/2014 | Sheets et al. | |
| 2003/0125945 A1* | 7/2003 | Doyle | G10L 15/01 704/246 |
| 2003/0177008 A1* | 9/2003 | Chang | G10L 17/26 704/255 |
| 2004/0122669 A1 | 6/2004 | Aronowitz | |
| 2004/0162726 A1* | 8/2004 | Chang | G10L 17/22 704/247 |
| 2004/0186724 A1* | 9/2004 | Morin | G10L 17/06 704/273 |
| 2006/0200347 A1* | 9/2006 | Kim | G10L 15/22 704/236 |
| 2006/0206724 A1* | 9/2006 | Schaufele | G06F 21/32 713/186 |
| 2007/0192095 A1* | 8/2007 | Braho | G10L 15/01 704/232 |
| 2009/0119103 A1* | 5/2009 | Gerl | G10L 17/04 704/243 |
| 2009/0220065 A1* | 9/2009 | Ahuja | H04M 3/569 379/202.01 |
| 2009/0326943 A1 | 12/2009 | Abe | |
| 2010/0020951 A1* | 1/2010 | Basart | H04M 15/06 379/142.01 |
| 2010/0217590 A1* | 8/2010 | Nemer | G01S 3/8006 704/233 |
| 2012/0143608 A1* | 6/2012 | Kaufman | G10L 17/04 704/246 |
| 2012/0284026 A1* | 11/2012 | Cardillo | G10L 17/08 704/246 |
| 2013/0138439 A1* | 5/2013 | Marcus | G10L 15/22 704/240 |
| 2013/0275077 A1 | 10/2013 | Kim et al. | |
| 2013/0275872 A1 | 10/2013 | Kim et al. | |
| 2013/0275873 A1 | 10/2013 | Shaw et al. | |
| 2013/0304478 A1 | 11/2013 | Sun et al. | |
| 2013/0332165 A1 | 12/2013 | Beckley et al. | |
| 2014/0254778 A1* | 9/2014 | Zeppenfeld | H04M 3/523 379/88.02 |
| 2014/0270226 A1* | 9/2014 | Borgstrom | G10L 17/00 381/71.11 |
| 2014/0278389 A1* | 9/2014 | Zurek | G10L 15/20 704/231 |
| 2014/0278415 A1* | 9/2014 | Ivanov | G10L 15/063 704/246 |
| 2014/0278443 A1* | 9/2014 | Gunn | G06F 3/0488 704/275 |
| 2014/0337021 A1 | 11/2014 | Kim et al. | |
| 2014/0379340 A1* | 12/2014 | Timem | G06F 21/32 704/246 |
| 2015/0006568 A1* | 1/2015 | Brunn | H04L 65/1069 707/769 |
| 2015/0032451 A1* | 1/2015 | Gunn | G10L 15/063 704/244 |
| 2015/0081295 A1 | 3/2015 | Yun et al. | |
| 2015/0088509 A1* | 3/2015 | Gimenez | G10L 17/22 704/243 |
| 2015/0120294 A1* | 4/2015 | Gardner | G10L 15/26 704/235 |
| 2015/0206529 A1* | 7/2015 | Kwon | G10L 17/22 704/246 |
| 2015/0269946 A1* | 9/2015 | Jones | G10L 17/22 704/273 |
| 2015/0287414 A1* | 10/2015 | Tsujikawa | G10L 17/22 704/275 |
| 2016/0035350 A1* | 2/2016 | Jung | G06F 3/167 704/275 |

FOREIGN PATENT DOCUMENTS

| | | |
|---|---|---|
| EP | 2048656 A1 | 4/2009 |
| WO | 2013184821 A1 | 12/2013 |
| WO | 2014013513 A1 | 1/2014 |
| WO | 2015038435 | 3/2015 |

OTHER PUBLICATIONS

Dehak N., et al., "Front-End Factor Analysis for Speaker Verification", IEEE Transactions on Audio, Speech, and Language Processing, 2011, vol. 19, No. 4, IEEE, Piscataway, NJ, pp. 788-798.

International Search Report and Written Opinion for International Application No. PCT/US2015/026453, ISA/EPO, dated Oct. 26, 2015, 12 pages.

Partial International Search Report for International Application No. PCT/US2015/026453, ISA/EPO, dated Jul. 29, 2015, 6 pages.

Peer, I., et al., "Reverberation Matching for Speaker Recognition," IEEE International Conference on Acoustics, Speech and Signal Processing, 2008. IEEE, Piscataway, NJ, pp. 4829-4832.

* cited by examiner

USER INTERFACE FOR SECURE ACCESS TO A DEVICE USING SPEAKER VERIFICATION

I. CROSS REFERENCE TO RELATED APPLICATIONS

The present application claims priority to and the benefit of U.S. Provisional Patent Application No. 61/981,030, filed on Apr. 17, 2014, and U.S. Provisional Patent Application No. 61/981,018, filed on Apr. 17, 2014, the content of each of which is expressly incorporated herein by reference in its entirety.

II. FIELD

The present disclosure is generally related to speaker verification.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Further, many such wireless telephones include other types of devices that are incorporated therein. For example, a wireless telephone can also include a microphone, a speaker, a digital still camera, a digital video camera, a digital recorder, and an audio file player.

Transmission of voice by digital techniques is widespread, particularly in long distance and digital radio telephone applications. If speech is transmitted subsequent to sampling and digitizing, a data rate on the order of sixty-four kilobits per second (kbps) may be used to achieve a speech quality of an analog telephone. Compression techniques may be used to reduce the amount of information that is sent over a channel while maintaining a perceived quality of reconstructed speech. Through the use of speech analysis, followed by coding, transmission, and re-synthesis at a receiver, a significant reduction in the data rate may be achieved.

Devices for compressing speech may find use in many fields of telecommunications. An exemplary field is wireless communications. The field of wireless communications has many applications including, e.g., cordless telephones, paging, wireless local loops, wireless telephony such as cellular and personal communication service (PCS) telephone systems, mobile Internet Protocol (IP) telephony, and satellite communication systems. A particular application is wireless telephony for mobile subscribers.

Various over-the-air interfaces have been developed for wireless communication systems including, e.g., frequency division multiple access (FDMA), time division multiple access (TDMA), code division multiple access (CDMA), and time division-synchronous CDMA (TD-SCDMA). In connection therewith, various domestic and international standards have been established including, e.g., Advanced Mobile Phone Service (AMPS), Global System for Mobile Communications (GSM), and Interim Standard 95 (IS-95). An exemplary wireless telephony communication system is a code division multiple access (CDMA) system. The IS-95 standard and its derivatives, IS-95A, ANSI J-STD-008, and IS-95B (referred to collectively herein as IS-95), are promulgated by the Telecommunication Industry Association (TIA) and other well-known standards bodies to specify the use of a CDMA over-the-air interface for cellular or PCS telephony communication systems.

The IS-95 standard subsequently evolved into "3G" systems, such as cdma2000 and WCDMA, which provide more capacity and high speed packet data services. Two variations of cdma2000 are presented by the documents IS-2000 (cdma2000 1xRTT) and IS-956 (cdma2000 1xEV-DO), which are issued by TIA. The cdma2000 1xRTT communication system offers a peak data rate of 153 kbps whereas the cdma2000 1xEV-DO communication system defines a set of data rates, ranging from 38.4 kbps to 2.4 Mbps. The WCDMA standard is embodied in 3rd Generation Partnership Project "3GPP", Document Nos. 3G TS 25.211, 3G TS 25.212, 3G TS 25.213, and 3G TS 25.214. The International Mobile Telecommunications Advanced (IMT-Advanced) specification sets out "4G" standards. The IMT-Advanced specification sets a peak data rate for 4G service at 100 megabits per second (Mbit/s) for high mobility communication (e.g., from trains and cars) and 1 gigabit per second (Gbit/s) for low mobility communication (e.g., from pedestrians and stationary users).

Devices that employ techniques to compress speech by extracting parameters that relate to a model of human speech generation are called speech coders. Speech coders may comprise an encoder and a decoder. The encoder divides the incoming speech signal into blocks of time, or analysis frames. The duration of each segment in time (or "frame") may be selected to be short enough that the spectral envelope of the signal may be expected to remain relatively stationary. For example, a frame length may be twenty milliseconds, which corresponds to 160 samples per second at a sampling rate of eight kilohertz (kHz), although any frame length or sampling rate deemed suitable for a particular application may be used.

The encoder analyzes the incoming speech frame to extract certain relevant parameters and then quantizes the parameters into a binary representation, e.g., to a set of bits or a binary data packet. The data packets are transmitted over a communication channel (i.e., a wired and/or wireless network connection) to a receiver and a decoder. The decoder processes the data packets, unquantizes the processed data packets to produce the parameters, and resynthesizes the speech frames using the unquantized parameters.

The function of the speech coder is to compress the digitized speech signal into a low-bit-rate signal by removing natural redundancies inherent in speech. The digital compression may be achieved by representing an input speech frame with a set of parameters and employing quantization to represent the parameters with a set of bits. If the input speech frame has a number of bits $N_i$ and a data packet produced by the speech coder has a number of bits $N_o$, the compression factor achieved by the speech coder is $C_r = N_i/N_o$. The challenge is to retain high voice quality of the decoded speech while achieving the target compression factor. The performance of a speech coder depends on (1) how well the speech model, or the combination of the analysis and synthesis process described above, performs, and (2) how well the parameter quantization process is performed at the target bit rate of $N_o$ bits per frame. The goal of the speech model is thus to capture the essence of the speech signal, or the target voice quality, with a small set of parameters for each frame.

Speech coders generally utilize a set of parameters (including vectors) to describe the speech signal. A good set of parameters ideally provides a low system bandwidth for the reconstruction of a perceptually accurate speech signal. Pitch, signal power, spectral envelope (or formants), amplitude and phase spectra are examples of the speech coding parameters.

Speech coders may be implemented as time-domain coders, which attempt to capture the time-domain speech waveform by employing high time-resolution processing to encode small segments of speech (e.g., 5 millisecond (ms) sub-frames) at a time. For each sub-frame, a high-precision representative from a codebook space is found by means of a search algorithm. Alternatively, speech coders may be implemented as frequency-domain coders, which attempt to capture the short-term speech spectrum of the input speech frame with a set of parameters (analysis) and employ a corresponding synthesis process to recreate the speech waveform from the spectral parameters. The parameter quantizer preserves the parameters by representing them with stored representations of code vectors in accordance with known quantization techniques.

One time-domain speech coder is the Code Excited Linear Predictive (CELP) coder. In a CELP coder, the short-term correlations, or redundancies, in the speech signal are removed by a linear prediction (LP) analysis, which finds the coefficients of a short-term formant filter. Applying the short-term prediction filter to the incoming speech frame generates an LP residue signal, which is further modeled and quantized with long-term prediction filter parameters and a subsequent stochastic codebook. Thus, CELP coding divides the task of encoding the time-domain speech waveform into the separate tasks of encoding the LP short-term filter coefficients and encoding the LP residue. Time-domain coding can be performed at a fixed rate (i.e., using the same number of bits, $N_o$, for each frame) or at a variable rate (in which different bit rates are used for different types of frame contents). Variable-rate coders attempt to use the amount of bits needed to encode the parameters to a level adequate to obtain a target quality.

Time-domain coders such as the CELP coder may rely upon a high number of bits, $N_o$, per frame to preserve the accuracy of the time-domain speech waveform. Such coders may deliver excellent voice quality provided that the number of bits, $N_o$, per frame is relatively large (e.g., 8 kbps or above). At low bit rates (e.g., 4 kbps and below), time-domain coders may fail to retain high quality and robust performance due to the limited number of available bits. At low bit rates, the limited codebook space clips the waveform-matching capability of time-domain coders, which are deployed in higher-rate commercial applications. Hence, many CELP coding systems operating at low bit rates suffer from perceptually significant distortion characterized as noise.

An alternative to CELP coders at low bit rates is the "Noise Excited Linear Predictive" (NELP) coder, which operates under similar principles as a CELP coder. NELP coders use a filtered pseudo-random noise signal to model speech, rather than a codebook. Since NELP uses a simpler model for coded speech, NELP achieves a lower bit rate than CELP. NELP may be used for compressing or representing unvoiced speech or silence.

Coding systems that operate at rates on the order of 2.4 kbps are generally parametric in nature. That is, such coding systems operate by transmitting parameters describing the pitch-period and the spectral envelope (or formants) of the speech signal at regular intervals. Illustrative of such parametric coders is the LP vocoder.

LP vocoders model a voiced speech signal with a single pulse per pitch period. This basic technique may be augmented to include transmission information about the spectral envelope, among other things. Although LP vocoders provide reasonable performance generally, they may introduce perceptually significant distortion, characterized as buzz.

In recent years, coders have emerged that are hybrids of both waveform coders and parametric coders. Illustrative of these hybrid coders is the prototype-waveform interpolation (PWI) speech coding system. The PWI speech coding system may also be known as a prototype pitch period (PPP) speech coder. A PWI speech coding system provides an efficient method for coding voiced speech. The basic concept of PWI is to extract a representative pitch cycle (the prototype waveform) at fixed intervals, to transmit its description, and to reconstruct the speech signal by interpolating between the prototype waveforms. The PWI method may operate either on the LP residual signal or the speech signal.

In traditional telephone systems (e.g., public switched telephone networks (PSTNs)), signal bandwidth is limited to the frequency range of 300 Hertz (Hz) to 3.4 kilohertz (kHz). In wideband (WB) applications, such as cellular telephony and voice over internet protocol (VoIP), signal bandwidth may span the frequency range from 50 Hz to 7 kHz. Super wideband (SWB) coding techniques support bandwidth that extends up to around 16 kHz. Extending signal bandwidth from narrowband telephony at 3.4 kHz to SWB telephony of 16 kHz may improve the quality of signal reconstruction, intelligibility, and naturalness.

There may be a commercial interest in providing secure access to a communication device. For example, a text password may be used to access the communication device or to access a particular application of the communication device. Security of the communication device may be compromised if an unauthorized user has (or guesses) the text password. Manually entering a text password may also be inconvenient for a user in some situations (e.g., while driving a car).

IV. SUMMARY

In a particular aspect, a device includes a memory, a receiver, a processor, and a display. The memory is configured to store a speaker model. The receiver is configured to receive an input audio signal. The processor is configured to determine a first confidence level associated with a first portion of the input audio signal based on the speaker model. The processor is also configured to determine a second confidence level associated with a second portion of the input audio signal based on the speaker model. The display is configured to present a graphical user interface associated with the first confidence level or associated with the second confidence level.

In another aspect, a device includes a processor and a display. The processor is configured to determine whether an input audio signal satisfies a speaker verification validation criterion. The processor is also configured to predict a success rate associated with speaker verification based at least in part on one or more characteristics of the input audio signal. The display is configured to, in response to a determination that the input audio signal fails to satisfy the validation criterion, present a graphical user interface that indicates the predicted success rate.

In another aspect, a method includes receiving an input audio signal at a device. The method also includes determining a plurality of directions of arrival associated with the input audio signal and that the plurality of directions of arrival includes a first direction of arrival. The method further includes extracting a first audio signal from the input audio signal based on the first direction of arrival. The method also includes determining that the first audio signal satisfies one or more classification criteria. The method further includes determining a reverberation time corresponding to the first audio signal. The method also includes selecting a speaker model from a plurality of speaker models based at least in part on the reverberation time.

V. BRIEF DESCRIPTION OF THE DRAWINGS

VI. DETAILED DESCRIPTION

Figure 1:
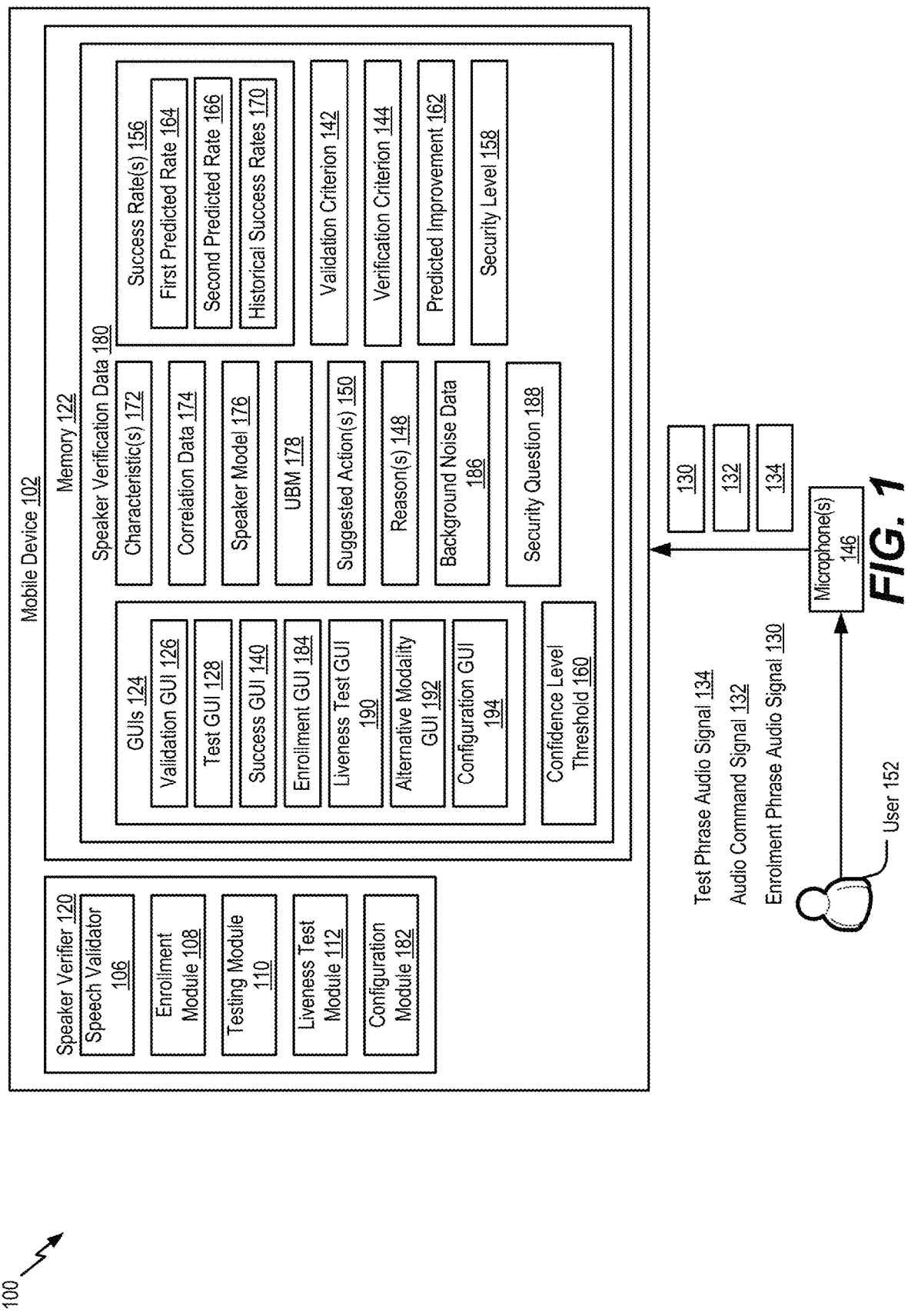
FIG. 1 is a diagram to illustrate a particular aspect of a system that is operable to perform speaker verification.

The principles described herein may be applied, for example, to a headset, a handset, or other device that is configured to perform speaker verification. Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, smoothing, and/or selecting from a plurality of values. Unless expressly limited by its context, the term "obtaining" is used to indicate any of its ordinary meanings, such as calculating, deriving, receiving (e.g., from another component, block or device), and/or retrieving (e.g., from a memory register or an array of storage elements).

Unless expressly limited by its context, the term "producing" is used to indicate any of its ordinary meanings, such as calculating, generating, and/or providing. Unless expressly limited by its context, the term "providing" is used to indicate any of its ordinary meanings, such as calculating, generating, and/or producing. Unless expressly limited by its context, the term "coupled" is used to indicate a direct or indirect electrical or physical connection. If the connection is indirect, it is well understood by a person having ordinary skill in the art, that there may be other blocks or components between the structures being "coupled".

The term "configuration" may be used in reference to a method, apparatus/device, and/or system as indicated by its particular context. Where the term "comprising" is used in the present description and claims, it does not exclude other elements or operations. The term "based on" (as in "A is based on B") is used to indicate any of its ordinary meanings, including the cases (i) "based on at least" (e.g., "A is based on at least B") and, if appropriate in the particular context, (ii) "equal to" (e.g., "A is equal to B"). In the case (i) where A is based on B includes based on at least, this may include the configuration where A is coupled to B. Similarly, the term "in response to" is used to indicate any of its ordinary meanings, including "in response to at least." The term "at least one" is used to indicate any of its ordinary meanings, including "one or more". The term "at least two" is used to indicate any of its ordinary meanings, including "two or more".

The terms "apparatus" and "device" are used generically and interchangeably unless otherwise indicated by the particular context. Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The terms "method," "process," "procedure," and "technique" are used generically and interchangeably unless otherwise indicated by the particular context. The terms "element" and "module" may be used to indicate a portion of a greater configuration. Any incorporation by reference of a portion of a document shall also be understood to incorporate definitions of terms or variables that are referenced within the portion, where such definitions appear elsewhere in the document, as well as any figures referenced in the incorporated portion.

As used herein, the term "communication device" refers to an electronic device that may be used for voice and/or data communication over a wireless communication network. Examples of communication devices include cellular phones, personal digital assistants (PDAs), handheld devices, headsets, wireless modems, laptop computers, personal computers, etc.

Referring to FIG. 1, a particular aspect of a system that is operable to perform speaker verification is shown and generally designated 100. In a particular aspect, the system 100 may be integrated into a decoding system or apparatus (e.g., in a wireless telephone or coder/decoder (CODEC)). In other aspects, the system 100 may be integrated into a tablet, a set top box, a music player, a video player, an entertainment unit, a navigation device, a communications device, a personal digital assistant (PDA), a fixed location data unit, or a computer.

It should be noted that in the following description, various functions performed by the system 100 of FIG. 1 are described as being performed by certain components or modules. However, this division of components and modules is for illustration only. In an alternate aspect, a function performed by a particular component or module may be divided amongst multiple components or modules. Moreover, in an alternate aspect, two or more components or modules of FIG. 1 may be integrated into a single component or module. Each component or module illustrated in FIG. 1 may be implemented using hardware (e.g., a field-programmable gate array (FPGA) device, an application-specific integrated circuit (ASIC), a digital signal processor (DSP), a controller, etc.), software (e.g., instructions executable by a processor), or any combination thereof.

The system 100 includes a mobile device 102 coupled to or in communication with one or more microphones 146. The mobile device 102 may include a speaker verifier 120 coupled to, or in communication with, a memory 122. The speaker verifier 120 may include a speech validator 106, an enrollment module 108, a testing module 110, a liveness test module 112, a configuration module 182, or a combination thereof. The memory 122 may include speaker verification data 180. The speaker verification data 180 may include graphical user interfaces (GUIs) 124, one or more success rates 156, one or more reasons 148, one or more suggested actions 150, a security level 158, a confidence level threshold 160, a predicted improvement 162, a validation criterion 142, a verification criterion 144, historical success rates 170, one or more characteristics 172, correlation data 174, a speaker model 176, a universal background model (UBM) 178, background noise data 186, a security question 188, or a combination thereof. The GUIs 124 may include a validation GUI 126, a test GUI 128, a success GUI 140, an enrollment GUI 184, a liveness test GUI 190, an alternative modality GUI 192, a configuration GUI 194, or a combination thereof. The success rates 156 may include a first predicted rate 164, a second predicted rate 166, or both.

During operation, a user 152 may activate the speaker verifier 120 to perform speaker verification. For example, the user 152 may select an input (e.g., a speaker verification icon) displayed at a display of the mobile device 102. The mobile device 102 may activate the speaker verifier 120 in response to receiving the selection of the input. As another example, the user 152 may speak a speaker verification activation command into the one or more microphones 146 to activate the speaker verifier 120. The mobile device 102 may receive an audio signal via the one or more microphones 146 and may activate the speaker verifier 120 in response to determining that the audio signal corresponds to the speaker verification activation command. As a further example, the mobile device 102 may detect a particular movement (e.g., a swipe at the display of the mobile device 102, a particular hand movement, a particular eye movement, or a combination thereof) of the user 152. The mobile device 102 may activate the speaker verifier 120 in response to detecting the particular movement. The mobile device 102 may receive an audio command signal 132 via the one or more microphones 146.

The audio command signal 132 may correspond to multiple words, a word, or a portion of a word spoken by the user 152. For example, the audio command signal 132 may correspond to a command spoken by the user 152. The audio command signal 132 may also include background noise (e.g., music, street noise, another person's speech, etc.).

In a particular aspect, the one or more microphones 146 may capture the audio command signal 132 and an analog-to-digital converter (ADC) at the mobile device 102 may convert the captured audio command signal 132 from an analog waveform into a digital waveform comprised of digital audio samples. The digital audio samples may be processed by a digital signal processor. A gain adjuster may adjust a gain (e.g., of the analog waveform or the digital waveform) by increasing or decreasing an amplitude level of an audio signal (e.g., the analog waveform or the digital waveform). Gain adjusters may operate in either the analog or digital domain. For example, a gain adjuster may operate in the digital domain and may adjust the digital audio samples produced by the analog-to-digital converter. After gain adjusting, an echo canceller may reduce echo that may have been created by an output of a speaker entering the one or more microphones 146. The output of the echo canceller may be coupled to the speaker verifier 120. For example, the output of the echo canceller may be coupled to the speech validator 106, the enrollment module 108, the testing module 110, the liveness test module 112, or a combination thereof.

The speech validator 106 may receive the audio command signal 132 (e.g., as an output of the echo canceller). The speech validator 106 may determine whether the audio command signal 132 satisfies the validation criterion 142, as described with reference to FIG. 2. In response to determining that the audio command signal 132 fails to satisfy the validation criterion 142, the speech validator 106 may generate the validation GUI 126, as described with reference to FIG. 2. The validation GUI 126 may prompt the user 152 to repeat the command. In a particular aspect, the validation GUI 126 may include a first option to repeat the command and a second option to continue to the test GUI 128 without repeating the command, as described with reference to FIG. 2. For example, the user 152 may prefer to attempt to access the mobile device 102 (or an application of the mobile device 102 corresponding to the command) even when the audio command signal 132 fails to satisfy the validation criterion 142.

The testing module 110 may identify the command corresponding to the audio command signal 132 in response to a determination that the audio command signal 132 satisfies the validation criterion 142. In a particular aspect, the testing module 110 may identify the command in response to receiving a selection of the second option to continue to the test GUI 128 without repeating the command. For example, the testing module 110 may identify the command corresponding to the audio command signal 132 even when the audio command signal 132 does not satisfy the validation criterion 142.

The testing module 110 may determine whether access to the command is restricted. For example, the command may be associated with the security level 158. The security level 158 may correspond to restricted access. For example, the security level 158 may indicate that a first set of applications (e.g., a mail application, a chat application, or both) of mobile device 102 has a high level of access restrictions, a second set of applications (e.g., a word processing application) of the mobile device 102 has a medium level of access restrictions, and a third set of applications (e.g., a reference application, such as a news application, a dictionary application, a thesaurus application, and/or an atlas application) of the mobile device 102 has no access restrictions. The testing module 110 may determine that access to the command is restricted in response to determining that the command corresponds to at least one application of the first set or the second set of applications.

The testing module 110 may generate the test GUI 128 in response to determining that the access to the command is restricted. The test GUI 128 may indicate a test phrase. The test phrase may correspond to an enrollment phrase audio signal 130 that was previously received from an authorized user (e.g., the user 152). For example, the enrollment phrase audio signal 130 may be received during active enrollment (e.g., a training session) of the authorized user. In another particular aspect, the enrollment phrase audio signal 130 may be received during passive enrollment of the authorized user. For example, the enrollment phrase audio signal 130 may have been received while the authorized user was engaged in a phone call.

In a particular aspect, the test phrase may not correspond to a stored audio signal that was previously received from the authorized user. In this case, the testing module 110 may dynamically generate the test phrase. For example, the testing module 110 may generate the test phrase based on the speaker model 176 and the universal background model (UBM) 178. To illustrate, the testing module 110 may determine particular sounds that the authorized user pronounces in a distinctive manner based on a comparison of the speaker model 176 and the UBM 178. The testing module 110 may generate the test phrase to include one or more of the particular sounds. In a particular aspect, the testing module 110 may generate the test phrase based on the security level 158. For example, the testing module 110 may generate the test phrase to have a longer length in response to determining that the security level 158 indicates a higher level of security. As another example, the testing module 110 may include a higher number of the particular sounds that the authorized user pronounces distinctively in response to determining that the security level 158 indicates a higher level of security. The testing module 110 may store the test GUI 128 in the memory 122.

The speaker verifier 120 may provide the test GUI 128 to the display of the mobile device 102. The user 152 may speak the test phrase into the one or more microphones 146 of the mobile device 102. The mobile device 102 may receive a test phrase audio signal 134.

The testing module 110 may determine whether the test phrase audio signal 134 satisfies the verification criterion 144. For example, the testing module 110 may determine a confidence level of the test phrase audio signal 134 based on the speaker model 176. In a particular aspect, the testing module 110 may determine a first score that measures a correspondence between the test phrase audio signal 134 and the speaker model 176. The testing module 110 may determine a second score that measures a correspondence between the test phrase audio signal 134 and the UBM 178. In this aspect, the testing module 110 may determine the confidence level of the test phrase audio signal 134 based on the first score and the second score. For example, the confidence level may be high if the first score is higher than the second score and a difference between the first score and the second score is high. As another example, the confidence level may be low if the difference between the first score and the second score is low. As a further example, the confidence level may be negative if the second score is higher than the first score and the difference between the second score and the first score is high. The testing module 110 may determine that the test phrase audio signal 134 satisfies the verification criterion 144 in response to determining that the confidence level satisfies the confidence level threshold 160. The confidence level threshold 160 may be a default value. Alternatively, the confidence level threshold 160 may be determined based on the security level 158. For example, the confidence level threshold 160 may be higher if the security level 158 indicates a higher level of security.

The confidence level threshold 160 may affect the success rate of the speaker verification. For example, a higher confidence level threshold 160 may increase a false alarm rate and decrease a miss rate. The false alarm rate may correspond to a false rejection likelihood that the test phrase audio signal 134 may not satisfy the verification criterion 144 when the user 152 is the authorized user corresponding to the speaker model 176. The miss rate may correspond to a false acceptance likelihood that the test phrase audio signal 134 may satisfy the verification criterion 144 when the user 152 is not the authorized user corresponding to the speaker model 176. A higher confidence level threshold 160 may increase the false rejection likelihood and may decrease the false acceptance likelihood. A lower confidence level threshold 160 may decrease the false rejection likelihood and may increase the false acceptance likelihood.

The testing module 110 may generate the success GUI 140 in response to determining that the test phrase audio signal 134 satisfies the verification criterion 144. The success GUI 140 may indicate that the speaker verification is successful. In a particular aspect, the enrollment module 108 updates the speaker model 176 based on the test phrase audio signal 134, in response to the determination that the test phrase audio signal 134 satisfies the verification criterion 144. For example, the enrollment module 108 may update the speaker model 176, as described with reference to FIG. 2.

The testing module 110 may update the historical success rates 170 to indicate that the speaker verification is successful. For example, the historical success rates 170 may include a first number of successful speaker verifications out of a second number of attempted speaker verifications. The testing module 110 may update (e.g., increase) the first number and the second number in response to determining that the test phrase audio signal 134 satisfies the verification criterion 144. Alternatively, the testing module 110 may update (e.g., increase) the second number but not the first number in response to determining that the test phrase audio signal 134 does not satisfy the verification criterion 144. In a particular aspect, the historical success rates 170 may correspond to an overall (e.g., average) confidence level. For example, the testing module 110 may store the confidence level of the test phrase audio signal 134 in the memory 122. In a particular aspect, the testing module 110 may store a time stamp corresponding to the confidence level. For example, the time stamp may indicate a particular time at which the confidence level was determined. The testing module 110 may generate (or update) the overall confidence level based on the confidence level of the test phrase audio signal 134, based on a number of speaker verifications performed, or both. For example, the overall confidence level may correspond to an average confidence level of speaker verifications performed over a particular time period (e.g., a preceding week or a particular data range).

In a particular aspect, the success GUI 140 may indicate the historical success rates 170. For example, the success GUI 140 may indicate the first number, the second number, the overall confidence level, or a combination thereof. The testing module 110 may store the success GUI 140 in the memory 122, and the speaker verifier 120 may provide the success GUI 140 to the display of the mobile device 102.

In a particular aspect, the testing module 110 may generate the alternative modality GUI 192 in response to determining that the test phrase audio signal 134 fails to satisfy the verification criterion 144. The testing module 110 may store the alternative modality GUI 192 in the memory 122, and the testing module 110 may provide the alternative modality GUI 192 to the display of the mobile device 102. The alternative modality GUI 192 may prompt the user 152 to provide other authentication data (e.g., a text password, an iris scan, a finger print, and/or an image of the user's face). The testing module 110 may determine that the user 152 corresponds to an authorized user (e.g., the authorized user corresponding to the speaker model 176) based on the other authentication data.

In a particular aspect, the testing module 110 may generate an alternative test GUI in response to determining that the test phrase audio signal 134 fails to satisfy the verification criterion 144. The alternative test GUI may include the security question 188. The security question 188 may be a question that the authorized user of the speaker model 176 is able to answer. For example, the security question 188 may be from a set of security questions to which the authorized user previously provided answers (e.g., during enrollment). As another example, the security question 188 may be generated based on usage of the mobile device 102. For example, the security question 188 may prompt the user 152 to identify a person that the user 152 called on a particular day using the mobile device 102. In response to the security question 188, the testing module 110 may receive an alternative test phrase signal. The testing module 110 may generate the success GUI 140 in response to determining that the alternative test phrase signal satisfies the verification criterion 144, that the alternative test phrase signal corresponds to a valid answer to the security question 188, or both. In a particular aspect, the testing module 110 may determine whether the alternative test phrase signal satisfies the verification criterion 144 based on a stricter (e.g., higher) confidence level threshold than used to determine whether the test phrase audio signal 134 satisfies the verification criterion 144.

In response to determining that the user 152 corresponds to the authorized user, the testing module 110 may update the historical success rates 170 to update (e.g., increase) a historical false alarm rate. In a particular aspect, the enrollment module 108 may update the speaker model 176 based on the test phrase audio signal 134 in response to the determination that the user 152 corresponds to the authorized user.

In a particular aspect, the user 152 may modify one or more parameters of the speaker verification in response to a determination that the user 152 corresponds to the authorized user. For example, the user 152 may modify the one or more parameters subsequent to the speaker verification.

As another example, the user 152 may modify the one or more parameters independent of performing the speaker verification. In this example, the user 152 may select a configuration input displayed at the display of the mobile device 102 or may speak a configuration command into the one or more microphones 146. The configuration module 182 may generate the alternative modality GUI 192 in response to receiving a selection of the configuration option or in response to receiving an audio signal corresponding to the configuration command. The configuration module 182 may receive other authentication data (e.g., a text password, an iris scan, a finger print, and/or an image of the user's face). The configuration module 182 may determine that the user 152 corresponds to a user authorized to configure the one or more parameters of the speaker verification based on the other authentication data.

The configuration module 182 may generate the configuration GUI 194 in response to a determination that the user 152 corresponds to the authorized user. The configuration GUI 194 may indicate that the user 152 is permitted to configure parameters of the speaker verification.

The configuration GUI 194 may include a SNR threshold configuration option, a confidence level threshold configuration option, a security level configuration option, or a combination thereof. The configuration module 182 may store the configuration GUI 194 in the memory 122. The speaker verifier 120 may provide the configuration GUI 194 to the display of the mobile device 102. The user 152 may provide a SNR threshold value using the SNR threshold configuration option, a confidence level threshold value using the confidence level threshold configuration option, a security level value using the security level configuration option, or a combination thereof. The configuration module 182 may set the SNR threshold to the SNR threshold value, the confidence level threshold 160 to the confidence level threshold value, the security level 158 to the security level value, or a combination thereof.

In a particular aspect, minimum values may be associated with one or more parameters of the speaker verification. For example, the configuration module 182 may not permit a value of a parameter to be set below a corresponding minimum value. The minimum values may be default values. The minimum values of the one or more parameters may maintain a minimum security level of speaker verification.

In a particular aspect, the configuration module 182 may determine the first predicted rate 164 subsequent to a modification of the one or more parameters of the speaker verification. For example, the configuration module 182 may determine the first predicted rate 164 subsequent to updating the SNR threshold, the confidence level threshold 160, the security level 158, or a combination thereof. The configuration module 182 may determine the first predicted rate 164 based on the correlation data 174 and the updated SNR threshold, the confidence level threshold 160, the security level 158, or a combination thereof. The configuration GUI 194 may indicate the first predicted rate 164. The user 152 may be able to view changes in the first predicted rate 164 based on the changes in the one or more parameters of the speaker verification.

The configuration GUI 194 may indicate the historical success rates 170. For example, the configuration GUI 194 may indicate a false alarm rate, a miss rate, or both, associated with the user 152. In a particular aspect, the configuration GUI 194 may indicate the confidence level threshold 160, the security level 158, or both, corresponding to each of the historical success rates 170. The user 152 may be able to view trends of the historical success rates 170. For example, the configuration GUI 194 may display the historical success rates 170 and the first predicted rate 164. The configuration GUI 194 may provide a summary of a user experience associated with the speaker verification.

In a particular aspect, the configuration module 182 may determine a phoneme (or articulation) coverage map (or histogram) of the speaker model 176. For example, the phoneme coverage map may indicate how often each phoneme is included in the model data used to generate the speaker model 176. In a particular aspect, the configuration GUI 194 may include phoneme coverage maps corresponding to multiple speaker models associated with the user 152. For example, each speaker model may correspond to a particular language. The user 152 may be able to compare phoneme coverage corresponding to each language.

In a particular aspect, the configuration GUI 194 may indicate one or more phonemes that the user 152 (e.g., a non-native speaker of a particular language associated with the speaker model 176) pronounces differently than indicated by the UBM 178 (e.g., corresponding to native speakers of the particular language). The user 152 may modify a pronunciation of the one or more phonemes to be more similar to the pronunciation indicated by the UBM 178 (e.g., to sound more like a native speaker of the particular language).

In a particular aspect, the configuration GUI 194 may indicate a predicted success rate (e.g., the first predicted rate 164) based on the phoneme coverage of the speaker model 176. For example, the first predicted rate 164 may be displayed as a likelihood accumulation bar. A greater coverage of the phoneme map may correspond to a first (e.g., higher) value of the first predicted rate 164 and a lower coverage of the phoneme map may correspond to a second (e.g., lower) value of the first predicted rate 164. The configuration GUI 194 may enable the user 152 to observe a relationship between the phoneme coverage and the predicted success rate. The configuration GUI 194 may indicate whether data variability, speaker variability of the user 152, or both, have been captured by the speaker model 176.

In a particular aspect, the testing module 110 may detect a repeated confidence level in response to determining that a confidence level of the test phrase audio signal 134 corresponds to one or more confidence levels associated with a particular number (e.g., 2) of previously analyzed test phrase audio signals. For example, an unauthorized user may have recorded the authorized user speaking the test phrase and may attempt to use the recorded speech to access the command.

The liveness test module 112 may generate the liveness test GUI 190 randomly, in response to a detection of the repeated confidence level, or both. The liveness test GUI 190 may include the alternative modality GUI 192, the security question 188, or both. The liveness test module 112 may receive a liveness test phrase signal, other authentication data (e.g., an iris scan, an image of a face of the user 152, etc.), or both. The liveness test module 112 may generate the success GUI 140 in response to determining that the liveness test phrase signal satisfies the verification criterion 144, that the liveness test phrase signal corresponds to a valid answer to the security question 188, that the other authentication data identifies the user 152 as the authorized user corresponding to the speaker model 176, or a combination thereof. In a particular aspect, the liveness test module 112 may determine whether the liveness test phrase signal satisfies the verification criterion 144 based on a stricter (e.g., higher) confidence level threshold than used to determine whether the test phrase audio signal 134 satisfies the verification criterion 144.

In a particular aspect, the liveness test module 112 may detect whether an audio signal (e.g., the enrollment phrase audio signal 130, the audio command signal 132, the test phrase audio signal 134, or a combination thereof) is a recording (e.g., played via a speaker). For example, the liveness test module 112 may generate spectrum parameters of the audio signal (e.g., the enrollment phrase audio signal 130, the audio command signal 132, the test phrase audio signal 134, or a combination thereof) and may measure a dynamic range of the spectrum parameters. The liveness test module 112 may determine whether the dynamic range corresponds to a recording based on a classifier. For example, a recorded audio signal may correspond to a narrower dynamic range than a spoken audio signal. The classifier may determine that the audio signal corresponds to recorded speech in response to determining that the dynamic range of the spectrum parameters corresponds to the narrower dynamic range. In response to determining that the audio signal corresponds to recorded speech, the liveness test module 112 may generate the alternative modality GUI, as described herein. Alternatively, the liveness test module 112 may determine that the audio signal corresponds to live speech in response to determining that the dynamic range of the spectrum parameters corresponds to the wider dynamic range.

In a particular aspect, the validation GUI 126, the test GUI 128, the enrollment GUI 184, or a combination thereof, may include an indicator of a characteristic (e.g., stationary noise level) of an audio signal (e.g., the audio command signal 132, the test phrase audio signal 134, or the enrollment phrase audio signal 130). For example, the speaker verifier 120 may measure a spectral flatness of the audio signal. The speaker verifier 120 may determine a level of stationary noise based on the measured spectral flatness. As another example, the speaker verifier 120 may determine the background noise data 186 indicating a level of background noise in the audio signal. The speaker verifier 120 may store the background noise data 186 in the memory 122. In a particular aspect, the speaker verifier 120 may determine the background noise data 186 based on fast recursive noise tracking, minimum statistics, or both. The indicator of the characteristic may include the background noise data 186, the spectral flatness measurement, or both.

In a particular aspect, the speaker verifier 120 may update a display of the indicator of the characteristic while receiving the audio signal. For example, the speaker verifier 120 may measure the background noise (or the spectral flatness) of the audio signal based on particular frames (e.g., based on every n$^{th}$ frame) of the audio signal. The speaker verifier 120 may update the background noise data 186 (or spectral flatness data) based on the measurement and may update a display of the background noise data 186 (or spectral flatness data) in response to detecting a change in the measurement of the background noise (or spectral flatness). For example, the user 152 may move around with the mobile device 102 to find a location corresponding to an acceptable (e.g., lower) measurement of background noise.

In a particular aspect, the enrollment module 108 may generate (or update) the speaker model 176 corresponding to a user (e.g., the user 152). For example, the speaker verifier 120 may perform "active" enrollment. To illustrate, the user 152 may select an enrollment option displayed at the display of the mobile device 102. In response to receiving a selection of the enrollment option, the enrollment module 108 may generate the alternative modality GUI 192. The enrollment module 108 may receive other authentication data (e.g., a text password, an iris scan, a finger print, and/or an image of the user's face). In response to determining that the speaker model 176 is to be generated (e.g., does not exist in the memory 122), the enrollment module 108 may store an association between the user 152 corresponding to the authentication data and the speaker model 176 in the memory 122. In response to determining that the speaker model 176 is to be updated (e.g., exists in the memory 122), the enrollment module 108 may determine whether the authentication data corresponds to an authorized user associated with the speaker model 176.

In response to determining that the authentication data corresponds to the authorized user, the enrollment module 108 may generate the enrollment GUI 184. The enrollment GUI 184 may include an option to select a particular language. The enrollment GUI 184 may include an enrollment phrase. The enrollment module 108 may receive an enrollment phrase audio signal 130 and a selection of the particular language. The enrollment phrase audio signal 130 may correspond to the user 152 speaking the enrollment phrase.

The enrollment module 108 may determine whether the enrollment phrase audio signal 130 satisfies the validation criterion 142, as described with reference to FIG. 2. In response to determining that the enrollment phrase audio signal 130 fails to satisfy the validation criterion 142, the enrollment module 108 may generate an enrollment validation GUI. The enrollment module 108 may determine the reasons 148 that the enrollment phrase audio signal 130 failed to satisfy the validation criterion 142, the suggested actions 150 to be performed, or both, as described with reference to FIG. 2. The enrollment validation GUI may indicate the reasons 148, the suggested actions 150, or both.

In a particular aspect, the enrollment module 108 may predict a success rate (e.g., the first predicted rate 164) of speaker verification using the enrollment phrase audio signal 130 to generate (or update) the speaker model 176. For example, the correlation data 174 may indicate a correlation between characteristics of an enrollment phrase audio signal and historical success rates. To illustrate, the correlation data 174 may indicate a first historical success rate corresponding to a first SNR, may indicate a second historical success rate corresponding to a second SNR, and may indicate an interpolated success rate corresponding to a third SNR. The speaker verifier 120 may determine the interpolated success rate based on the first historical success rate, the second historical success rate, the first SNR, the second SNR, and the third SNR.

The enrollment module 108 may determine one or more characteristics (e.g., pitch-related features, energy-related features, or both) of the enrollment phrase audio signal 130. The enrollment module 108 may determine a particular success rate corresponding to the one or more characteristics based on the correlation data 174. The enrollment module 108 may set the first predicted rate 164 to the particular success rate. The enrollment module may store the first predicted rate 164 in the memory 122. The enrollment validation GUI may indicate the first predicted rate 164. For example, the first predicted rate 164 may indicate how the success rate of the speaker verification is affected by a quality (e.g., the one or more characteristics) of the enrollment phrase audio signal 130 used to generate (or update) the speaker model 176.

In a particular aspect, the enrollment module 108 may predict a success rate (e.g., the second predicted rate 166) of speaker verification based on using another enrollment phrase audio signal to generate (or update) the speaker model 176, where the user 152 performs the suggested actions 150 during or prior to providing the other enrollment phrase audio signal. For example, the suggested actions 150 may indicate moving closer to the one or more microphones 146. The second predicted rate 166 may correspond to the user moving closer to the one or more microphones 146 to provide another enrollment phrase and the enrollment module 108 using the other enrollment phrase signal to generate (or update) the speaker model 176. In a particular aspect, the enrollment module 108 may modify the one or more characteristics of the enrollment phrase audio signal 130 based on the user 152 performing the suggested actions 150. The enrollment module 108 may determine a second success rate corresponding to the modified one or more characteristics based on the correlation data 174. The enrollment module 108 may set the second predicted rate 166 to the second success rate, and the enrollment module 108 may store the second predicted rate 166 in the memory 122. The enrollment validation GUI may indicate the second predicted rate 166.

In a particular aspect, the enrollment module 108 may determine a predicted improvement in the success rate of the speaker verification corresponding to the user 152 performing the suggested actions 150 during the enrollment. The predicted improvement may correspond to a difference between the first predicted rate 164 and the second predicted rate 166. The enrollment module 108 may store the predicted improvement in the memory 122. The enrollment GUI 184 may indicate the predicted improvement. The enrollment GUI 184 may prompt the user 152 to say the enrollment phrase again. In a particular aspect, the enrollment GUI 184 may include an option to continue enrollment (e.g., without repeating the enrollment phrase).

The enrollment module 108 may receive another enrollment phrase audio signal (e.g., the enrollment phrase audio signal 130). The enrollment phrase audio signal 130 may correspond to the user 152 repeating the enrollment phrase again subsequent to or while performing the suggested actions 150.

In response to determining that the enrollment phrase audio signal 130 satisfies the validation criterion 142, the enrollment module 108 may generate (or update) the speaker model 176 based on the enrollment phrase audio signal 130. The speaker model 176 may correspond to the particular language. In a particular aspect, the enrollment module 108 may generate (or update) the speaker model 176 in response to receiving a selection of the option to continue enrollment. For example, the enrollment module 108 may generate (or update) the speaker model 176 using mel-frequency cepstrum coefficients (MFCC) corresponding to the enrollment phrase audio signal 130. In a particular aspect, the enrollment module 108 may generate one or more utterance vectors based on the mel-frequency cepstrum coefficients (MFCC). An utterance vector may represent utterances of the user 152 at a per sentence level. For example, each utterance vector may correspond to a particular sentence. Each utterance vector may have a uniform size regardless of a length of the corresponding sentence.

In a particular aspect, the enrollment module 108 may compare a first pronunciation by the user 152 of a particular phoneme to a second pronunciation of the particular phoneme indicated by the UBM 178. The enrollment module 108 may generate data indicating one or more phonemes that are pronounced in a distinctive manner by the user 152 as compared to the UBM 178.

In a particular aspect, the enrollment GUI 184 may prompt the user 152 to provide a set of security questions (e.g., the security question 188) and corresponding answers. The enrollment module 108 may store the security question 188 and a corresponding answer in the memory 122. In a particular aspect, the enrollment GUI 184 may prompt the user 152 to provide a set of test phrases. The enrollment module 108 may store the set of test phrases in the memory 122.

In a particular aspect, the enrollment module 108 may store the speaker model 176 in a restricted access area (e.g., a trustzone) of the memory 122. For example, the speaker model 176 may be copied to an accessible area of the memory 122 in response to the enrollment module 108 determining that other authentication data (e.g., an iris scan, a finger print, an image of a face, a password, etc.) corresponds to a user (e.g., the user 152) authorized to update the speaker model 176. The enrollment module 108 may move the speaker model 176 back to the restricted access area subsequent to enrollment (e.g., subsequent to updating the speaker model 176). For example, the enrollment module 108 may copy the speaker model 176 to the restricted access area and may delete the speaker model 176 from the accessible area of the memory 122.

The system 100 may enable speaker verification using an audio signal (e.g., the audio command signal 132 and the test phrase audio signal 134). The speaker verification may be used to provide secure access to the mobile device 102. Using audio signals for the speaker verification may be more secure and may be more convenient for a user than entering a text phrase to access the mobile device 102.

Figure 2:
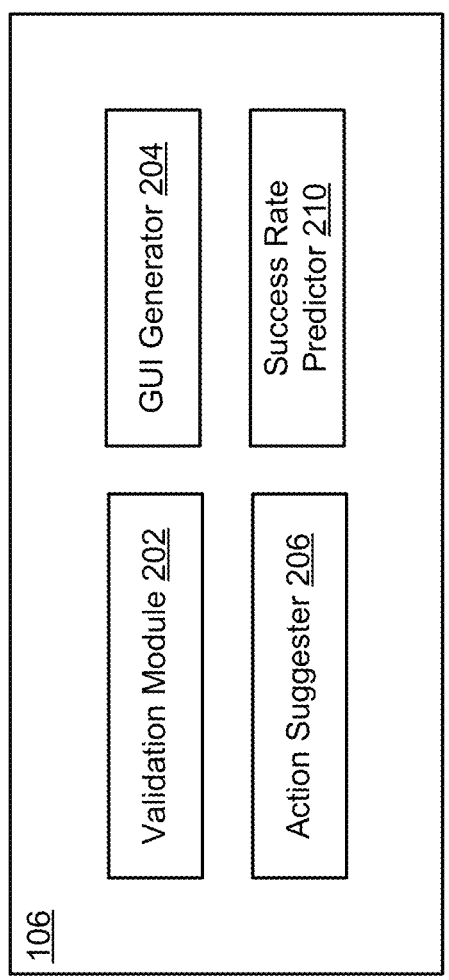
FIG. 2 is a diagram to illustrate a particular aspect of a speech validator of the system of FIG. 1.

Referring to FIG. 2, an illustrative aspect of the speech validator 106 of FIG. 1 is shown. The speech validator 106 may include a validation module 202, a GUI generator 204, an action suggester 206, and a success rate predictor 210.

During operation, the validation module 202 may receive the audio command signal 132 of FIG. 1. The validation module 202 may extract features of the audio command signal 132 and may determine whether the audio command signal 132 satisfies a validation criterion 142 of FIG. 1 based on the extracted features. The extracted features may include pitch-related features (e.g., a mean duration of voiced sounds, a standard deviation of duration of the voiced sounds, a rate of the voiced sounds, an average pitch, a standard deviation of pitch, a minimum pitch, a maximum pitch, a pitch derivative relative to time, a mean derivative of the pitch, and/or a distance between pitch reversal points), energy-related features (e.g., a mean energy, a standard deviation of energy, a relative maximum of energy derivative in time, a maximum of absolute second derivative of energy), or both.

In a particular aspect, the validation module 202 may determine that the audio command signal satisfies the validation criterion 142 in response to determining that the audio command signal 132 corresponds to standard speech. Non-standard speech may correspond to reverberated speech, repetitive speech, singing, humming, emotional speech, noisy speech, non-speech sound, or a combination thereof. The validation module 202 may determine that the audio command signal 132 corresponds to the non-standard speech based on features of the audio command signal 132. For example, the validation module 202 may extract the features of the audio command signal 132.

The features may include energy-related features, pitch-related features, or both. In a particular aspect, the energy-related features may include at least one of a mean energy, a standard deviation of energy, a relative maximum of an energy derivative relative to time, or a maximum of an absolute second derivative of energy. In a particular aspect, the pitch-related features may include at least one of a mean duration of voiced sounds, a standard deviation of durations of the voiced sounds, a rate of the voiced sounds, an average pitch, a standard deviation of pitch, a maximum pitch, a minimum pitch, a relative difference between the maximum pitch and the minimum pitch, a pitch derivative relative to time, a mean derivative of pitch, or a distance between pitch reversal points.

For example, the validation module 202 may determine a signal to noise ratio (SNR) of the audio command signal 132. The validation module 202 may determine that the audio command signal 132 corresponds to non-standard speech (e.g., noisy speech) in response to determining that the SNR of the audio command signal 132 fails to satisfy (e.g., exceeds or does not exceed) an SNR threshold. The SNR threshold may have a default value. The validation module 202 may update the reasons 148 to include noisy speech in response to determining that the SNR of the audio command signal 132 fails to satisfy the SNR threshold.

As another example, the validation module 202 may classify the audio command signal 132 into one or more emotional states (e.g., joy, anger, sadness, neutral, fear, surprise, and/or disgust) by using a classifier (e.g., a Gaussian mixture model (GMM), a deep neural network (DNN), a support vector machine (SVM)) and the extracted features of the audio command signal 132. The validation module 202 may determine that the audio command signal 132 corresponds to non-standard speech (e.g., emotional speech) in response to a classification of the audio command signal 132 into one or more of a subset (e.g., joy, anger, sadness, fear, surprise, and/or disgust) of the emotional states. The validation module 202 may update the reasons 148 to include emotional speech in response to the classification of the audio command signal 132 into the one or more of the subset (e.g., joy, anger, sadness, fear, surprise, and/or disgust) of the emotional states.

As a further example, the validation module 202 may determine that the audio command signal 132 corresponds to non-speech sound, repetitive speech, reverberated speech, humming, and/or singing based on the extracted features and a classifier (e.g., a support vector machine). The classifier may detect repetitive syllables, humming, and/or singing based on analyzing a voice speech duration, a rate of voiced speech, a rate of speech pauses, a similarity measure between voiced speech intervals (e.g., corresponding to syllables), or a combination thereof. The classifier may detect the repetitive syllables, humming, and/or singing based on determining that the audio command signal 132 corresponds to repetitive phrases, sounds associated with a longer pitch continuity than in standard speech, or both. In a particular aspect, the reverberated speech may indicate that the user 152 provided the audio command signal 132 at a particular distance (e.g., greater than or equal to 3 feet) from the one or more microphones 146. The validation module 202 may update the reasons 148 to include non-speech, repetitive speech, reverberated speech, humming, and/or singing based on a classification of the audio command signal 132 by the classifier. For example, the reasons 148 may indicate that, while providing the audio command signal 132, the user 152 of FIG. 1 was at least one of humming or singing. As another example, the reasons 148 may indicate distant speech in response to detecting that the audio command signal 132 corresponds to reverberated speech.

As a further example, the validation module 202 may determine that the audio command signal 132 corresponds to non-speech sound based on the extracted features and a classifier (e.g., a support vector machine). The validation module 202 may determine that the audio command signal 132 corresponds to the non-standard speech in response to determining that the audio command signal 132 corresponds to the non-speech sound. The validation module 202 may update the reasons 148 to include non-speech sound.

As another example, the validation module 202 may determine that the speaker model 176 of FIG. 1 corresponds to a particular language. The speaker model 176 may be a model of speech associated with an authorized (e.g., enrolled) user. The validation module 202 may determine that the audio command signal 132 corresponds to another language based on the extracted features and a classifier. The validation module 202 may determine that the audio command signal 132 corresponds to non-standard speech in response to determining that the audio command signal 132 does not correspond to the particular language. The validation module 202 may update the reasons 148 to include another language.

In a particular aspect, the validation module 202 may determine that the audio command signal 132 corresponds to a length of utterance that fails to satisfy (e.g., is longer than or shorter than) an utterance threshold. The validation module 202 may update the reasons 148 to indicate that the length of utterance associated with the audio command signal 132 fails to satisfy the utterance threshold (e.g., is too long or too short).

The validation module 202 may determine that the audio command signal 132 corresponds to standard speech in response to determining that the audio command signal 132 does not correspond to non-standard speech. The validation module 202 may determine that the audio command signal 132 fails to satisfy the validation criterion 142 in response to determining that the audio command signal 132 corresponds to non-standard speech.

The validation module 202 may store in the memory 122 a reason (e.g., the reasons 148 of FIG. 1) that the audio command signal 132 corresponds to the non-standard speech. The reasons 148 may include at least one of emotional speech, repetitive speech, noisy speech, non-speech sound, reverberated speech, singing, humming, distant speech, existence of non-stationary source (e.g., a competing talker), or another language.

The GUI generator 204 may generate the validation GUI 126 of FIG. 1 in response to a determination that the audio command signal 132 fails to satisfy the validation criterion 142. The validation GUI 126 may include information that may be of interest to the user 152. For example, the validation GUI 126 may include the reasons 148.

The action suggester 206 may, in response to determining that the audio command signal 132 fails to satisfy the validation criterion 142, determine a suggested action (e.g., the suggested actions 150 of FIG. 1) to be performed. In a particular aspect, the memory 122 may include suggested action data indicating one or more suggested actions corresponding to each reason. The suggested action data may have default values. The action suggester 206 may identify the suggested actions 150 corresponding to the reasons 148 based on the suggested action data.

The suggested actions 150 may include moving to a quieter location, moving closer to one or more of the one or more microphones 146 of FIG. 1, reducing background noise, speaking slower, speaking in a neutral tone, speaking at a lower volume, speaking at a higher volume, speaking in a different language, speaking a longer phrase, enunciating more distinctly, or a combination thereof.

For example, the suggested actions 150 may include moving to a quieter location, reducing background noise, or both, if the reasons 148 include noisy speech. As another example, the suggested actions 150 may include speaking in a neutral tone, a neutral volume (e.g., speaking at a lower volume or speaking at a higher volume), or both, if the reasons 148 include emotional speech. As a further example, the suggested actions 150 may include moving closer to the one or more microphones 146 if the reasons 148 include reverberated speech. As an additional example, the suggested actions 150 may correspond to speaking slowly and at a normal level (e.g., enunciating more distinctly), speaking a longer phrase, or both, if the reasons 148 include repetitive speech, singing, humming, and/or non-speech. As a further example, the suggested actions 150 may include speaking in the particular language corresponding to the speaker model 176 if the reasons 148 include another language. The validation GUI 126 may indicate the suggested actions 150.

The success rate predictor 210 may determine a predicted success rate (e.g., the first predicted rate 164 of FIG. 1) associated with the speaker verification based at least in part on the characteristics 172 of FIG. 1 of the audio command signal 132. In a particular aspect, the characteristics 172 may correspond to the extracted features of the audio command signal 132, the reasons 148 (e.g., noisy speech, reverberated speech, emotional speech, non-speech sound, another language, humming, and/or singing), or a combination thereof. The success rate predictor 210 may determine the first predicted rate 164 based on the characteristics 172 and the correlation data 174 of FIG. 1. In a particular aspect, the correlation data 174 may indicate a correlation between audio signal characteristics (e.g., pitch-related features, energy-related features, noisy speech, reverberated speech, emotional speech, non-speech sound, another language, humming, and/or singing) and historical success rates (e.g., a miss rate, a false alarm rate, or both). The correlation data 174 may indicate that the characteristics 172 correspond to a particular success rate.

In a particular aspect, the correlation data 174 may indicate a confidence correlation between the audio signal characteristics and historical confidence levels. The success rate predictor 210 may determine a success rate correlation between the audio signal characteristics and success rates based on the confidence level threshold 160 of FIG. 1 and the confidence correlation. The speaker verification may be determined to be successful based on the confidence level threshold 160, as described herein. The confidence level threshold 160 may be a default value. The success rate correlation may indicate that the characteristics 172 correspond to the particular success rate. The success rate predictor 210 may set the first predicted rate 164 to the particular success rate. The validator GUI 126 may indicate the first predicted rate 164.

The success rate predictor 210 may determine a predicted improvement (e.g., the predicted improvement 162 of FIG. 1) in a success rate associated with the speaker verification. The predicted improvement 162 may be based on the user 152 performing the suggested actions 150 during the speaker verification. For example, the success rate predictor 210 may modify the characteristics 172 based on the user 152 performing the suggested actions 150. The success rate predictor 210 may determine the second predicted rate 166 of FIG. 1 based on the modified characteristics 172 and the correlation data 174, as described herein. The success rate predictor 210 may determine the predicted improvement 162 by calculating a difference between the first predicted rate 164 and the second predicted rate 166. The validation GUI 126 may indicate the predicted improvement 162.

The validation GUI 126 may indicate that modifying a value of a parameter (e.g., the confidence level threshold 160, the security level 158 of FIG. 1, or both) of the speaker verification changes a success rate (e.g., a false alarm rate, a miss rate, or both) associated with the speaker verification.

In a particular aspect, the validation GUI 126 may indicate using an alternative modality (e.g., iris scan, finger print, etc.) for speaker verification. For example, the GUI generator 204 may include the alternative modality GUI 192 in the validation GUI 126 in response to a determination that the first predicted rate 164, the second predicted rate 166, or both, are below an audio verification threshold. In this aspect, the speaker verifier 120 may determine whether the user 152 is an authorized user associated with the speaker model 176 based on authentication data, as described with reference to FIG. 1.

The GUI generator 204 may store the validation GUI 126 in the memory 122. The speaker verifier 120 may provide the validation GUI 126 to a display of the mobile device 102. In a particular aspect, the validation GUI 126 may prompt the user 152 to repeat the command. The mobile device 102 may receive an audio command signal (e.g., the audio command signal 132). The audio command signal 132 may correspond to the user 152 speaking the command again or speaking another command. In a particular aspect, the validation GUI 126 may include an option to continue (e.g., without repeating the command). For example, the testing module 110 of FIG. 1 may identify the command corresponding to the audio command signal 132 even when the audio command signal 132 does not satisfy the validation criterion 142, as described with reference to FIG. 1.

The speech validator 106 may enable generation of the validation GUI 126 that indicates information that may be helpful to a user during speaker verification. For example, the validation GUI 126 may indicate reasons that an audio command signal failed to satisfy a validation criterion, may indicate suggested actions to be performed, may indicate a predicted success rate, may indicate a predicted improvement in the success rate based on a user performing the suggested actions during the speaker verification, and may indicate parameters of the speaker verifications that may be modified by the user to change a success rate of the speaker verification. The validation GUI 126 may enable user expectation management and may identify actions that the user may perform to increase a success rate of the speaker verification.

Figure 3:
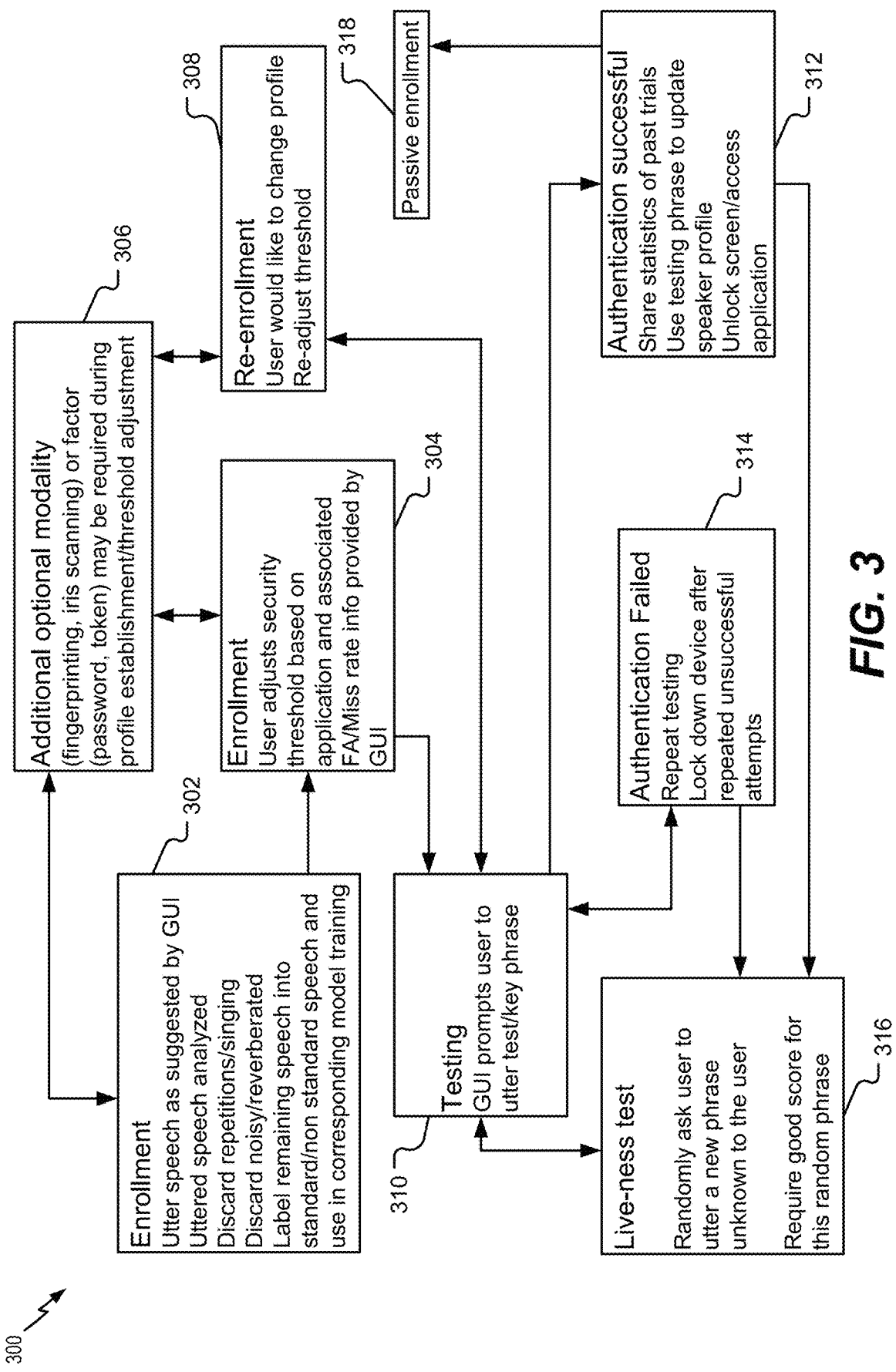
FIG. 3 is a state diagram to illustrate a particular aspect of a method of speaker verification.

Referring to FIG. 3, a state diagram of a particular aspect of a method of speaker verification is shown and generally designated 300. The state diagram 300 may corresponds to states of the system 100 of FIG. 1. In the example of FIG. 3, the state diagram 300 illustrates an implementation of performing active speaker enrollment to generate the speaker model 176, using the speaker model 176 to perform speaker verification, and performing passive enrollment to update the speaker model 176.

The state diagram 300 includes an enrollment state, at 302. The enrollment state 302 includes (e.g., corresponds to the operations) "utter speech as suggested by a graphical user interface," "uttered speech analyzed," "discard repetitions," "discard singing," "discard noisy," "discard reverberated," "label remaining speech into standard or non-standard speech," and "use remaining speech in corresponding model training."

For example, the user 152 may utter an enrollment phrase as suggested by the enrollment GUI 184 during active enrollment. The enrollment module 108 may analyze the enrollment phrase audio signal 130. The enrollment module 108 may determine whether the enrollment phrase audio signal 130 corresponds to at least one of singing, noisy speech, or reverberated speech, as described with reference to FIG. 1. The enrollment module 108 may discard the enrollment phrase audio signal 130 in response to a determination that the enrollment phrase audio signal 130 corresponds to at least one of singing, noisy speech, or reverberated speech.

In response to a determination that the enrollment phrase audio signal 130 does not correspond to singing, noisy speech, or reverberated speech, the enrollment module 108 may determine whether the enrollment phrase audio signal 130 corresponds to non-standard speech or to standard speech. For example, non-standard speech may include emotional speech, humming, and/or other non-speech sounds. Speech that is determined to not correspond to singing, noisy speech, reverberated speech, or non-standard speech may be classified as standard speech.

The enrollment module 108 may generate (or update) the speaker model 176 based on the enrollment phrase audio signal 130, as described with reference to FIG. 1, in response to determining that the enrollment phrase audio signal 130 corresponds to standard speech.

The state diagram 300 also includes a second enrollment state, at 304. The second enrollment state 304 includes "user adjusts security threshold based on application and associated false alarm rate and/or miss rate information provided by a graphical user interface (GUI)."

For example, the configuration module 182 may generate the configuration GUI 194. The configuration GUI 194 may include the first predicted rate 164 indicating a predicted success rate (e.g., a false alarm rate, a miss rate, or both). The enrollment module 108 may determine the predicted success rate based on characteristics of the enrollment phrase audio signal 130 and historical success rates. The user 152 may use the configuration GUI 194 to adjust the confidence level threshold 160, the security level 158, or both, as described with reference to FIG. 1.

The state diagram 300 further includes an additional optional modality state, at 306. The additional optional modality state 306 includes "additional optional modality (finger printing, iris scanning) or factor (password, token) that may be used during profile establishment and/or threshold adjustment."

For example, the speaker verifier 120 (e.g., the enrollment module 108) may generate the alternative modality GUI 192, as described with reference to FIG. 1. The user 152 may provide other authentication data (e.g., an iris scan, an image of a face, a thumbprint, a password, a token, etc.) to the mobile device 102. The enrollment module 108 may identify an authorized user (e.g., the user 152) corresponding to the speaker model 176 based on the other authentication data. In a particular aspect, the configuration module 182 may generate the configuration GUI 194 in response to determining that the other authentication data corresponds to a user (e.g., the user 152) authorized to configure the speaker model 176.

The state diagram 300 also includes a re-enrollment state, at 308. The re-enrollment state 308 includes "user would like to change profile and readjust threshold."

For example, the configuration module 182 may generate the configuration GUI 194. The user 152 may readjust the confidence level threshold 160, the security level 158, or both, as described with reference to FIG. 1. As another example, the enrollment module 108 may generate the enrollment GUI 184 during the active enrollment. The user 152 may regenerate (e.g., delete and generate) or update the speaker model 176, as described with reference to FIG. 1.

The state diagram 300 further includes a testing state, at 310. The testing state 310 includes "GUI prompts user to utter test/key phrase."

For example, the testing module 110 may generate the test GUI 128. The test GUI 128 may prompt the user 152 to utter a test phrase, as described with reference to FIG. 1.

The state diagram 300 also includes an authentication successful state, at 312. The authentication successful state 312 includes "share statistics of past trials," "use testing phrase to update speaker profile," and "unlock screen/access application."

For example, the testing module 110 may generate the success GUI 140, as described with reference to FIG. 1. The success GUI 140 may indicate the historical success rates 170. The enrollment module 108 may update the speaker model 176 based on the test phrase audio signal 134 in response to a determination that the speaker verification is successful. The speaker verifier 120 may enable access to an application corresponding to the command associated with the audio command signal 132 in response to a determination that the speaker verification is successful.

The state diagram 300 further includes an authentication failed state, at 314. The authentication failed state 314 includes "repeat testing and lock down device after repeated unsuccessful attempts."

For example, the testing module 110 may generate another test GUI (e.g., the test GUI 128) in response to a determination that the speaker verification is unsuccessful. In a particular aspect, the testing module 110 may block access to applications of the mobile device 102 in response to detecting a particular number of consecutive unsuccessful speaker verification attempts.

The state diagram 300 also includes a liveness test state, at 316. The liveness test state 316 includes "randomly ask user to utter a new phrase unknown to the user and may require a good score for this random phrase."

For example, the liveness test module 112 may generate the liveness test GUI 190, as described with reference to FIG. 1. The liveness test GUI 190 may include the security question 188. In a particular aspect, the security question 188 may prompt the user 152 to utter a new phrase (e.g., a phrase for which a corresponding audio signal from the user was not previously stored in the memory 122 during enrollment). The liveness test module 112 may determine that a liveness test is successful in response to determining that a confidence level of a liveness test phrase signal satisfies a liveness confidence level threshold.

The state diagram 300 also includes a passive enrollment state, at 318. For example, the enrollment module 108 may perform passive enrollment to update the speaker model 176. For example, the enrollment module 108 may receive an audio signal (e.g., the enrollment phrase audio signal 130) corresponding to a speech of the user 152. The audio signal may not be associated with a training session. For example, the audio signal may be received from the user 152 during a call (e.g., a phone call or an internet call).

The state diagram 300 enables a combined approach using active enrollment and passive enrollment. The active enrollment may be based on test phrases that are designed to provide wide phoneme coverage. For example, the test phrases may include phonemes that the user 152 does not generally use in conversation. The passive enrollment may provide convenience to the user and may result in generation of a larger data set with reduced user intervention/interruption. The larger data set may be used to generate a robust speaker model.

Figure 4:
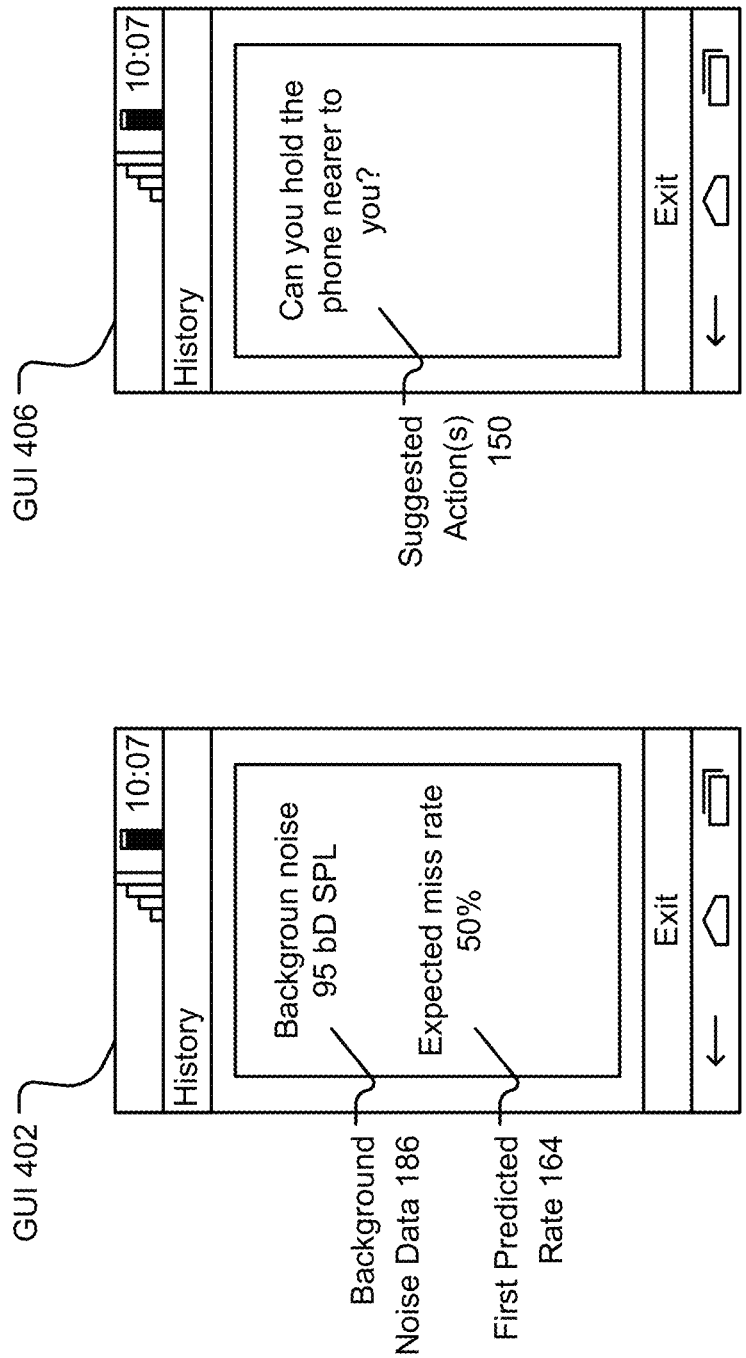
FIG. 4 is a diagram to illustrate particular aspects of graphical user interfaces (GUIs) that may be generated by the system of FIG. 1.

Referring to FIG. 4, particular aspects of graphical user interfaces (GUIs) are shown and generally designated 402 and 406. In a particular aspect, one or more of the GUIs 402 and 406 may be generated by the speaker verifier 120 of FIG. 1.

For example, the speaker verifier 120 may generate the GUI 402, the GUI 406, or both, in response to receiving an audio signal (e.g., the audio command signal 132, test phrase audio signal 134, or the enrollment phrase audio signal 130).

The GUI 402 includes the background noise data 186 of FIG. 1 and the first predicted rate 164 of FIG. 1. As illustrated, the background noise data 186 may correspond to a background noise of 96 decibel (dB) sound pressure level (SPL). For example, the validation module 202 of FIG. 2 may generate the background noise data 186 corresponding to a background noise level detected in the audio command signal 132. The success rate predictor 210 may generate the first predicted rate 164, as described with reference to FIG. 2. In a particular aspect, the first predicted rate 164 may be lower when the background noise level is higher. As illustrated, the first predicted rate 164 may correspond to an expected miss rate of 50 percent. The GUI generator 204 of FIG. 2 may generate the validation GUI 126, as described with reference to FIG. 2. The GUI 402 may correspond to a particular aspect of the validation GUI 126.

The GUI 406 includes the suggested actions 150 of FIG. 1. As illustrated, the suggested actions 150 may include moving closer to a phone (e.g., the mobile device 102). For example, the validation module 202 of FIG. 2 may generate the suggested actions 150 in response to determining that the audio command signal 132 failed to satisfy the validation criterion 142, as described with respect to FIG. 2. To illustrate, the validation module 202 may generate the suggested actions 150 in response to determining that the audio signal (e.g., the audio command signal 132, test phrase audio signal 134, or the enrollment phrase audio signal 130) corresponds to distant speech.

If the audio signal corresponds to speech captured within a particular distance (e.g., approximately 3 feet) from a source (e.g., the user 152) of the speech, the audio signal may exhibit an approximately consistent level offset up to a certain frequency based on a distance from the source to each microphone of the one or more microphones 146. If the audio signal is captured outside the particular distance from the source, the audio signal may not exhibit a consistent level offset. In a particular aspect, the validation module 202 may determine that the audio signal (e.g., the audio command signal 132, test phrase audio signal 134, or the enrollment phrase audio signal 130) corresponds to distant speech in response to determining that the audio signal does not exhibit a consistent level offset.

In a particular aspect, the speaker verifier 120 may determine a holding pattern of the user 152 by utilizing any of a variety of position detection methods, such as an accelerometer, gyrometer, proximity sensor and/or a variance of likelihood given by a two-dimension (2D) anglogram per each holding pattern. Depending on the holding pattern, the validation module 202 may generate the suggested actions 150 to include changing how the mobile device 102 is held by the user 152. In a particular aspect, the validation GUI 126 may indicate whether the user 152 is holding the mobile device 102 appropriately. In a particular aspect, the speaker verifier 120 may select particular microphones of the one or more microphones 146 based on the holding pattern of the user 152. In this aspect, the speaker verifier 120 may perform the speaker verification using signals received from the selected microphones.

The GUI generator 204 of FIG. 2 may generate the validation GUI 126 indicating the suggested actions 150, as described with reference to FIG. 2. The GUI 406 may correspond to the validation GUI 126. As another example, the enrollment module 108 may generate an enrollment validation GUI indicating the suggested actions 150 in response to determining that the enrollment phrase audio signal 130 failed to satisfy the validation criterion 142, as described with reference to FIG. 1. The GUI 406 may correspond to a particular aspect of the enrollment validation GUI.

Figure 5:
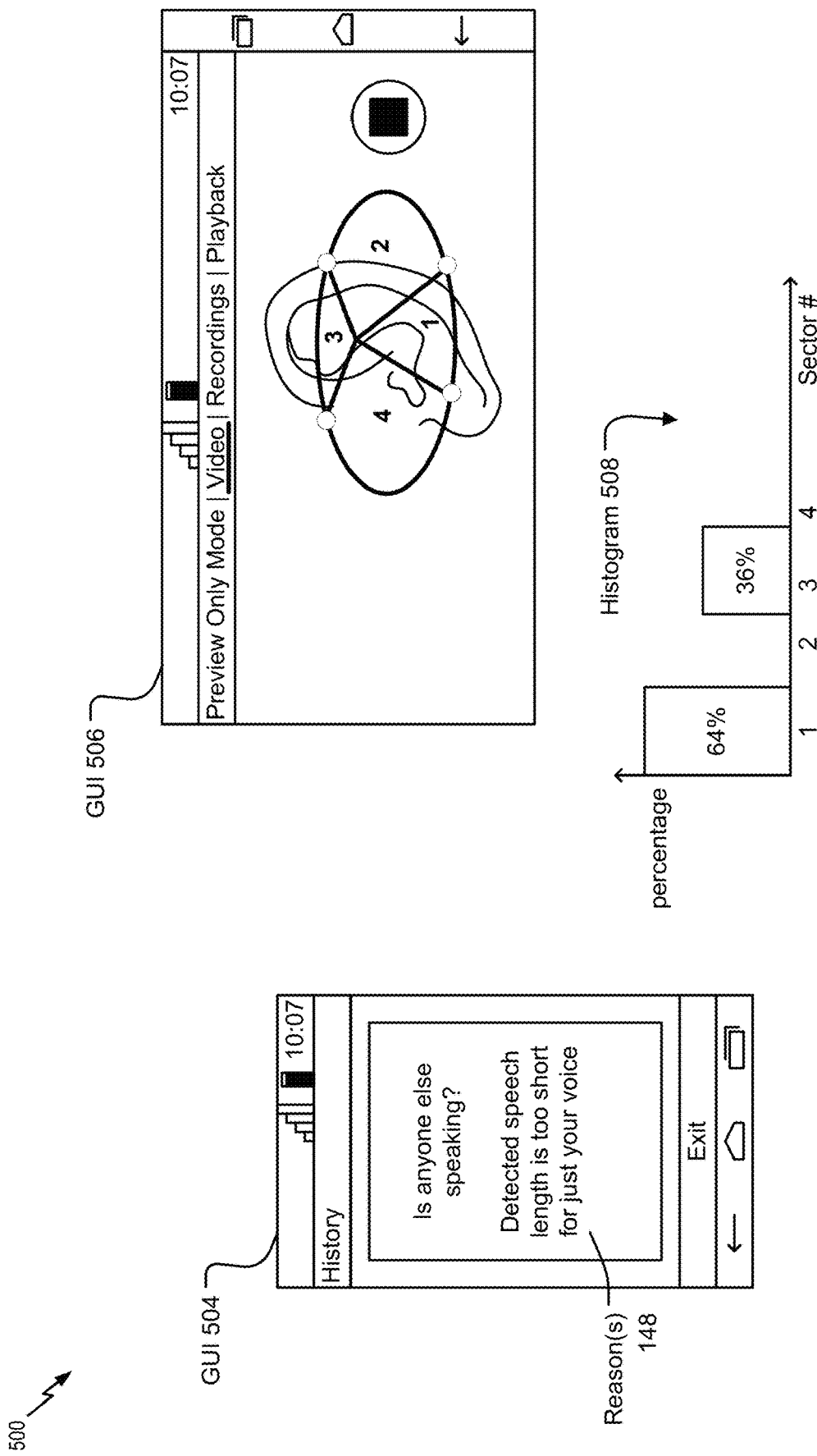
FIG. 5 is a diagram to illustrate particular aspects of graphical user interfaces (GUIs) that may be generated by the system of FIG. 1.

Referring to FIG. 5, particular aspects of graphical user interfaces (GUIs) are shown and generally designated 504 and 506. In a particular aspect, one or more of the GUIs 504 and 506 may be generated by the speaker verifier 120 of FIG. 1.

For example, the speaker verifier 120 may generate the GUI 504, the GUI 506, or both, in response to receiving an audio signal (e.g., the audio command signal 132, test phrase audio signal 134, or the enrollment phrase audio signal 130).

The GUI 504 includes the reasons 148 of FIG. 1. As illustrated, the reasons 148 may correspond to another person speaking, to a length of the audio signal being too short, or both. For example, the validation module 202 of FIG. 2 may generate the reasons 148 in response to determining that the audio command signal 132 failed to satisfy the validation criterion 142, as described with respect to FIG. 2. The GUI generator 204 of FIG. 2 may generate the validation GUI 126 indicating the reasons 148, as described with reference to FIG. 2. The GUI 504 may correspond to a particular aspect of the validation GUI 126. As another example, the enrollment module 108 may generate an enrollment validation GUI indicating the reasons 148 in response to determining that the enrollment phrase audio signal 130 failed to satisfy the validation criterion 142, as described with reference to FIG. 1. The GUI 504 may correspond to a particular aspect the enrollment validation GUI.

In a particular aspect, the speaker verifier 120 may logically partition an area proximate to the mobile device 102 into multiple sectors. Each sector may correspond to a particular angular range relative to the mobile device 102. The speaker verifier 120 may generate the GUI 506 indicating each sector (e.g., sector 1, sector 2, sector 3, and sector 4). The speaker verifier 120 may perform a directional analysis of the audio signal by determining directional sources of sounds received in the audio signal (e.g., the audio command signal 132, test phrase audio signal 134, or the enrollment phrase audio signal 130). For example, a first microphone of the one or more microphones 146 may be closer to a first sector than a second microphone of the one or more microphones 146. The speaker verifier 120 may compare energy levels of signals received from the first microphone and the second microphone. If a first signal from the first microphone has a higher energy level than a second signal from the second microphone, where the first signal and the second signal correspond to a first portion of the audio signal, then the speaker verifier 120 may determine that a first source of the first portion is in the first sector.

In a particular aspect, the audio signal (e.g., the audio command signal 132, test phrase audio signal 134, or the enrollment phrase audio signal 130) may correspond to a multichannel signal. The speaker verifier 120 may calculate, for each of a plurality of different frequency components of the multichannel signal, a difference between a phase of the frequency component in each of a first pair of channels of the multichannel signal, to obtain a plurality of phase differences. The speaker verifier 120 may estimate an error, for each of a plurality of candidate directions, between the candidate direction and a vector that is based on the plurality of phase differences. The speaker verifier 120 may select, from among the plurality of candidate directions, a candidate direction that corresponds to the minimum among the estimated errors. The one or more microphones 146 may include a first pair of microphones. Each of the first pair of channels may be based on a signal produced by a corresponding one of the first pair of microphones.

In a particular aspect, the speaker verifier 120 may determine directionality of speech corresponding to the audio signal (e.g., the audio command signal 132, test phrase audio signal 134, or the enrollment phrase audio signal 130) based on an anglogram. Directionality may refer to a metric that indicates likelihoods that a source of an audio signal is located at a particular direction relative to the mobile device 102. The anglogram may indicate likelihoods that speech is occurring over a range of angles (e.g., a direction of arrival) over time. The speaker verifier 120 may select a particular sector as a source of the speech based on the likelihoods provided by the anglogram. The audio signal corresponding to speech of the user 152 may be more directional than distributed noise when the user 152 speaks within a particular distance (e.g., approximately 3 feet) of the mobile device 102 (or the one or more microphones 146).

The speaker verifier 120 may perform the directional analysis on a frame-by-frame basis (e.g., for every $n^{th}$ frame of the audio signal). The speaker verifier 120 may generate a histogram 508 indicating results of the directional analysis. For example, the speaker verifier 120 may determine that a first percentage (e.g., 64%) of the sounds (e.g., frames) have one or more directional sources in a first sector (e.g., sector 1) and that a remaining percentage (e.g., 36%) of the sounds have one or more directional sources in a second sector (e.g., sector 3). In a particular aspect, the GUI 506 may include the histogram 508. The GUI 504 and the GUI 506 may correspond to particular aspects of the validation GUI 126, the enrollment GUI 184, the test GUI 128, or a combination thereof.

Figure 6:
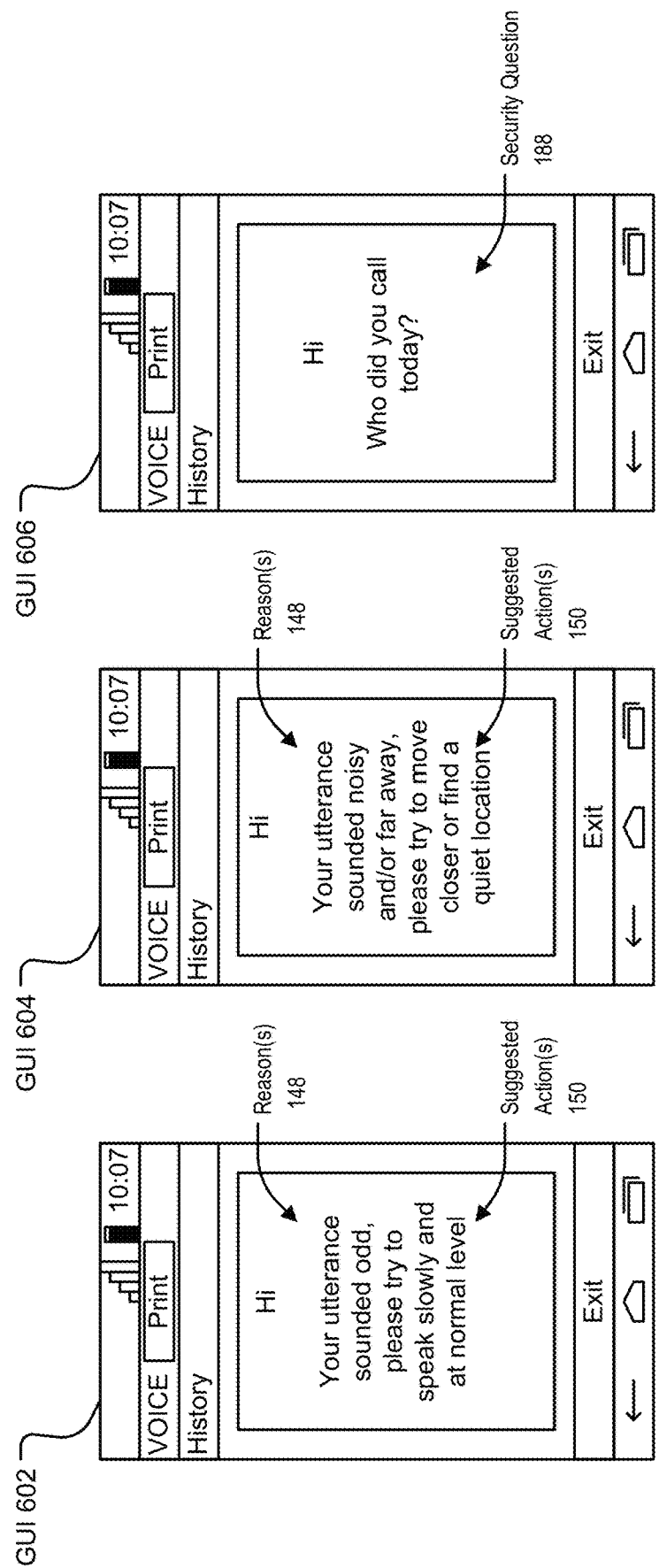
FIG. 6 is a diagram to illustrate particular aspects of graphical user interfaces (GUIs) that may be generated by the system of FIG. 1.

Referring to FIG. 6, particular aspects of graphical user interfaces (GUIs) are shown and generally designated 602, 604, and 606. In a particular aspect, one or more of the GUIs 602, 604, and 606 may be generated by the speaker verifier 120 of FIG. 1.

For example, the speaker verifier 120 may generate the GUI 602, the GUI 604, the GUI 606, or a combination thereof, in response to receiving an audio signal (e.g., the audio command signal 132, test phrase audio signal 134, the enrollment phrase audio signal 130, or a combination thereof). The GUI 602 includes the reasons 148 and the suggested actions 150. As illustrated, the reasons 148 may include an utterance corresponding to the audio signal sounding odd and the suggested actions 150 may include speaking slowly and at a normal level.

In a particular aspect, the validation module 202 of FIG. 2 may generate the reasons 148 and the suggested actions 150 in response to determining that the audio command signal 132 failed to satisfy the validation criterion 142, as described with respect to FIG. 2. The GUI generator 204 of FIG. 2 may generate the validation GUI 126 indicating the reasons 148 and the suggested actions 150, as described with reference to FIG. 2. The GUI 602 may correspond to the validation GUI 126. As another example, the enrollment module 108 may generate an enrollment validation GUI indicating the reasons 148 and the suggested actions 150 in response to determining that the enrollment phrase audio signal 130 failed to satisfy the validation criterion 142, as described with reference to FIG. 1. The GUI 602 may correspond to the enrollment validation GUI.

The GUI 604 illustrates that the reasons 148 may include an utterance corresponding to the audio signal sounding noisy, far away, or both and that the suggested actions 150 may include moving closer (e.g., to the mobile device 102) and may include moving to a quiet location.

The GUI 606 includes the security question 188. As illustrated, the security question 188 may include who the user 152 called on a particular day. In a particular aspect, the liveness test module 112 may generate the liveness test GUI 190 indicating the security question 188, as described with reference to FIG. 1. The GUI 606 may correspond to the liveness test GUI 190.

Figure 7:
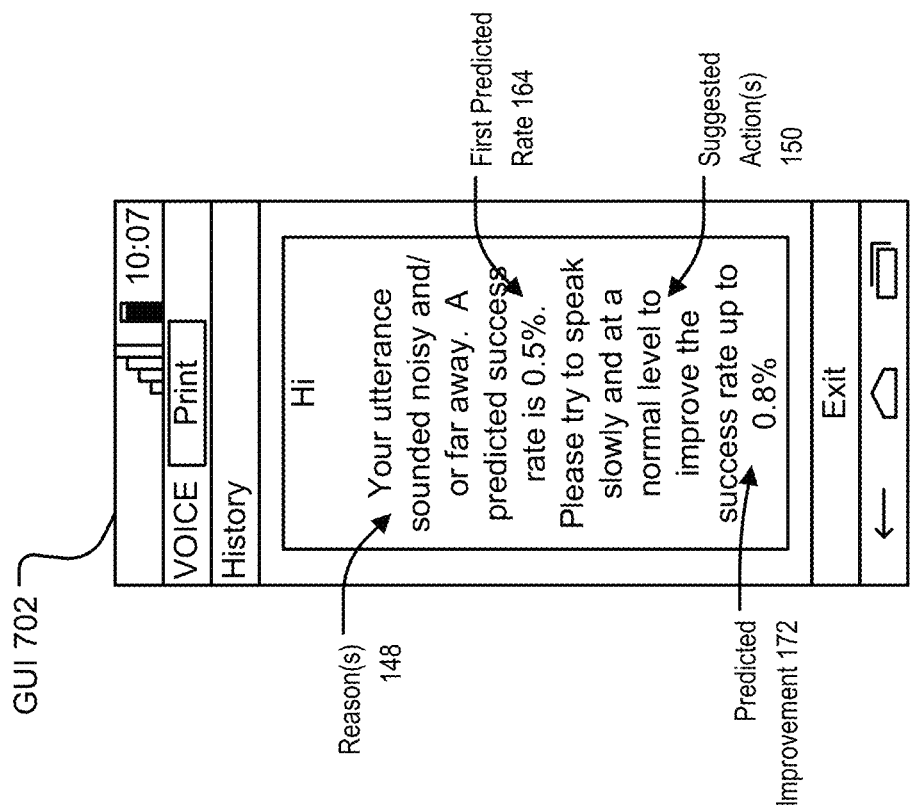
FIG. 7 is a diagram to illustrate another particular aspect of a graphical user interface (GUI) that may be generated by the system of FIG. 1.

Referring to FIG. 7, a particular aspect of a graphical user interface (GUI) is shown and generally designated 702. In a particular aspect, the GUI 702 may be generated by the speaker verifier 120 of FIG. 1.

The GUI 702 includes the reasons 148, the first predicted rate 164, the suggested actions 150, and the predicted improvement 162. In a particular aspect, the GUI 702 may correspond to the validation GUI 126. In an alternative aspect, the GUI 702 may correspond to the enrollment GUI 184.

Figure 8:
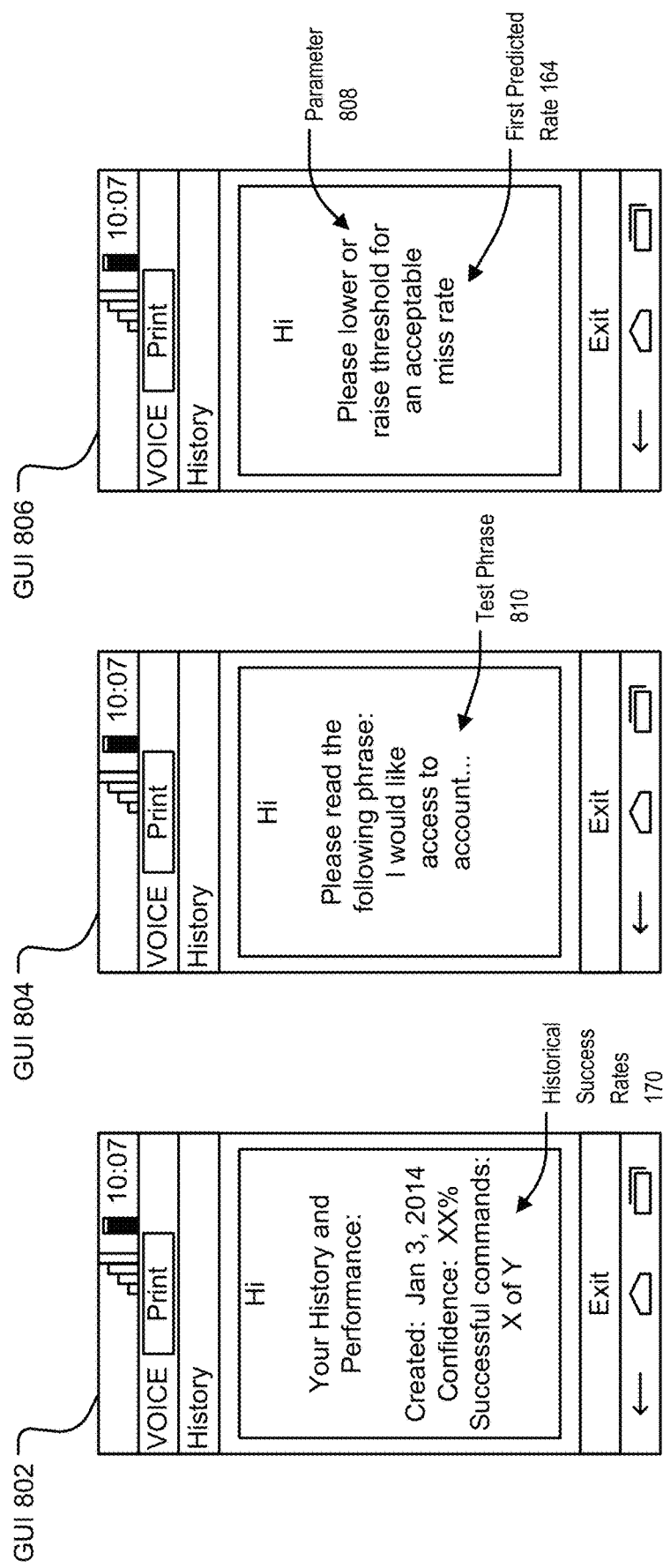
FIG. 8 is a diagram to illustrate particular aspects of graphical user interfaces (GUIs) that may be generated by the system of FIG. 1.

Referring to FIG. 8, particular aspects of graphical user interfaces (GUIs) are shown and generally designated 802, 804, and 806. In a particular aspect, one or more of the GUIs 802, 804, and 806 may be generated by the speaker verifier 120 of FIG. 1.

The GUI 802 includes the historical success rates 170. As illustrated, the historical success rates 170 may indicate an overall confidence level, a first number of successful commands (or speaker verifications), and a second number of attempted commands (or speaker verifications). In a particular aspect, the testing module 110 may generate the success GUI 140 to indicate the historical success rates 170, as described with reference to FIG. 1. The GUI 802 may correspond to the success GUI 140.

The GUI 804 includes a test phrase 810. In a particular aspect, the testing module 110 of FIG. 1 may generate the test GUI 128 indicating a test phrase, as described with reference to FIG. 1. The GUI 804 may correspond to the test GUI 128.

The GUI 806 indicates a parameter 808 and a first predicted rate 164. As illustrated, the parameter 808 may correspond to a threshold and the first predicted rate 164 may correspond to an acceptable miss rate. The parameter 808 may correspond to the security level 158, the confidence level threshold 160, or both. In a particular aspect, the GUI generator 204 of FIG. 2 may generate the validation GUI 126 to indicate that modifying a value of a parameter (e.g., the security level 158, the confidence level threshold 160, or both) of the speaker verification may change the first predicted rate 164, as described with reference to FIG. 2. The GUI 806 may correspond to the validation GUI 126.

Figure 9:
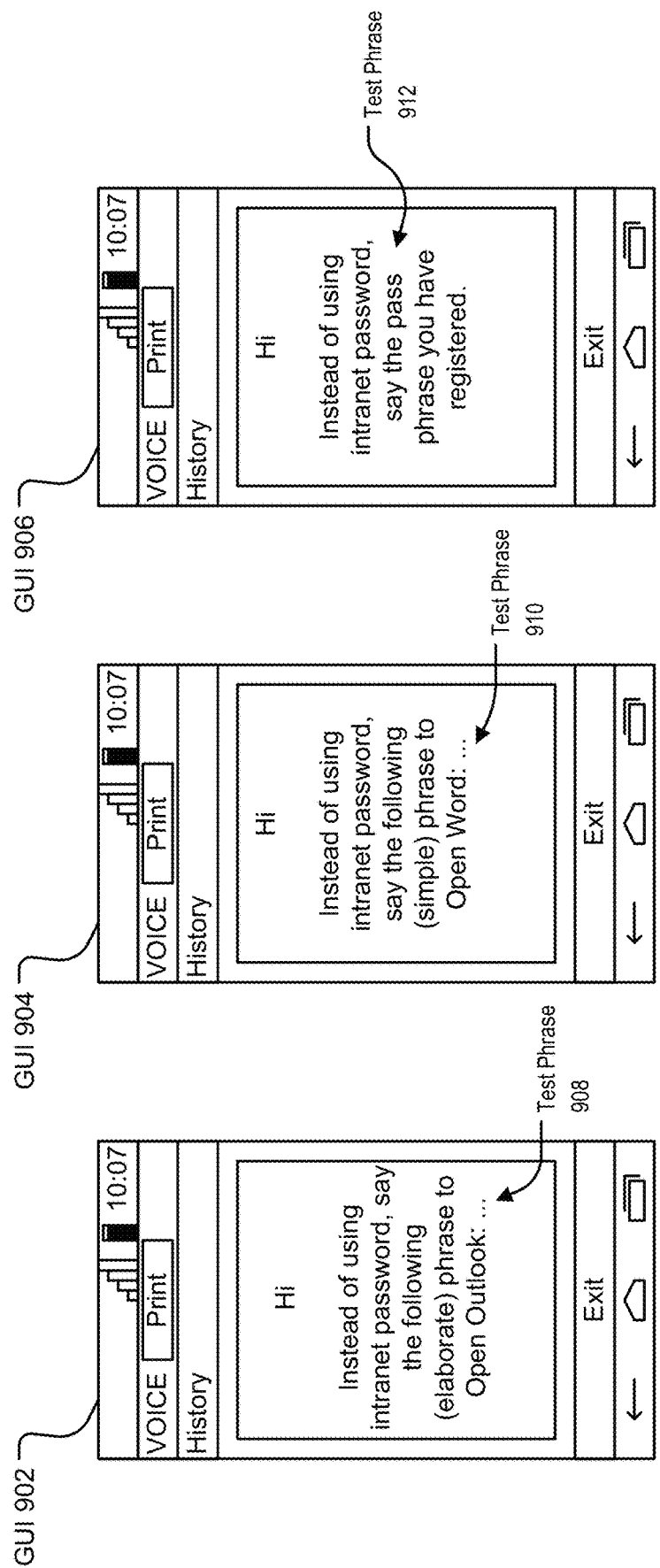
FIG. 9 is a diagram to illustrate particular aspects of graphical user interfaces (GUIs) that may be generated by the system of FIG. 1.

Referring to FIG. 9, particular aspects of graphical user interfaces (GUIs) are shown and generally designated 902, 904, and 906. In a particular aspect, one or more of the GUIs 902, 904, and 906 may be generated by the speaker verifier 120 of FIG. 1.

The GUI 902 includes a test phrase 908, the GUI 904 includes the test phrase 910, and the GUI 906 includes the test phrase 912. As illustrated, the test phrase 908 may include an elaborate phrase, the test phrase 910 may include a simple phrase, and the test phrase 912 may include a previously registered phrase.

In a particular aspect, the testing module 110 may generate the test GUI 128 indicating a test phrase, as described with reference to FIG. 1. Each of the GUIs 902, 904, and 906 may correspond to the test GUI 128. The testing module 110 may generate the test phrase based on a security level 158 associated with an identified command, as described with reference to FIG. 1. For example, the testing module 110 may generate an elaborate test phrase (e.g., the test phrase 908) when the security level 158 associated with the identified command (e.g., access a mail client) corresponds to a high level of security. As another example, the testing module 110 may generate a simple test phrase (e.g., the test phrase 910) when the security level 158 associated with the identified command (e.g., access a word processing application) corresponds to a medium level of security. As a further example, the testing module 110 may generate a test phrase previously provided by the authorized user corresponding to the speaker model 176 when the security level 158 associated with the identified command corresponds to a critical level of security.

In a particular aspect, the testing module 110 may generate the test phrase, adjust the confidence level threshold 160, or both, based on a detected acoustic environment. For example, the speaker verifier 120 may detect a noisy acoustic environment (e.g., a background noise level that satisfies a particular noise threshold). In response to detecting the noisy acoustic environment, the testing module 110 may generate a simple test phrase, lower the confidence level threshold 160, or both. Alternatively, in response to detecting a quiet environment (e.g., a background noise level that fails to satisfy the particular noise threshold), the testing module 110 may generate an elaborate test phrase, increase the confidence level threshold 160, or both.

Figure 10:
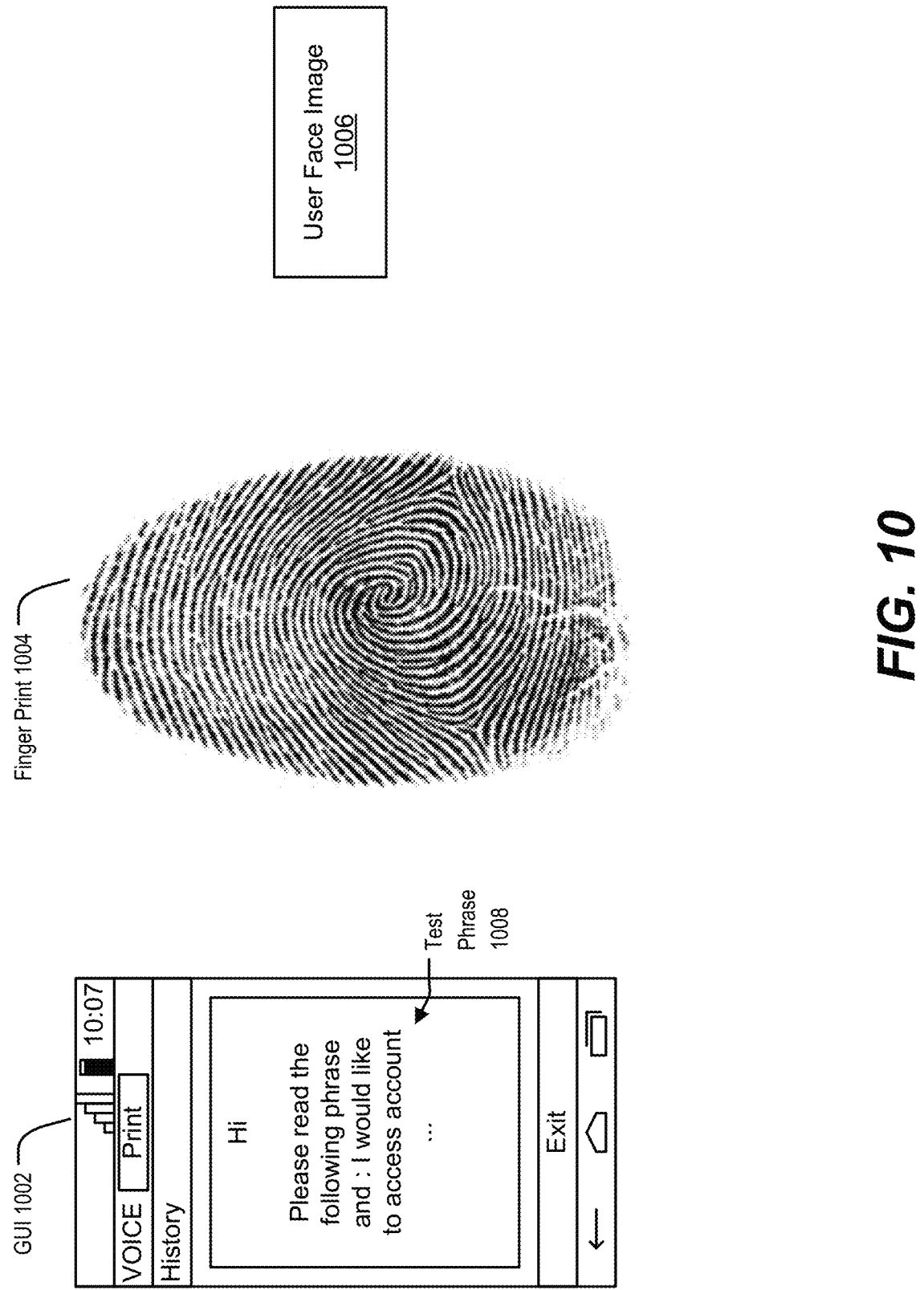
FIG. 10 is a diagram to illustrate another particular aspect of a graphical user interface (GUI) that may be generated by the system of FIG. 1.

Referring to FIG. 10, a diagram of a particular aspect of a graphical user interface (GUI) is shown and generally designated 1002. In a particular aspect, the GUI 1002 may be generated by the speaker verifier 120 of FIG. 1.

The GUI 1002 includes a test phrase 1008 and prompts the user 152 to provide a finger print 1004 and a user face image 1006. In a particular aspect, the speaker verifier 120 may generate the alternative modality GUI 192 prompting the user 152 to provide other authentication data (e.g., a finger print, an iris scan, an image of a face, or a combination thereof), as described with reference to FIG. 1. The GUI 1002 may correspond to the alternative modality GUI 192.

Figure 11:
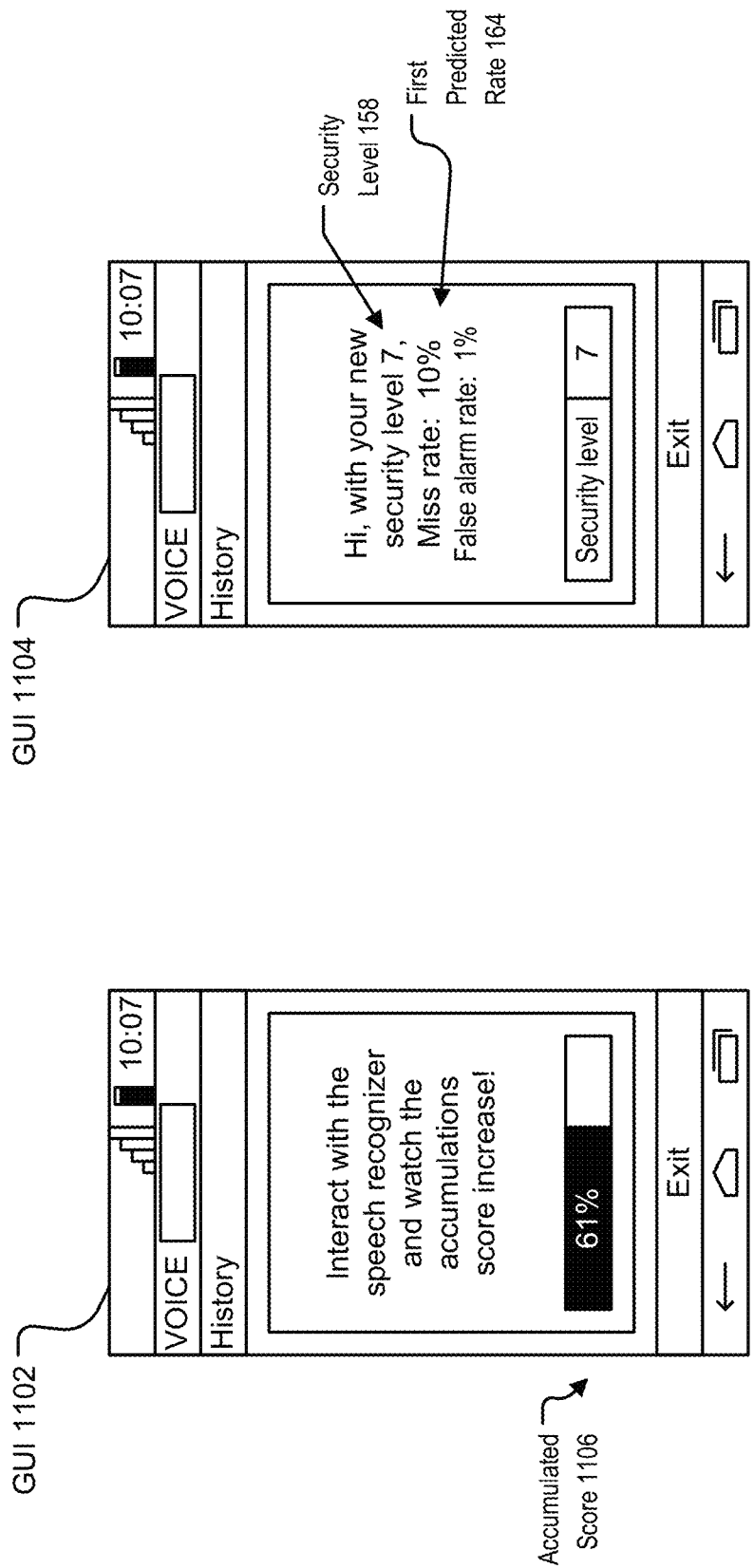
FIG. 11 is a diagram to illustrate particular aspects of graphical user interfaces (GUIs) that may be generated by the system of FIG. 1.

Referring to FIG. 11, a diagram of particular aspects of graphical user interfaces (GUIs) are shown and generally designated 1102 and 1104. In a particular aspect, the speaker verifier 120 of FIG. 1 may generate one or more of the GUIs 1102 and 1104.

The GUI 1102 includes an accumulated score 1106. The GUI 1104 includes the security level 158 (e.g., 7) and the first predicted rate 164 (e.g., a miss rate of 10 percent and a false alarm rate of 1 percent).

In a particular aspect, the configuration module 182 may generate the configuration GUI 194 indicating the historical success rates 170, the first predicted rate 164, or both. The accumulated score 1106 may correspond to the historical success rates 170, the first predicted rate 164, or both. The GUI 1102 may correspond to the configuration GUI 194. In a particular aspect, the accumulated score 1106 may be calculated by:

$$\text{Accumulated Score} = \text{Accumulated Score} * (1-\alpha) + \alpha * \text{likelihood}, \quad \text{Equation 1}$$

where likelihood corresponds to the first predicted rate 164.

For example, the accumulated score 1106 may correspond to the first predicted rate 164. A greater coverage of a phoneme map by the speaker model 176 may correspond to a first (e.g., higher) value of the first predicted rate 164 and a lower coverage of the phoneme map by the speaker model 176 may correspond to a second (e.g., lower) value of the first predicted rate 164. The configuration GUI 194 may enable the user 152 to observe a relationship between the phoneme coverage and the predicted success rate.

In a particular aspect, the configuration module 182 may generate the GUI 1104 indicating the security level 158 and the first predicted rate 164, as described with reference to FIG. 1. The GUI 1104 may correspond to a particular aspect of the configuration GUI 194.

The user 152 may be motivated to provide additional enrollment phrases via the enrollment GUI 184, to modify parameters of the speaker verification via the configuration GUI 194, or both, to increase the accumulated score 1106, to change the first predicted rate 164, or both.

Figure 12:
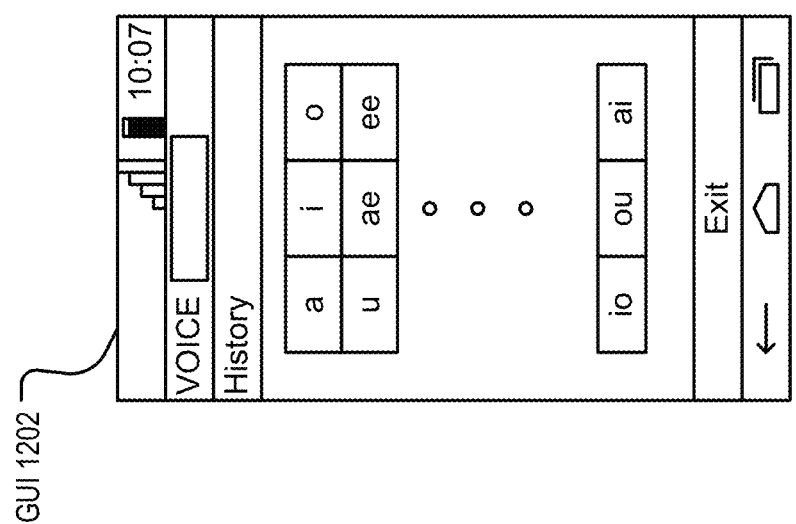
FIG. 12 is a diagram to illustrate another particular aspect of a graphical user interface (GUI) that may be generated by the system of FIG. 1.

Referring to FIG. 12, a diagram of a particular aspect of a graphical user interface (GUI) is shown and generally designated 1202. In a particular aspect, the speaker verifier 120 of FIG. 1 may generate the GUI 1202.

The GUI 1202 indicates a phoneme (or articulation) coverage of the speaker model 176. A relative coverage of the phonemes may be indicated by a font, a color, or a shade associated with each phoneme. For example, a darker shade of "a" may indicate higher coverage than a lighter shade of "ai". In a particular aspect, an order that each phoneme is displayed may indicate the relative coverage. For example, a phoneme displayed near a top of the GUI 1202 may indicate higher coverage than another phoneme displayed near a bottom of the GUI 1202.

The configuration module 182 may generate the configuration GUI 194 indicating the phoneme coverage of the speaker model 176, as described with reference to FIG. 1. The GUI 1202 may correspond to the configuration GUI 194.

Figure 13:
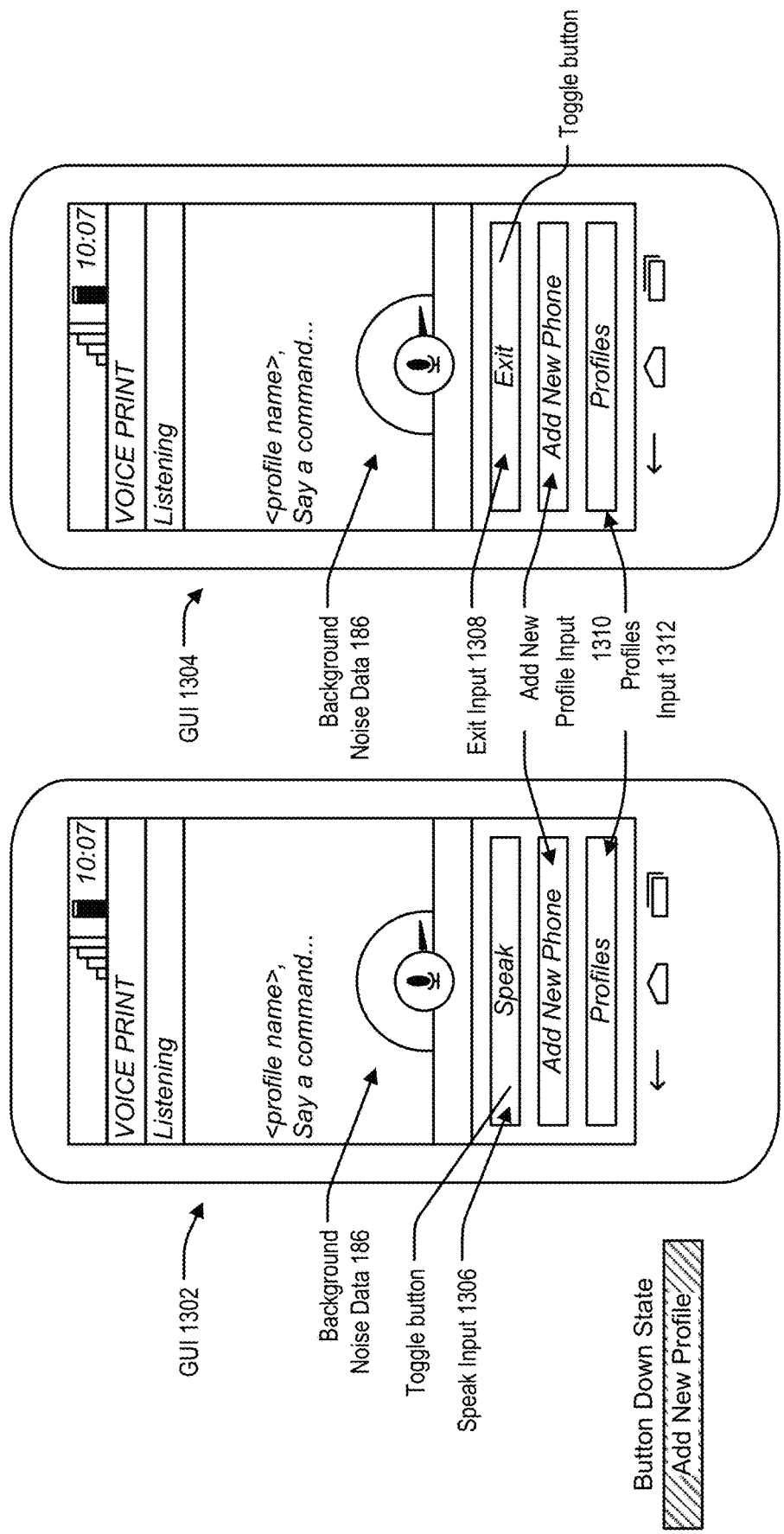
FIG. 13 is a diagram to illustrate particular aspects of graphical user interfaces (GUIs) that may be generated by the system of FIG. 1.

Referring to FIG. 13, diagrams of particular aspects of graphical user interfaces (GUIs) are shown and generally designated 1302 and 1304. In a particular aspect, the speaker verifier 120 of FIG. 1 may generate one or more of the GUIs 1302 and 1304.

For example, the user 152 may select a speaker verification icon displayed at a display of the mobile device 102. The speaker verifier 120 may generate the GUI 1302 in response to receiving a selection of the speaker verification icon. The GUI 1302 may prompt the user 152 to say a command. The GUI 1302 may include the background noise data 186 indicating a level of background noise detected by the speaker verifier 120. The GUI 1302 may include a speak input 1306, an add new profile input 1310, and a profiles input 1312.

In response to receiving a selection of the speak input 1306, the speech validator 106 of FIG. 1 may begin receiving the audio command signal 132 and may display the GUI 1304. The GUI 1304 includes an exit input 1308, the add new profile input 1310, the profiles input 1312, and the background noise data 186. In response to receiving a selection of the exit input 1308, the speech validator 106 may finish receiving the audio command signal 132.

In a particular aspect, the mobile device 102 may substantially continuously receive an input audio signal via the one or more microphones 146. In a particular aspect, the mobile device 102 may substantially continuously receive the input audio signal while the speaker verifier 120 is activated, while a particular GUI (e.g., the validation GUI 126, the test GUI 128, the enrollment GUI 184, the liveness test GUI 190, the GUI 1302, and/or the GUI 1304) is displayed, or a combination thereof. In response to receiving the selection of the speak input 1306, the speaker verifier 120 may identify a starting point of the audio command signal 132 in the input audio signal. In response to receiving the selection of the exit input 1308, the speaker verifier 120 may identify an end point of the audio command signal 132 in the input audio signal. The speaker verifier 120 may copy a portion of the input audio signal corresponding to the audio command signal 132 in the memory 122.

In response to receiving (e.g., finish receiving) the audio command signal 132, the speech validator 106 may generate the validation GUI 126 or the test GUI 128, as described with reference to FIGS. 1, 2, 13, and 14. For example, the testing module 110 may generate the test GUI 128 in response to a determination that the audio command signal 132 satisfies the validation criterion 142, as described with reference to FIG. 1. As another example, the speech validator 106 may generate the validation GUI 126 in response to determining that the audio command signal 132 fails to satisfy the validation criterion 142, as described with reference to FIG. 2.

In response to receiving a selection of the add new profile input 1310, the enrollment module 108 may generate the enrollment GUI 184, as described with reference to FIGS. 1 and 16. In response to receiving a selection of the profiles input 1312, the configuration module 182 may generate the configuration GUI 194 indicating an icon associated with each speaker model (e.g., the speaker model 176) or with each authorized user associated with a speaker model, as described with reference to FIG. 18. In response to a selection of a particular icon associated with a particular speaker model (e.g., the speaker model 176), the configuration module 182 may generate the configuration GUI 194 corresponding to the speaker model 176, as described with reference to FIGS. 1 and 17.

Figure 14:
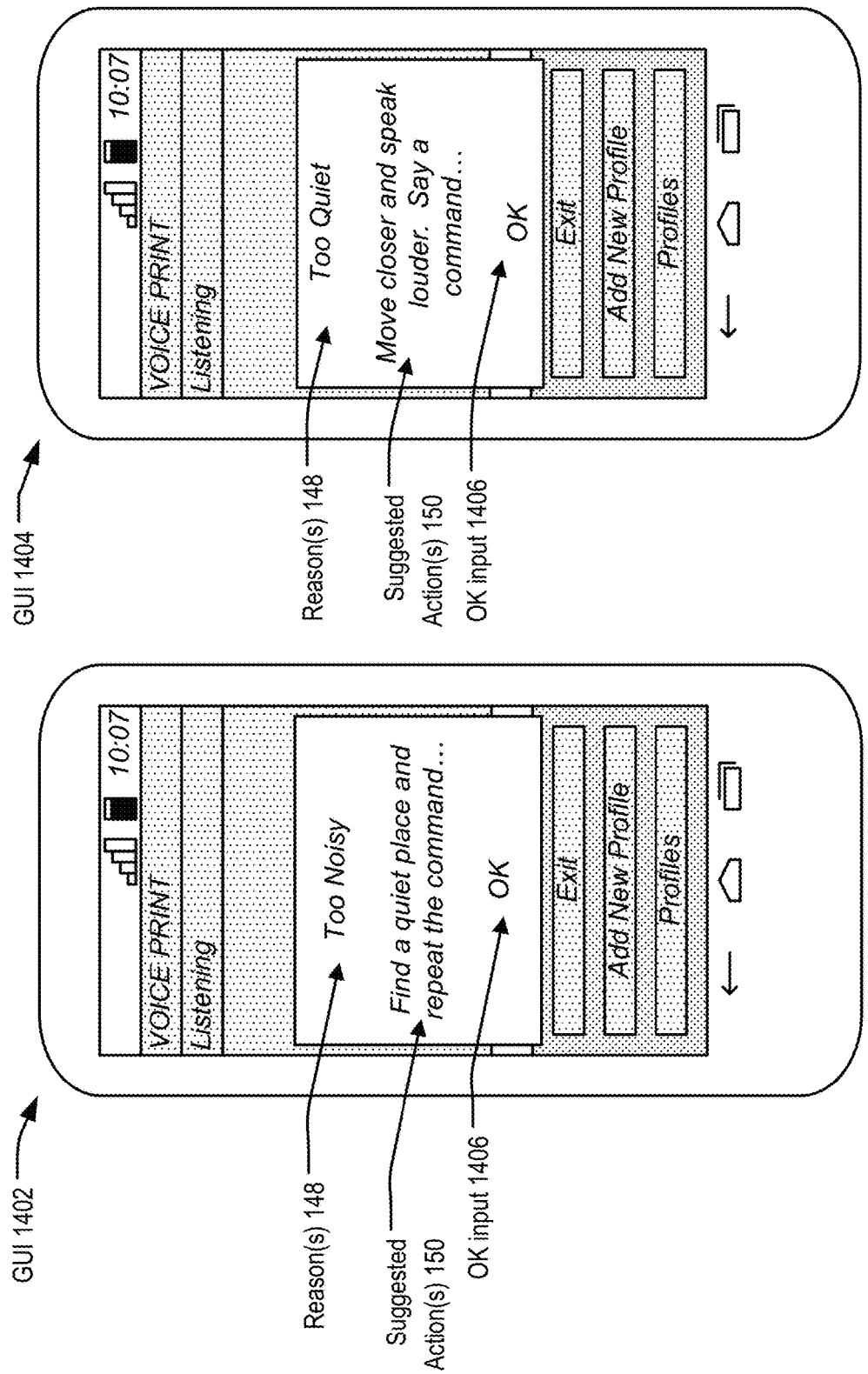
FIG. 14 is a diagram to illustrate particular aspects of graphical user interfaces (GUIs) that may be generated by the system of FIG. 1.

Referring to FIG. 14, diagrams of particular aspects of graphical user interfaces (GUIs) are shown and generally designated 1402 and 1404. In a particular aspect, one or more of the GUIs 1402 and 1404 may be generated by the speaker verifier 120.

For example, the speech validator 106 may generate the GUI 1402 or the GUI 1404 in response to determining that the audio command signal 132 fails to satisfy the validation criterion 142. Each of the GUIs 1402 and 1404 may correspond to particular aspects of the validation GUI 126 of FIG. 1. For example, the GUIs 1402 and 1404 may include the reasons 148 and the suggested actions 150. As illustrated, the reasons 148 may include too noisy or too quiet and the suggested actions 150 may include find a quiet place, move closer (e.g., to the mobile device 102), speak louder, or a combination thereof.

The user 152 of FIG. 1 may select an OK input 1406 of the GUI 1402 or the GUI 1404. For example, the user 152 may perform the suggested actions 150 prior to or subsequent to selecting the OK input 1406. In response to receiving the selection of the OK input 1406, the speech validator 106 may generate the validation GUI 126 of FIG. 1 (e.g., the GUI 1302 or the GUI 1304 of FIG. 2).

Figure 15:
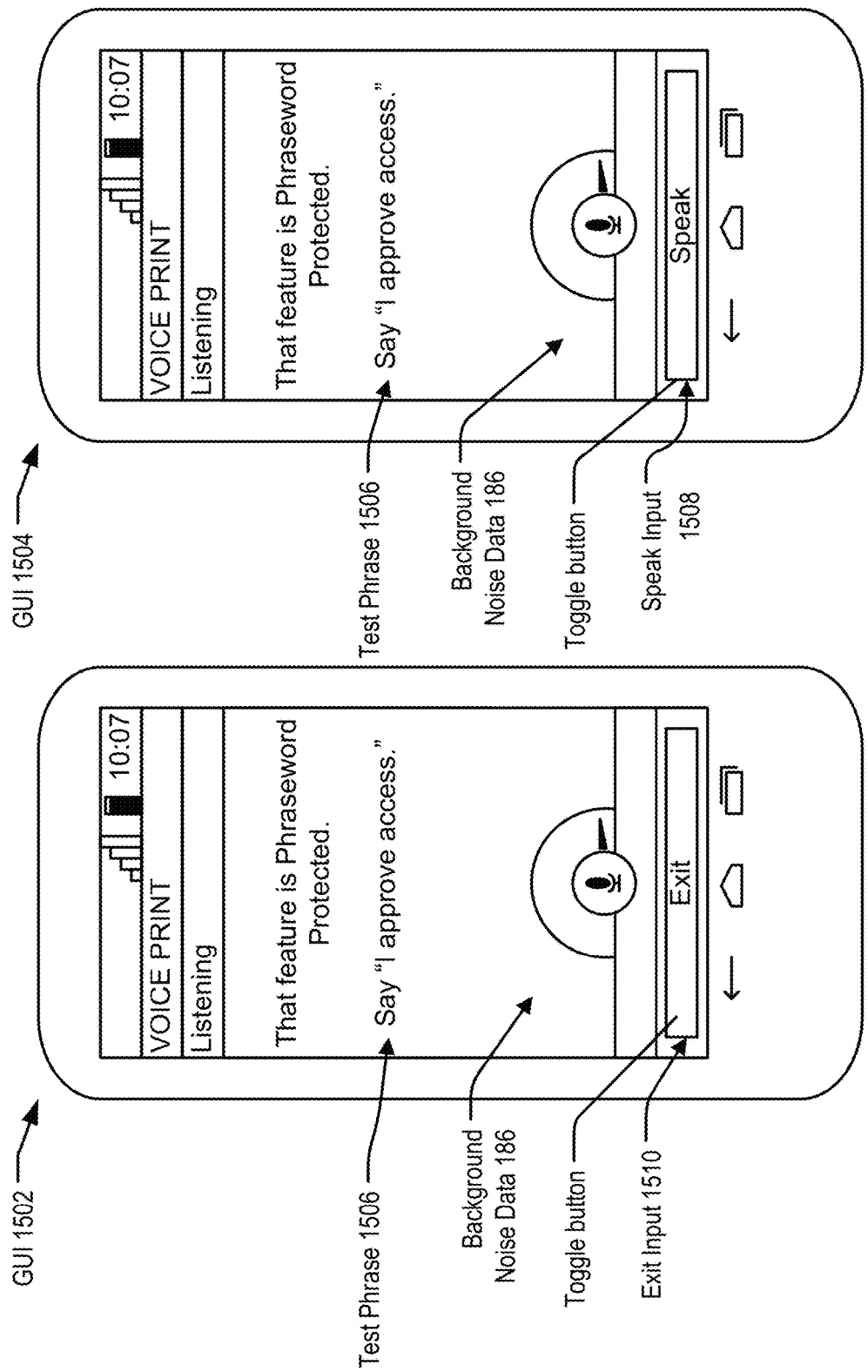
FIG. 15 is a diagram to illustrate particular aspects of graphical user interfaces (GUIs) that may be generated by the system of FIG. 1.

Referring to FIG. 15, diagrams of particular aspects of graphical user interfaces (GUIs) are shown and generally designated 1502 and 1504. In a particular aspect, the speaker verifier 120 of FIG. 1 may generate one or more of the GUIs 1502 and 1504.

For example, the testing module 110 may generate the GUI 1504 in response to a determination that the audio command signal 132 satisfies the validation criterion 142, as described with reference to FIG. 1. The GUIs 1502 and 1504 may correspond to particular aspects of the test GUI 128. For example, the GUI 1504 may include a test phrase 1506 and the background noise data 186. The GUI 1504 may include a speak input 1508. In response to receiving a selection of the speak input 1508, the testing module 110 may begin receiving the test phrase audio signal 134 and the testing module 110 may generate and display the GUI 1502. The GUI 1502 may include the test phrase 1506 and the background noise data 186. The GUI 1502 may include an exit input 1510. In response to receiving a selection of the exit input 1510, the testing module 110 may finish receiving the test phrase audio signal 134.

In a particular aspect, the mobile device 102 may substantially continuously receive an input audio signal, as described with reference to FIG. 13. The speaker verifier 120 may identify a beginning point of the test phrase audio signal 134 in the input audio signal in response to receiving a selection of the speak input 1508. The speaker verifier 120 may identify an end point of the test phrase audio signal 134 in the input audio signal in response to receiving a selection of the exit input 1510. The speaker verifier 120 may copy a portion of the input audio signal corresponding to the test phrase audio signal 134 in the memory 122.

In response to receiving (e.g., finish receiving) the test phrase audio signal 134, the testing module 110 may determine whether the test phrase audio signal 134 satisfies the verification criterion 144, as described with reference to FIG. 1. The testing module 110 may generate the success GUI 140 in response to determining that the test phrase audio signal 134 satisfies the verification criterion 144, as described with reference to FIGS. 1 and 15.

Figure 16:
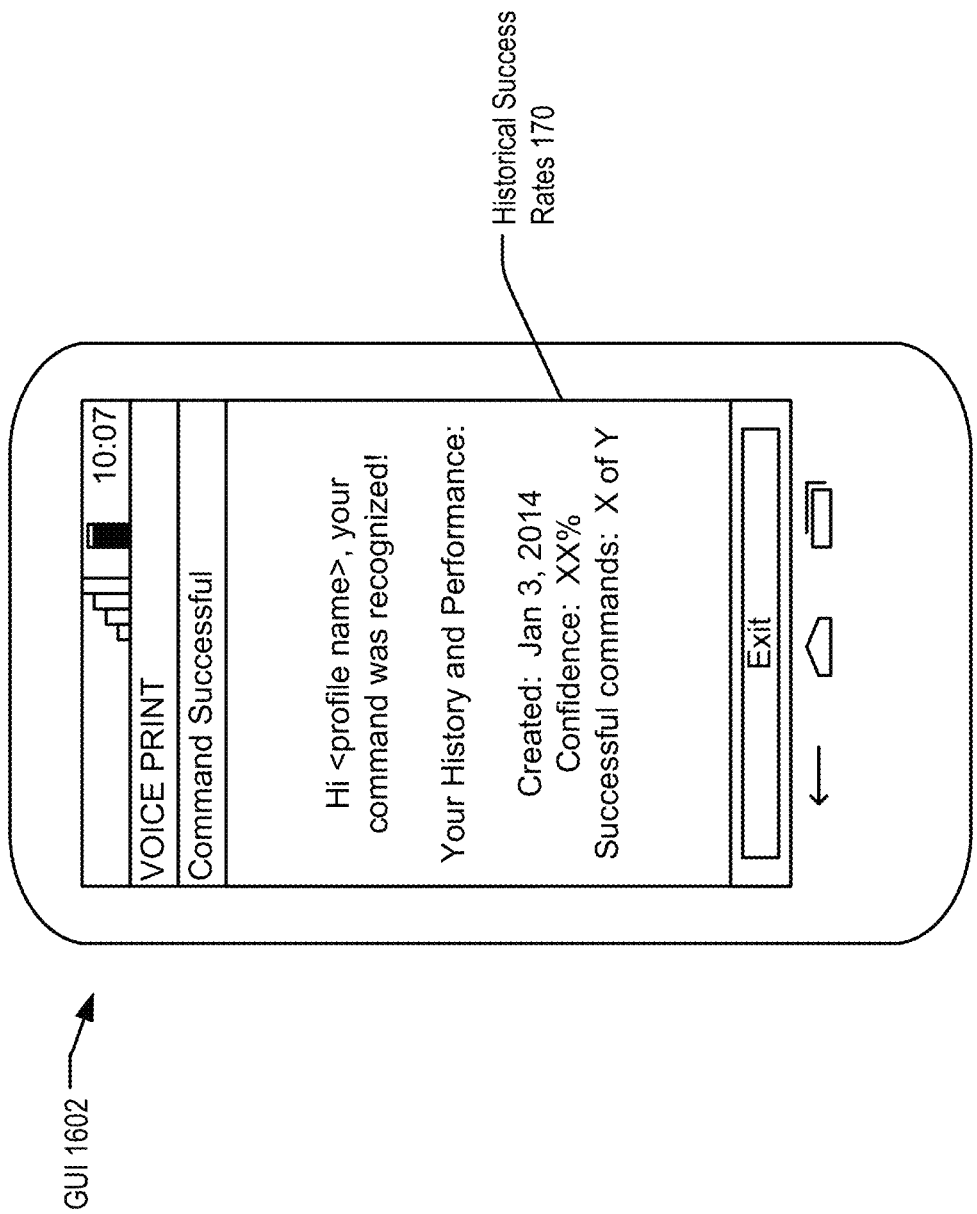
FIG. 16 is a diagram to illustrate another particular aspect of a graphical user interface (GUI) that may be generated by the system of FIG. 1.

Referring to FIG. 16, a diagram of a particular aspect of a graphical user interface (GUI) is shown and generally designated 1602. In a particular aspect, the speaker verifier 120 of FIG. 1 may generate the GUI 1602.

For example, the testing module 110 may generate the GUI 1602 in response to determining that the test phrase audio signal 134 satisfies the verification criterion 144. The GUI 1602 may correspond to a particular aspect of the success GUI 140. For example, the GUI 1602 indicates that the speaker verification is successful and includes the historical success rates 170.

Figure 17:
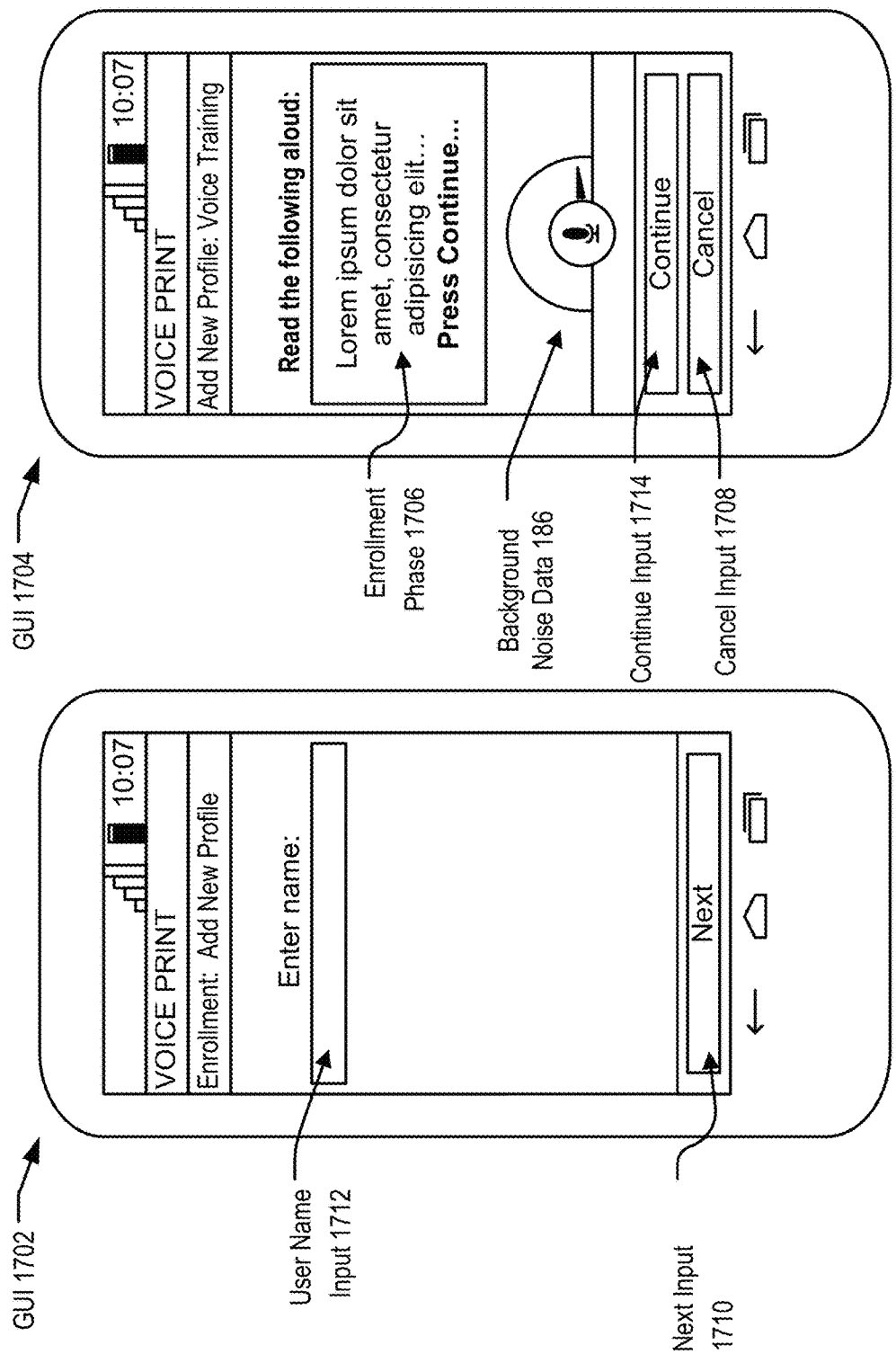
FIG. 17 is a diagram to illustrate particular aspects of graphical user interfaces (GUIs) that may be generated by the system of FIG. 1.

Referring to FIG. 17, diagrams of particular aspects of graphical user interfaces (GUIs) are shown and generally designated 1702 and 1704. In a particular aspect, the speaker verifier 120 of FIG. 1 may generate one or more of the GUIs 1702 and 1704.

For example, the user 152 may select an enrollment icon displayed at a display of the mobile device 102. In response to receiving the selection of the enrollment icon, the enrollment module 108 may generate the GUI 1702. The GUI 1702 and the GUI 1704 may correspond to a particular aspect of the enrollment GUI 184. The GUI 1702 may include a user name input 1712. The user 152 may enter a profile name (e.g., a user name or another identifier) in the user name input 1712 and may select a next input 1710 of the GUI 1702. In response to receiving a selection of the next input 1710, the enrollment module 108 may generate the GUI 1704 and may store the profile name in the memory 122. The enrollment module 108 may provide the GUI 1704 to the display of the mobile device 102 and may begin receiving the enrollment phrase audio signal 130.

The GUI 1704 includes an enrollment phrase 1706, the background noise data 186, a continue input 1714, and a cancel input 1708. The user 152 may speak the enrollment phrase 1706 and may select the continue input 1714. The enrollment module 108 may finish receiving the enrollment phrase audio signal 130 in response to a selection of the continue input 1714. In a particular aspect, the mobile device 102 may substantially continuously receive an audio input signal. In this aspect, the speaker verifier 120 may identify a beginning point of the enrollment phrase audio signal 130 in response to receiving the selection of the next input 1710 and may identify an end point of the enrollment phrase audio signal 130 in response to receiving the selection of the continue input 1714. The speaker verifier 120 may copy a portion of the audio input signal corresponding to the enrollment phrase audio signal 130 in the memory 122. The portion of the audio input signal may be identified based on the beginning point and the end point. In a particular aspect, the mobile device 102 may deactivate (or exit) the speaker verifier 120 in response to receiving a selection of the cancel input 1708.

The enrollment module 108 may generate (or update) the speaker model 176 corresponding to the profile name in response to receiving the enrollment phrase audio signal 130, as described with reference to FIG. 1.

Figure 18:
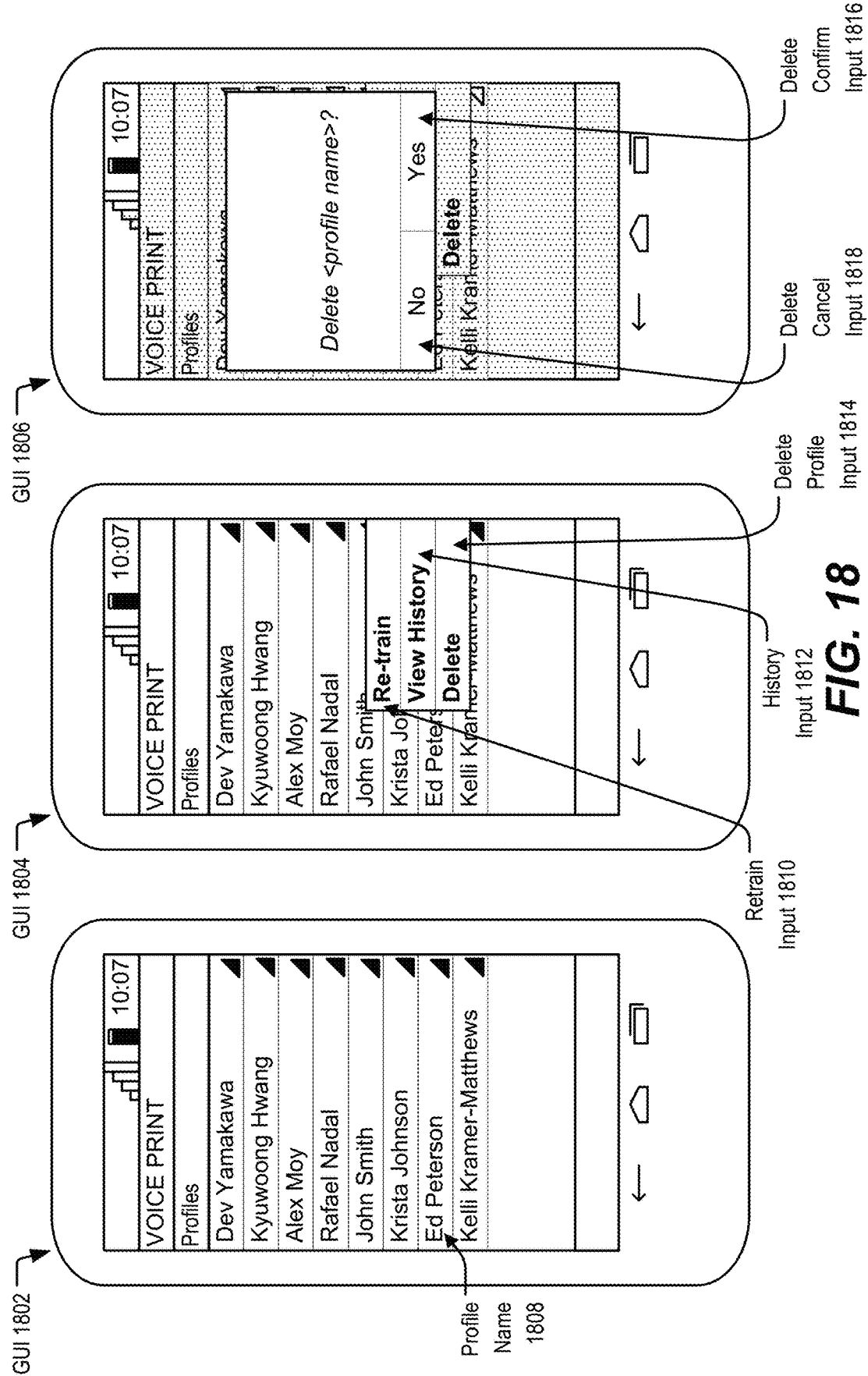
FIG. 18 is a diagram to illustrate particular aspects of graphical user interfaces (GUIs) that may be generated by the system of FIG. 1.

Referring to FIG. 18, diagrams of particular aspects of graphical user interfaces (GUIs) are shown and generally designated 1802, 1804, and 1806. In a particular aspect, the speaker verifier 120 of FIG. 1 may generate one or more of the GUIs 1802, 1804, and 1806.

The GUIs 1802, 1804, and 1806 may correspond to particular aspects of the configuration GUI 194. The GUI 1802 includes a list of profile names (e.g., a profile name 1808). For example, the configuration module 182 may generate the GUI 1802 in response to receiving a selection of the profiles input 1312 of FIG. 13. Each of the profile names (e.g., the profile name 1808) may correspond to a particular speaker model (e.g., the speaker model 176).

In response to receiving a selection of the profile name 1808, the configuration module 182 may generate the GUI 1804. The GUI 1804 includes a retrain input 1810, a history input 1812, and a delete profile input 1814. In response to receiving a selection of the retrain input 1810, the configuration module 182 may generate the enrollment GUI 184 (e.g., the GUI 1802 or the GUI 1804 of FIG. 17) to generate (or update) the speaker model 176 associated with the selected profile name (e.g., the profile name 1808).

In response to receiving a selection of the history input 1812, the configuration module 182 may generate the configuration GUI 194 indicating the historical success rates 170, as described with reference to FIGS. 1 and 18. In response to receiving a selection of the delete profile input 1814, the configuration module 182 may generate the GUI 1806. The GUI 1806 includes the delete confirm input 171 and the delete cancel input 1818. In response to receiving a selection of the delete confirm input 171, the configuration GUI 194 may delete the speaker model 176 associated with the selected profile name (e.g., the profile name 1808). In response to receiving the selection of the delete cancel input 1818, the configuration module 182 may provide the GUI 1804 to the display of the mobile device 102.

Figure 19:
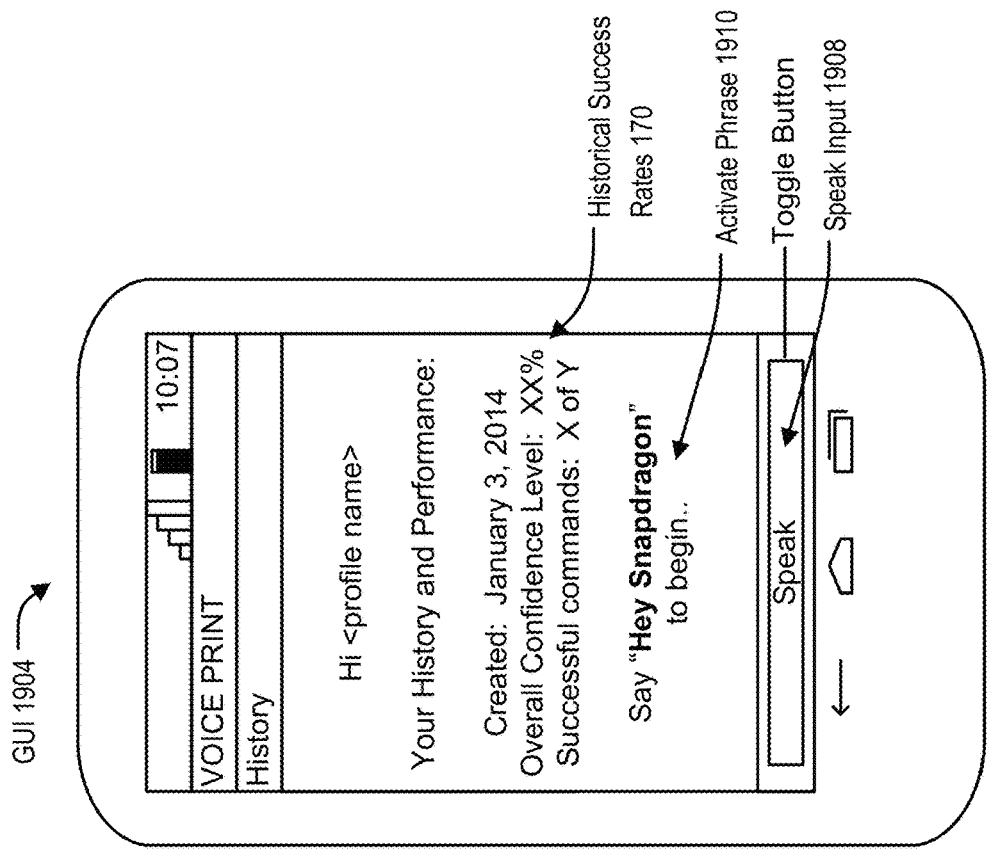
FIG. 19 is a diagram to illustrate particular aspects of graphical user interfaces (GUIs) that may be generated by the system of FIG. 1.
Figure 19:
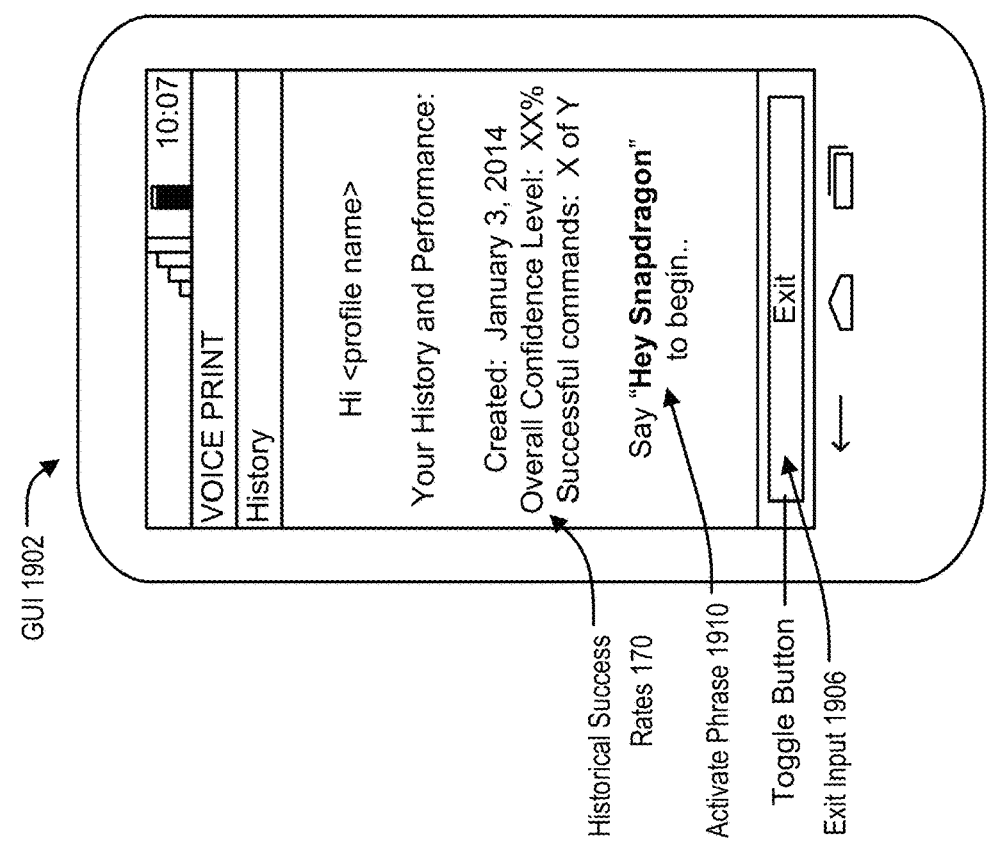

Referring to FIG. 19, diagrams of particular aspects of graphical user interfaces (GUIs) are shown and generally designated 1902 and 1904. In a particular aspect, the speaker verifier 120 may generate the GUIs 1902 and 1904.

The GUIs 1902 and 1904 may correspond to particular aspects of the configuration GUI 194. Each of the GUIs 1902 and 1904 includes the historical success rates 170 and the activate phrase 1910. The GUI 1902 includes an exit input 1906 and the GUI 1904 includes a speak input 1908.

In a particular aspect, the configuration module 182 may generate the GUI 1904 in response to a selection of the history input 1912. The user 152 may select the speak input 1908 and may speak the activate phrase 1910. In response to receiving a selection of the speak input 1908, the configuration module 182 may receive an activate phrase signal and may generate the GUI 1904.

In a particular aspect, the mobile device 102 may substantially continuously receive an audio input signal. The speaker verifier 120 may identify a beginning point of the activate phrase signal in the audio input signal in response to receiving the selection of the speak input 1908 and may identify an end point of the activate phrase signal in the audio input signal in response to receiving a selection of the exit input 1906. The configuration module 182 may store a portion of the audio input signal corresponding to the activate phrase signal in the memory 122.

The configuration module 182 may determine whether the activate phrase signal corresponds to the activate phrase 1910 using speech recognition techniques. In response to determining that the activate phrase signal corresponds to the activate phrase 1910, the configuration module 182 may generate the configuration GUI 194 (e.g., the GUI 1902 of FIG. 18). In a particular aspect, the enrollment module 108 may generate the enrollment GUI 184 (e.g., the GUI 1802 of FIG. 17) in response to a determination that the activate phrase signal corresponds to the activate phrase 1910 and that there are no speaker models stored in the memory 122.

Figure 20:
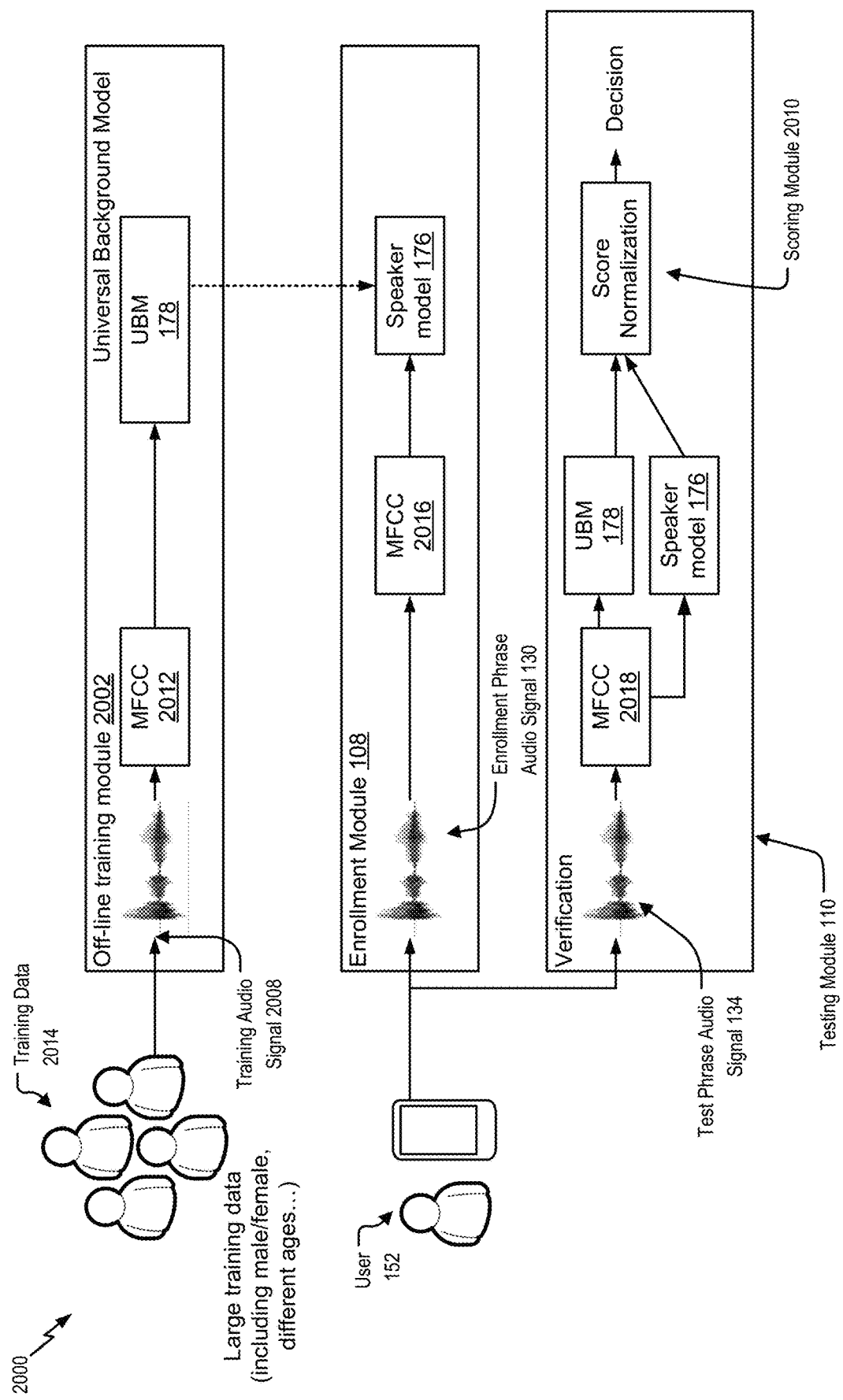
FIG. 20 is a diagram to illustrate a particular aspect of a system of speaker verification.

Referring to FIG. 20, a diagram of a particular aspect of a system of speaker verification is shown and generally designated 2000. In a particular aspect, one or more components of the system 2000 may correspond to or be include in the system 100, the speaker verifier 120, or both, of FIG. 1.

The system 2000 includes an off-line training module 2002, the enrollment module 108, and the speech validator 106. During operation, the offline-training module 2002 may receive a training audio signal 2008 from training data 2014. In a particular aspect, the training data 2014 may correspond to a large data set of training audio signals. For example, the training data 2014 may include multiple training audio signals corresponding to multiple speakers. The speakers may correspond to various age groups, to various genders, or both.

The offline-training module 2002 may generate the UBM 178 corresponding to the training data 2014 (e.g., the training audio signal 2008) using mel-frequency cepstrum coefficients (MFCC). For example, the off-line training module 2002 may generate mel-frequency cepstrum coefficients (MFCC) 2012 corresponding to the training audio signal 2008. The off-line training module 2002 may generate (or update) the UBM 178 based on the MFCC 2012.

The enrollment module 108 may receive the enrollment phrase audio signal 130 from the user 152, as described with reference to FIG. 1. The enrollment module 108 may generate (or update) the speaker model 176 based on the enrollment phrase audio signal 130. For example, the enrollment module 108 may generate mel-frequency cepstrum coefficients (MFCC) 2016 corresponding to the enrollment phrase audio signal 130. The enrollment module 108 may generate (or update) the speaker model 176 based on the MFCC 2016.

The testing module 110 may receive the test phrase audio signal 134, as described with reference to FIG. 1. The testing module 110 may determine whether the test phrase audio signal 134 satisfies the verification criterion 144 based on the UBM 178 and the speaker model 176. For example, the testing module 110 may generate mel-frequency cepstrum coefficients (MFCC) 2018 corresponding to the test phrase audio signal 134. The testing module 110 may determine a first score based on the MFCC 2018 and the UBM 178. For example, the first score may indicate a likelihood that the test phrase audio signal 134 corresponds to a generic speaker represented by the UBM 178. The testing module 110 may determine a second score based on the MFCC 2018 and the speaker model 176. For example, the second score may indicate a likelihood that the test phrase audio signal 134 corresponds to a user (e.g., the user 152) associated with the speaker model 176.

The testing module 110 may include a scoring module 2010. The scoring module 2010 may normalize the first score and the second score to generate a confidence level. For example, if the first score indicates a higher likelihood than the second score and a difference between the first score and the second score satisfies a first threshold (e.g., is large), then the confidence level may indicate a low level of confidence that the test phrase audio signal 134 corresponds to the user 152. As another example, if the first score indicates a lower likelihood than the second score and a difference between the first score and the second score satisfies the first threshold (e.g., is large), then the confidence level may indicate a high level of confidence that the test phrase audio signal 134 corresponds to the user 152. As a further example, if the difference between the first score and the second score does not satisfy the first threshold (e.g., is small or none), then the confidence level may indicate a medium level of confidence that the test phrase audio signal 134 corresponds to the user 152.

The testing module 110 may determine that the test phrase audio signal 134 satisfies the verification criterion 144 of FIG. 1 in response to determining that the confidence level satisfies the confidence level threshold 160, as described with reference to FIG. 1.

Figure 21:
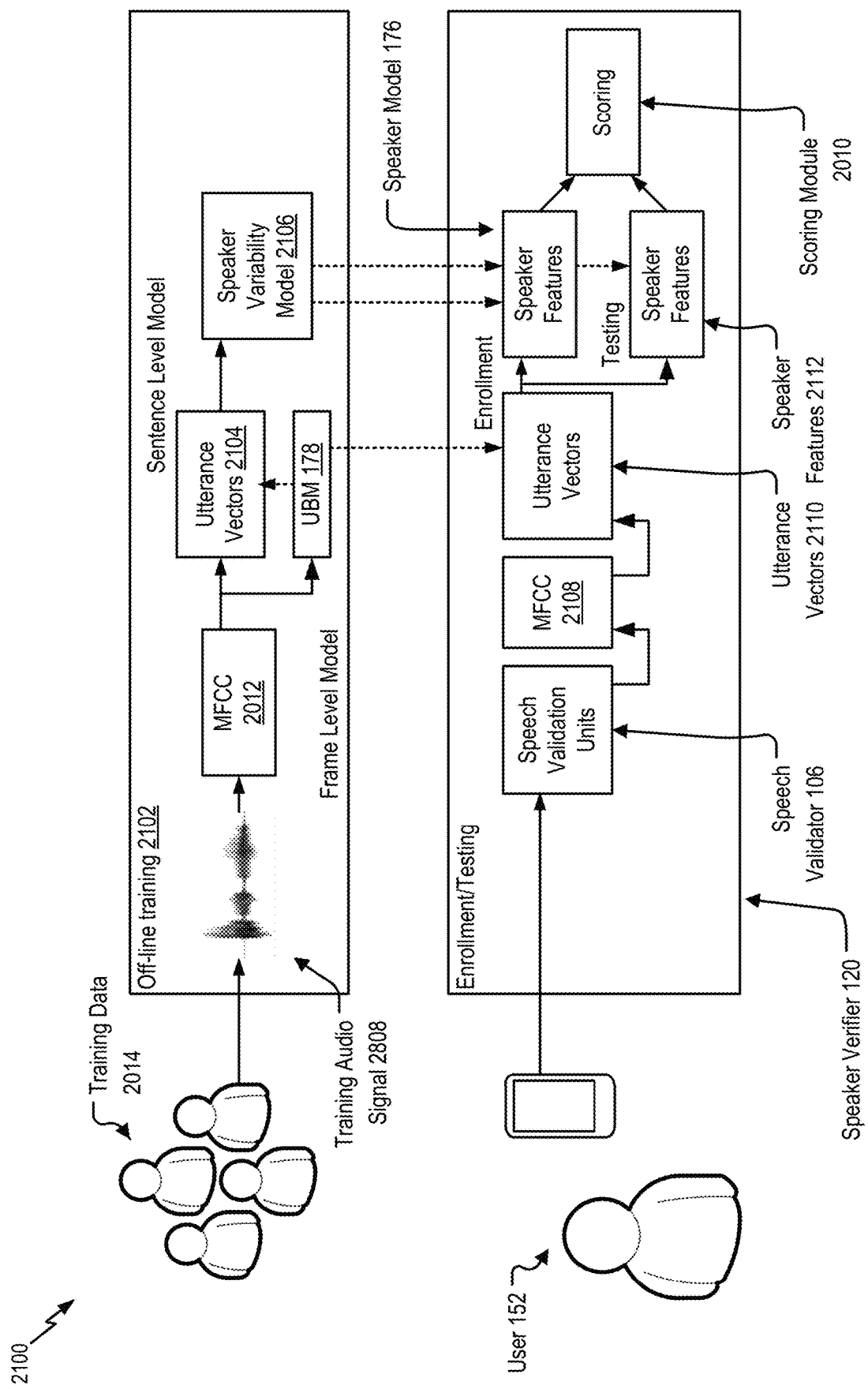
FIG. 21 is a diagram to illustrate a particular aspect of a system of speaker verification.

Referring to FIG. 21, a diagram of a particular aspect of a system of speaker verification is shown and generally designated 2100. One or more components of the system 2100 may correspond to, or be included in, the system 100 of FIG. 1.

The system 2100 includes an off-line training module 2102 and the speaker verifier 120. In a particular aspect, two or more components of the system 2100 may be combined into a single component. In a particular aspect, a particular component of the system 2100 may correspond to multiple components.

The off-line training module 2102 may generate the MFCC 2012 based on the training audio signal 2008, as described with reference to the off-line training module 2002 of FIG. 20. The off-line training module 2102 may generate (or update) the UBM 178 based on the MFCC 2012, as described with reference to the off-line training module 2002 of FIG. 20. The off-line training module 2102 may generate utterance vectors 2104 based on the MFCC 2012. Each utterance vector may represent a speaker utterance corresponding to a particular sentence. The utterance vectors 2104 may have a uniform size regardless of a length of corresponding sentences. The utterance vectors 2104 may correspond to a generic speaker corresponding to the training data 2014.

The off-line training module 2102 may generate a speaker variability model 2106 based on the utterance vectors 2104. The speaker variability model 2106 may capture sentence-level features in a lower dimensional space.

During enrollment, the speaker verifier 120 may generate MFCC 2108 corresponding to the enrollment phrase audio signal 130 of FIG. 1 in response to the speech validator 106 determining that the enrollment phrase audio signal 130 satisfies the validation criterion 142. The speaker verifier 120 may generate utterance vectors 2110 corresponding to the enrollment phrase audio signal 130 based on the MFCC 2108. The utterance vectors 2110 may correspond to a speaker (e.g., the user 152) of an enrollment phrase. For example, each utterance vector may represent an utterance of the user 152 corresponding to a particular sentence. The utterance vectors 2110 may have a uniform size regardless of lengths of corresponding sentences.

The speaker verifier 120 may generate the speaker model 176 based on the utterance vectors 2110 corresponding to the enrollment phrase audio signal 130. For example, the speaker model 176 may indicate particular features corresponding to the utterance vectors 2110. To illustrate, the speaker model 176 may indicate a manner in which the user 152 combines particular sounds in a sentence. In a particular aspect, the speaker model 176 may correspond to a speaker variability model corresponding to the user 152. In a particular aspect, the speaker model 176 may identify speaker features of the user 152 that are distinctive from the speaker variability model 2106.

During testing, the speaker verifier 120 may generate the MFCC 2108 corresponding to the test phrase audio signal 134. In a particular aspect, the speaker verifier 120 may generate the MFCC 2108 in response to determining that the test phrase audio signal 134 satisfies the validation criterion 142. The speaker verifier 120 may generate the utterance vectors 2110 based on the MFCC 2108 corresponding to the test phrase audio signal 134. The utterance vectors 2110 may correspond to a speaker (e.g., the user 152) of a test phrase. The speaker verifier 120 may generate speaker features 2112 based on the utterance vectors 2110 corresponding to the test phrase audio signal 134. In a particular aspect, the speaker features 2112 may identify speaker features associated with the test phrase audio signal 134 that are distinctive from the speaker variability model 2106. The scoring module 2010 may compare the speaker features 2112 to the speaker model 176 and may generate a score (e.g., a confidence level) based on a similarity between the speaker features 2112 and the speaker model 176.

Figure 22:
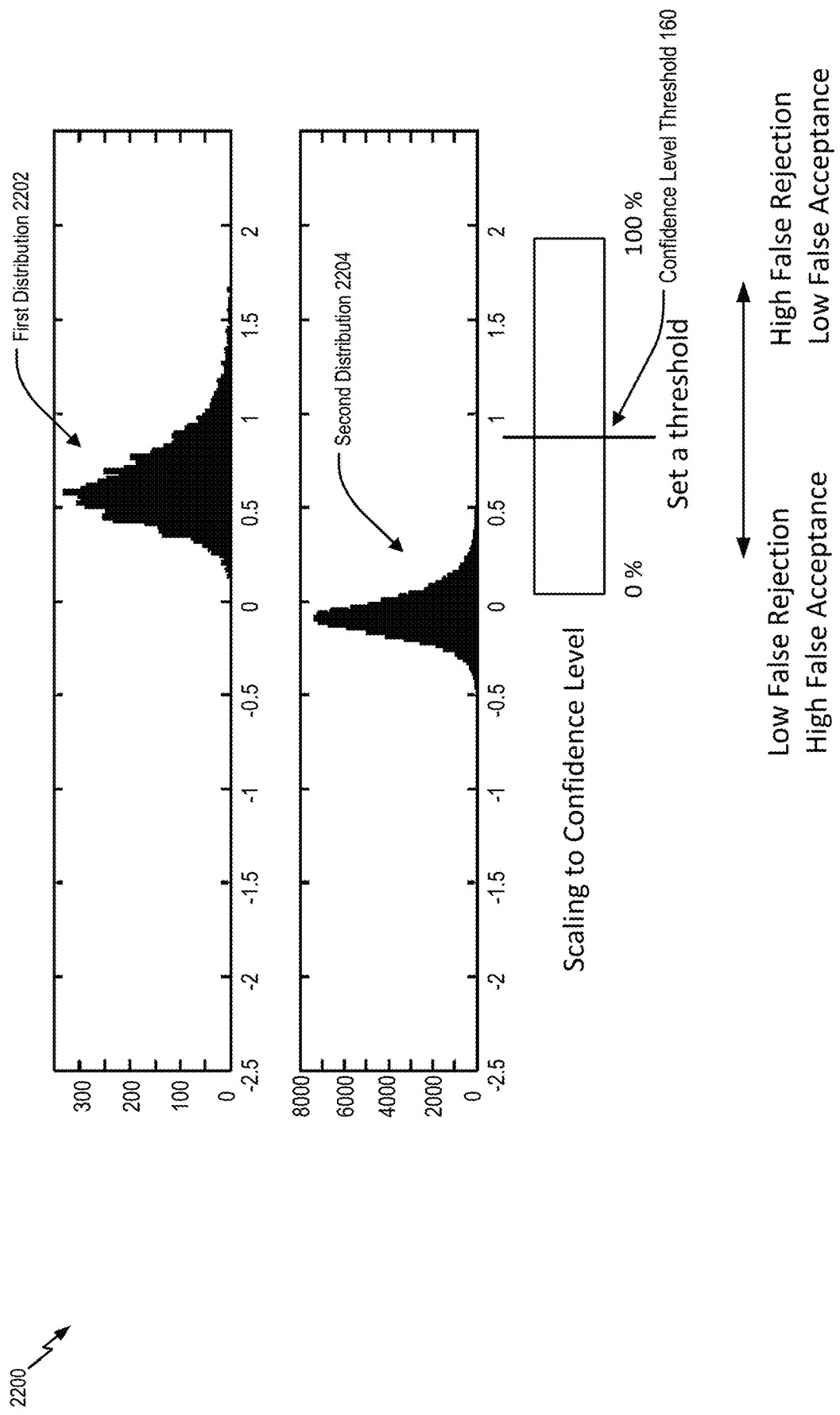
FIG. 22 is a diagram to illustrate a particular aspect of data that may be generated by the system of FIG. 1.

Referring to FIG. 22, a diagram of particular aspects of data is disclosed and generally designated 2200. In a particular aspect, the data 2200 may be generated by the system 100, the enrollment module 108, the speaker verifier 120 of FIG. 1, or a combination thereof.

The data 2200 includes a first distribution 2202, a second distribution 2204, and the confidence level threshold 160 (e.g., a speaker verification confidence level threshold). The testing module 110 may generate a first score (e.g., the first distribution 2202) based on a comparison of the test phrase audio signal 134 and the speaker model 176, as described with reference to FIG. 1. The testing module 110 may generate a second score (e.g., the second distribution 2204) based on a comparison of the test phrase audio signal 134 and the UBM 178, as described with reference to FIG. 1.

The first distribution 2202 may indicate a relative likelihood that the test phrase audio signal 134 corresponds to a user (e.g., the user 152) associated with the speaker model 176. The second distribution 2204 may indicate a relative likelihood that the test phrase audio signal 134 corresponds to another user (i.e., a user not associated with the speaker model 176). A higher confidence level threshold 160 may increase a false rejection rate (e.g., a false alarm rate) and may decrease a false acceptance rate (e.g., a miss rate). A lower confidence level threshold 160 may decrease the false rejection rate and may increase the false acceptance rate.

In a particular aspect, the configuration GUI 194 may indicate the first distribution 2202 and the second distribution 2204. In a particular aspect, the testing module 110 may generate a GUI indicating the first distribution 2202 and the second distribution 2204.

The data 2200 may enable a user 152 may select the confidence level threshold 160 (e.g., a speaker verification confidence level threshold) to achieve an acceptable balance between the false rejection rate and the false acceptance rate and may improve a user experience associated with speaker verification.

Figure 23:
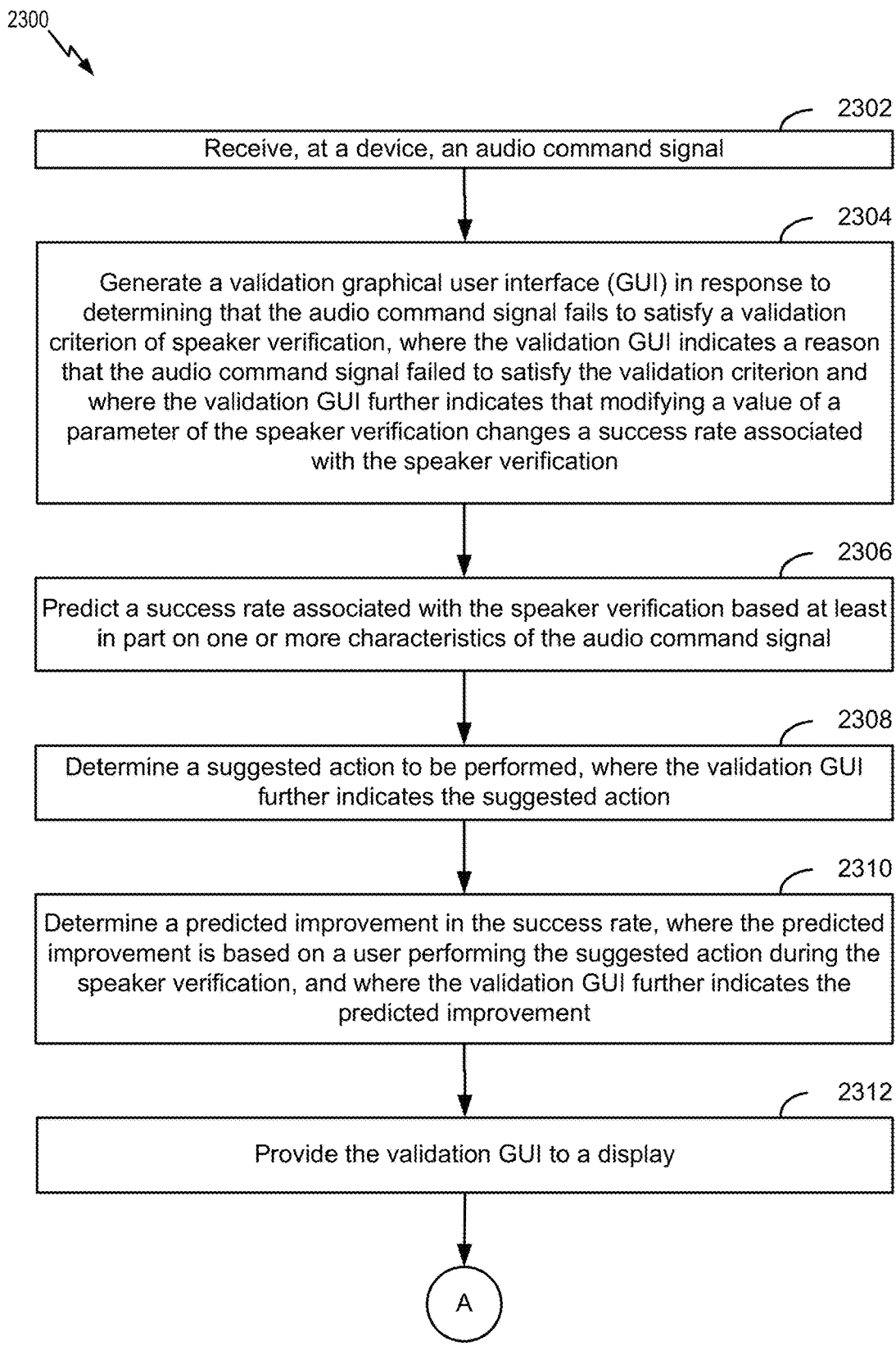
FIG. 23 is a flowchart to illustrate a particular aspect of a method of speaker verification.

Referring to FIG. 23, a flowchart of a particular aspect of a method of speaker verification is shown and generally designated 2300. The method 2300 may be performed by one or more components of the systems 100, 200, 2000, and 2100 of FIGS. 1-2 and 20-21. For example, the method 2300 may be performed by the speaker verifier 120, the speech validator 106, or both, of FIG. 1.

The method 2300 includes receiving, at a device, an audio command signal, at 2302. For example, the mobile device 102 of FIG. 1 may receive the audio command signal 132, as further described with reference to FIG. 1.

The method 2300 also includes generating a validation graphical user interface (GUI) in response to determining that the audio command signal fails to satisfy a validation criterion of speaker verification, at 2304. The validation GUI may indicate a reason that the audio command signal failed to satisfy the validation criterion. The validation GUI may further indicates that modifying a value of a parameter of the speaker verification changes a success rate associated with the speaker verification. For example, the GUI generator 204 of FIG. 2 may generate the validation GUI 126 in response to determining that the audio command signal 132 fails to satisfy the validation criterion 142, as described with reference to FIG. 2. The validation GUI 126 may indicate that modifying a value of a parameter (e.g., the confidence level threshold 160, the security level 158, or both) may change a success rate (e.g., the first predicted rate 164) associated with the speaker verification, as described with reference to FIG. 2.

The method 2300 further includes predicting a success rate associated with the speaker verification based at least in part on one or more characteristics of the audio command signal, at 2306. For example, success rate predictor 210 of FIG. 2 may predict a success rate (e.g., the first predicted rate 164) based at least in part on the characteristics 172, as described with reference to FIG. 2.

The method 2300 also includes determining a suggested action to be performed, where the validation GUI further indicates the suggested action, at 2308. For example, the action suggester 206 may determine the suggested actions 150, where the validation GUI 126 may indicate the suggested actions 150, as described with reference to FIG. 2.

The method 2300 further includes determining a predicted improvement in the success rate, at 2010. The predicted improvement may be based on a user performing the suggested action during the speaker verification. The validation GUI may further indicate the predicted improvement. For example, the success rate predictor 210 may determine the predicted improvement 162 based on the user 152 performing the suggested actions 150, as described with reference to FIG. 2. The validation GUI 126 may indicate the predicted improvement 162.

The method 2300 also includes providing the validation GUI to a display, at 2312. For example, the GUI generator 204 may provide the validation GUI 126 to a display of the mobile device 102, as described with reference to FIG. 2.

The method 2300 of FIG. 23 may enable providing information that may be helpful to a user during speaker verification. For example, the validation GUI may indicate a reason that an audio command signal failed to satisfy a validation criterion, suggested actions to be performed, a predicted success rate of the speaker verification, a predicted improvement in a success rate of the speaker verification based on the user performing the suggested actions, a parameter that may be modified to change a success rate of the speaker verification, or a combination thereof. The information may enable the user to modify the speaker verification to have a favorable user experience.

In particular aspects, the method 2300 of FIG. 23 may be implemented via hardware (e.g., a field-programmable gate array (FPGA) device, an application-specific integrated circuit (ASIC), etc.) of a processing unit, such as a central processing unit (CPU), a digital signal processor (DSP), or a controller, via a firmware device, or any combination thereof. As an example, the method 2300 of FIG. 23 can be performed by a processor that executes instructions, as described with respect to FIG. 42.

Figure 24:
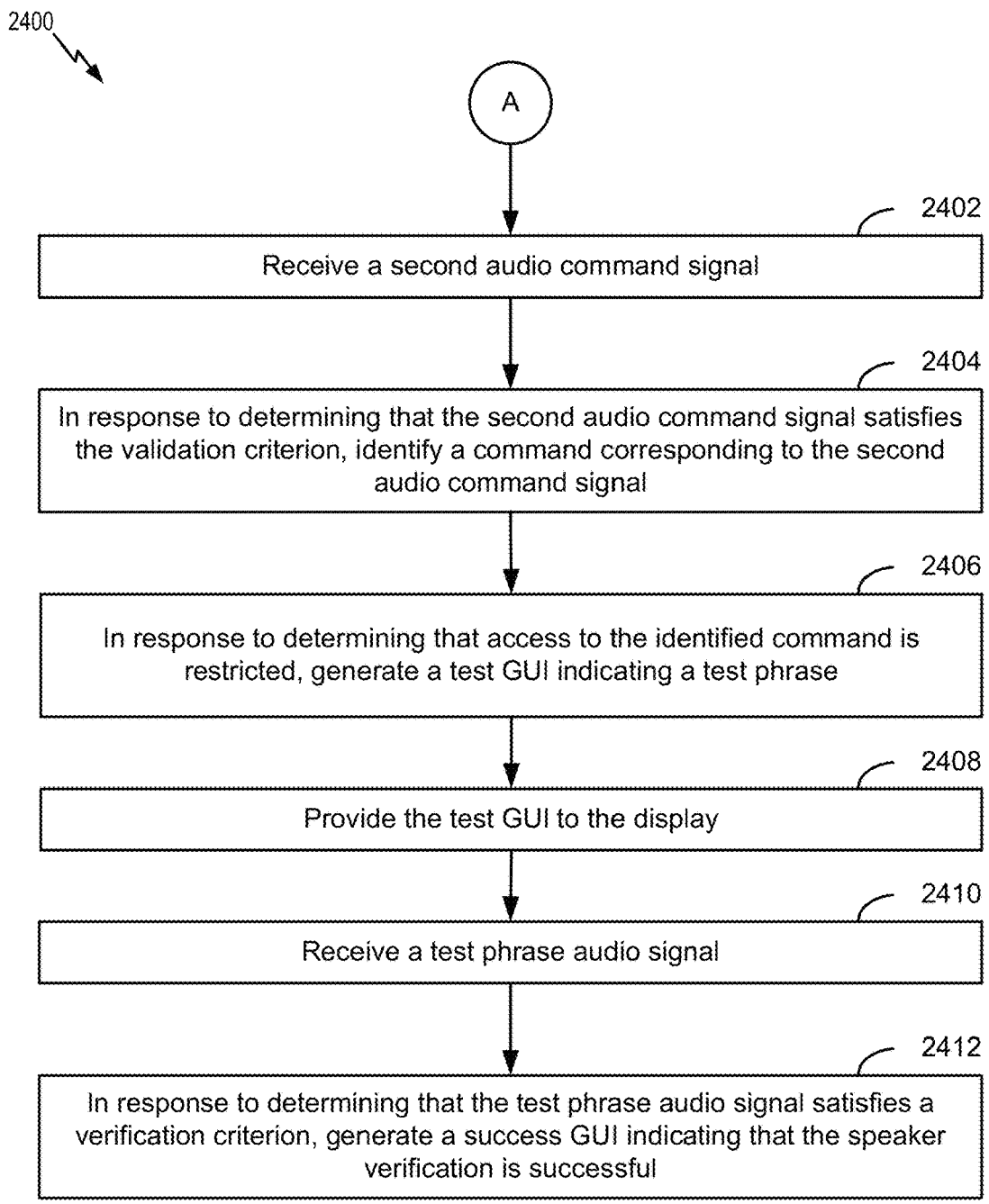
FIG. 24 is a flowchart to illustrate another particular aspect of a method of speaker verification.

Referring to FIG. 24, a flowchart of a particular aspect of a method of speaker verification is shown and generally designated 2400. The method 2400 may be performed by one or more components of the systems 100, 200, 2000, and 2100 of FIGS. 1-2 and 20-21. For example, the method 2400 may be performed by the speaker verifier 120, the speech validator 106, or both, of FIG. 1. In a particular aspect, the method 2300 may continue from 2312 to 2402 of the method 2400.

The method 2400 includes receiving a second audio command signal, at 2402. For example, the mobile device 102 may receive a second audio command signal (e.g., the audio command signal 132), as described with reference to FIGS. 1-2.

The method 2400 also includes, in response to determining that the second audio command signal satisfies the validation criterion, identifying a command corresponding to the second audio command signal, at 2404. For example, the testing module 110 of FIG. 1 may identify a command corresponding to the audio command signal 132 in response to determining that the audio command signal 132 satisfies the validation criterion 142, as described with reference to FIG. 1.

The method 2400 further includes, in response to determining that access to the identified command is restricted, generating a test GUI indicating a test phrase, at 2406. For example, the testing module 110 of FIG. 1 may, in response to determining that access to the identified command is restricted, generate the test GUI 128 indicating a test phrase, as described with reference to FIG. 1.

The method 2400 also includes providing the test GUI to the display, at 2408. For example, the testing module 110 of FIG. 1 may provide the test GUI 128 to the display of the mobile device 102.

The method 2400 further includes receiving a test phrase audio signal, at 2410. For example, the testing module 110 of FIG. 1 may receive the test phrase audio signal 134, as described with reference to FIG. 1.

The method 2400 also includes, in response to determining that the test phrase audio signal satisfies a verification criterion, generating a success GUI indicating that the speaker verification is successful, at 2412. For example, the testing module 110 of FIG. 1 may, in response to determining that the test phrase audio signal 134 satisfies the verification criterion 144, generate the success GUI 140 indicating that the speaker verification is successful, as described with reference to FIG. 1.

The method 2400 of FIG. 24 may enable providing access to a restricted command using speaker verification based on an audio signal.

In particular aspects, the method 2400 of FIG. 24 may be implemented via hardware (e.g., a field-programmable gate array (FPGA) device, an application-specific integrated circuit (ASIC), etc.) of a processing unit, such as a central processing unit (CPU), a digital signal processor (DSP), or a controller, via a firmware device, or any combination thereof. As an example, the method 2400 of FIG. 24 can be performed by a processor that executes instructions, as described with respect to FIG. 42.

Figure 25:
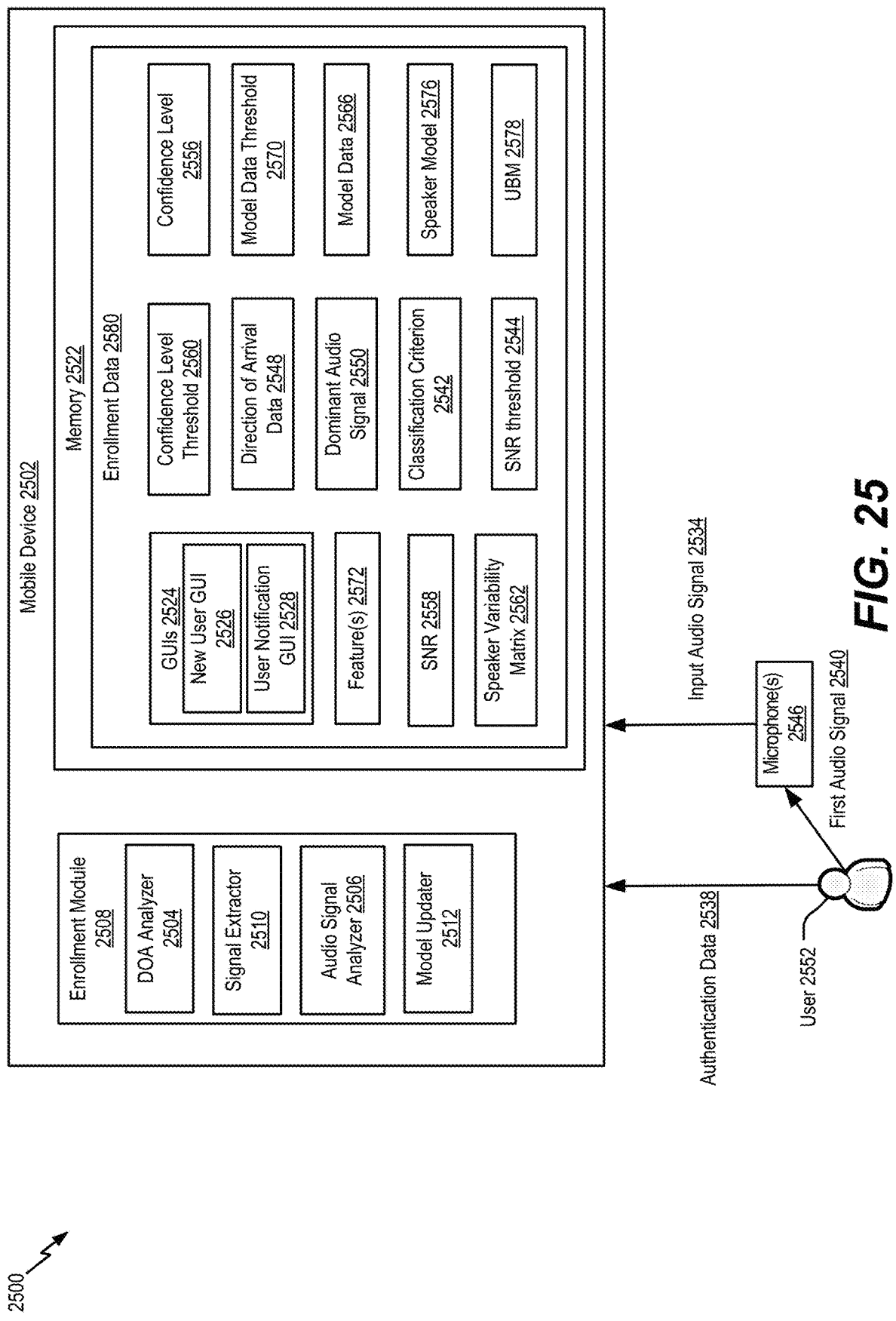
FIG. 25 is a diagram to illustrate a particular aspect of a system that is operable to perform speaker enrollment.

Referring to FIG. 25, a particular aspect of a system that is operable to perform speaker verification is shown and generally designated 2500. In a particular aspect, the system 2500 may be integrated into a decoding system or apparatus (e.g., in a wireless telephone or coder/decoder (CODEC)). In other aspects, the system 2500 may be integrated into a tablet, a set top box, a music player, a video player, an entertainment unit, a navigation device, a communications device, a personal digital assistant (PDA), a fixed location data unit, or a computer. In a particular aspect, the system 2500 may correspond to the system 100 of FIG. 1.

It should be noted that in the following description, various functions performed by the system 2500 of FIG. 25 are described as being performed by certain components or modules. However, this division of components and modules is for illustration only. In an alternate aspect, a function performed by a particular component or module may be divided amongst multiple components or modules. Moreover, in an alternate aspect, two or more components or modules of FIG. 25 may be integrated into a single component or module. Each component or module illustrated in FIG. 25 may be implemented using hardware (e.g., a field-programmable gate array (FPGA) device, an application-specific integrated circuit (ASIC), a digital signal processor (DSP), a controller, etc.), software (e.g., instructions executable by a processor), or any combination thereof.

The system 2500 includes a mobile device 2502 coupled to or in communication with one or more microphones 2546. In a particular aspect, the mobile device 2502 may correspond to the mobile device 102 of FIG. 1. The mobile device 2502 may include an enrollment module 2508 coupled to, or in communication with, a memory 2522. In a particular aspect, the enrollment module 2508 may correspond to the enrollment module 108 of FIG. 1, the memory 2522 may correspond to the memory 122 of FIG. 1, or both. The enrollment module 2508 may include a direction of arrival (DOA) analyzer 2504, a signal extractor 2510, an audio signal analyzer 2506, a model updater 2512, or a combination thereof. The memory 2522 may include enrollment data 2580. The enrollment data 2580 may include graphical user interfaces (GUIs) 2524, one or more features 2572, a signal-to-noise ratio (SNR) 2558, a speaker variability matrix 2562, direction of arrival data 2548, a dominant audio signal 2550, a classification criterion 2542, an SNR threshold 2544, a confidence level threshold 2560, a confidence level 2556, a model data threshold 2570, model data 2566, a speaker model 2576, a universal background model (UBM) 2578, or a combination thereof. The GUIs 2524 may include a user notification GUI 2528, a new user GUI 2526, or both.

During operation, a user 2552 may activate the enrollment module 2508 to perform speaker enrollment. For example, the user 2552 may select a speaker enrollment option displayed at a display of the mobile device 2502, as further described with reference to FIG. 27. The mobile device 2502 may activate the enrollment module 2508 in response to receiving the selection of the speaker enrollment option. The enrollment module 2508 may generate the user notification GUI 2528 in response to receiving the selection of the speaker enrollment option. The user notification GUI 2528 may indicate that audio signals received by the mobile device 2502 are being used to update the speaker model 2576, as further described with reference to FIG. 27. In a particular aspect, the user notification GUI 2528 may indicate that the audio signals are being used to generate an inferred speaker model and that no data content is being stored by the mobile device 2502. For example, the user notification GUI 2528 may include "Allow speaker model learning; this allows your device to refine an existing VoicePrint model for biometric authentication as well as noise cancellation. Your data will only be analyzed, not stored." The enrollment module 2508 may provide the user notification GUI 2528 to a display of the mobile device 2502. In a particular aspect, the enrollment module 2508 may generate a tone indicating that the speaker enrollment is activated.

In a particular aspect, the mobile device 2502 may generate the user notification GUI 2528 in response to receiving a selection of a call function of the mobile device 2502. The user notification GUI 2528 may include a confirm option and a cancel option. The mobile device 2502 may activate the speaker enrollment (e.g., the enrollment module 2508) in response to receiving a selection of the confirm option. The mobile device 2502 may deactivate (e.g., exit) the speaker enrollment (e.g., the enrollment module 2508) in response to receiving a selection of the cancel option.

In a particular aspect, the enrollment module 2508 may generate an alternative modality GUI that prompts the user 2552 to provide authentication data 2538 (e.g., an iris scan, a finger print, an image of a face, a password, etc.). In this aspect, the enrollment module 2508 may determine whether the authentication data 2538 corresponds to a user (e.g., the user 2552) authorized to generate (or update) the speaker model 2576 based on security settings of the mobile device 2502. The enrollment module 2508 may restrict access to speaker enrollment in response to determining that the authentication data 2538 does not correspond to an authorized user. Alternatively, the enrollment module 2508 may generate the user notification GUI 2528 in response to determining that the authentication data 2538 corresponds to the authorized user.

The mobile device 2502 may receive an input audio signal 2534 via the microphones 2546. The input audio signal 2534 may include a first audio signal 2540 corresponding to utterances of the user 2552. The first audio signal 2540 may correspond to multiple words, a word, or a portion of a word spoken by the user 2552. For example, the user 2552 may select the speaker enrollment option prior to, or during, a call. The first audio signal 2540 may correspond to speech of the user 2552 received via the microphones 2546 during the call. The input audio signal 2534 may also include background noise (e.g., speech of another user, background music, street noise, etc.) received by the microphones 2546 from various directions.

In a particular aspect, the microphones 2546 may capture the first audio signal 2540 and other audio signals. An analog-to-digital converter (ADC) at the mobile device 2502 may convert the captured audio signals (e.g., the first audio signal and other audio signals) from an analog waveform into a digital waveform comprised of digital audio samples. The digital audio samples may be processed by a digital signal processor. A gain adjuster may adjust a gain (e.g., of the analog waveform or the digital waveform) by increasing or decreasing an amplitude level of an audio signal (e.g., the analog waveform or the digital waveform). Gain adjusters may operate in either the analog or digital domain. For example, a gain adjuster may operate in the digital domain and may adjust the digital audio samples produced by the analog-to-digital converter. After gain adjusting, an echo canceller may reduce echo that may have been created by an output of a speaker entering the microphones 2546. The output of the echo canceller may correspond to the input audio signal 2534. The output of the echo canceller may be coupled to the enrollment module 2508. For example, the output of the echo canceller may be coupled to the DOA analyzer 2504, the signal extractor 2510, the audio signal analyzer 2506, the model updater 2512, or a combination thereof.

The DOA analyzer 2504 may receive the input audio signal 2534 (e.g., as an output of the echo canceller). The DOA analyzer 2504 may determine whether a plurality of directions of arrival is associated with the input audio signal 2534.

The DOA analyzer 2504 may logically partition an area proximate to the mobile device 2502 into multiple sectors. Each sector may correspond to a particular angular range relative to the mobile device 2502. The DOA analyzer 2504 may perform a directional analysis by determining directional sources of sounds that are included in the input audio signal 2534. In a particular aspect, the DOA analyzer 2504 may perform the directional analysis on a frame-by-frame basis. For example, the DOA analyzer 2504 may perform the directional analysis on particular frames (e.g., every $n^{th}$ frame) of the input audio signal 2534.

In a particular aspect, a first microphone of the microphones 2546 may be closer to a first sector than a second microphone of the microphones 2546. The DOA analyzer 2504 may compare energy levels of signals received from the first microphone and the second microphone. The DOA analyzer 2504 may determine an energy level difference between a first energy level of a first signal (e.g., corresponding to a first channel) from the first microphone and a second energy level of a second signal (e.g., corresponding to a second channel) from the second microphone, where the first signal and the second signal correspond to a first portion of the audio signal. The DOA analyzer 2504 may determine that a first source of the first portion is in the first sector in response to determining that the energy level difference satisfies (e.g., is greater than) a particular energy threshold.

The DOA analyzer 2504 may determine that the input audio signal 2534 corresponds to the plurality of directions of arrival in response to detecting sources of various portions of the input audio signal 2534 in multiple sectors. In a particular aspect, the DOA analyzer 2504 may classify the input audio signal 2534 as the single dominant audio signal in response to determining that the input audio signal 2534 corresponds to a single direction of arrival. The direction of arrival data 2548 may designate the input audio signal 2534 as the single dominant audio signal.

In response to determining that the input audio signal 2534 corresponds to the plurality of directions of arrival, the DOA analyzer 2504 may determine whether the input audio signal 2534 corresponds to a single dominant direction of arrival. In a particular aspect, the input audio signal 2534 may correspond to a multichannel signal. For example, the microphones 2546 may include a first pair of microphones. Each of a first pair of channels may be based on a signal produced by a corresponding one of the first pair of microphones. The DOA analyzer 2504 may calculate, for each of a plurality of different frequency components of the multichannel signal, a difference between a phase of the frequency component in each of the first pair of channels of the multichannel signal, to obtain a plurality of phase differences. The DOA analyzer 2504 may estimate an error, for each of a plurality of candidate directions, between the candidate direction and a vector that is based on the plurality of phase differences. The DOA analyzer 2504 may select, from among the plurality of candidate directions, a candidate direction that corresponds to the minimum among the estimated errors. The candidate direction may correspond to the dominant direction of arrival.

The DOA analyzer 2504 may store the direction of arrival data 2548 in the memory 2522. The direction of arrival data 2548 may indicate the dominant direction of arrival. In a particular aspect, the DOA analyzer 2504 may determine that there are multiple dominant directions of arrival in response to determining that multiple candidate directions correspond to the minimum among the estimated errors. For example, the input audio signal 2534 may correspond to multiple non-stationary sources (e.g., competing speakers). In a particular aspect, the DOA analyzer 2504 may determine statistics of DOA variation associated with the input audio signal 2534 within a particular (e.g., short) time period. The DOA analyzer 2504 may discard the input audio signal 2534 in response to determining that the DOA variation exceeds a DOA variation threshold. The DOA variation threshold may be a default value.

The DOA analyzer 2504 may discard the input audio signal 2534 in response to determining that the input audio signal 2534 corresponds to multiple dominant directions of arrival. For example, the enrollment module 2508 may discard one or more frames of the input audio signal 2534 in response to determining that a particular frame of the input audio signal 2534 corresponds to multiple dominant directions of arrival.

In a particular aspect, the DOA analyzer 2504 may determine directionality of speech corresponding to the input audio signal 2534 based on an anglogram. Directionality may refer to a metric that indicates likelihoods that a source of an audio signal is located at a particular direction relative to the mobile device 2502. The anglogram may indicate likelihoods that speech is occurring over a range of angles (e.g., a direction of arrival) over time. The DOA analyzer 2504 may select a particular sector as a source of the speech (e.g., the dominant audio signal) based on the likelihoods provided by the anglogram. The first audio signal 2540 corresponding to speech of the user 2552 may be more directional than distributed noise when the user 2552 speaks within a particular distance (e.g., approximately 3 feet) of the mobile device 2502 (or the microphones 2546). The DOA analyzer 2504 may discard the input audio signal 2534 in response to determining that the directionality of speech does not indicate the user 2552 speaking within the particular distance.

The signal extractor 2510 may extract the dominant audio signal (e.g., the dominant audio signal 2550) from the input audio signal 2534 based on the dominant direction of arrival. For example, the dominant direction of arrival may correspond to a particular microphone of the microphones 2546. The dominant audio signal 2550 may correspond to an audio signal received from the particular microphone. In a particular aspect, the dominant audio signal 2550 may correspond to the enrollment phrase audio signal 130, the audio command signal 132, or the test phrase audio signal 134 of FIG. 1. The signal extractor 2510 may extract the audio signal received from the particular microphone from the input audio signal 2534. In a particular aspect, the signal extractor 2510 may apply cross filters to an audio signal received from the microphones 2546 to extract the dominant audio signal 2550. In a particular aspect, the dominant audio signal 2550 may correspond to the first audio signal 2540. In a particular aspect, the signal extractor 2510 may store the input audio signal 2534 as the dominant audio signal 2550 in response to determining that the input audio signal 2534 corresponds to a single direction of arrival.

The audio signal analyzer 2506 may extract a noise signal from the input audio signal 2534. For example, the audio signal analyzer 2506 may apply a filter to the input audio signal 2534 that nulls the dominant audio signal 2550 and may produce the noise signal. In a particular aspect, the audio signal analyzer 2506 may estimate stationary noise in the input audio signal 2534. For example, the audio signal analyzer 2506 may measure a spectral flatness of the input audio signal 2534. The audio signal analyzer 2506 may determine the stationary noise estimate based on the spectral flatness measurement. The audio signal analyzer 2506 may modify the noise signal based on the stationary noise estimate. In a particular aspect, the audio signal analyzer 2506 may perform signal analysis of the input audio signal 2534 on a frame-by-frame basis. For example, the audio signal analyzer 2506 may perform the signal analysis of particular frames (e.g., every $n^{th}$ frame) of the input audio signal 2534.

The audio signal analyzer 2506 may determine the signal-to-noise ratio (SNR) 2558 of the input audio signal 2534. In a particular aspect, the audio signal analyzer 2506 may determine the SNR 2558 based on the dominant audio signal 2550 and the noise signal. In an alternative aspect, the audio signal analyzer 2506 may extract the dominant audio signal 2550 from the input audio signal 2534 in response to determining that the SNR 2558 satisfies (e.g., is greater than or equal to) the SNR threshold 2544. The SNR 2558 may be determined based on an SNR estimate. The SNR estimate may be based on minimum statistics, a stationary noise level estimation, or both. The audio signal analyzer 2506 may discard the input audio signal 2534 in response to determining that the SNR 2558 fails to satisfy (e.g., is lower than) the SNR threshold 2544. In a particular aspect, the audio signal analyzer 2506 may discard one or more frames of the input audio signal 2534 in response to determining that the SNR 2558 associated with a particular frame of the input audio signal 2534 fails to satisfy the SNR threshold 2544. In a particular aspect, the SNR threshold 2544 may be a default value.

The audio signal analyzer 2506 may, in response to a determination that the SNR 2558 satisfies (e.g., is greater than or equal to) the SNR threshold 2544 and that the input audio signal 2534 corresponds to a single dominant direction of arrival, determine whether the dominant audio signal 2550 satisfies the classification criterion 2542. The classification criterion 2542 may include at least one of whether the dominant audio signal 2550 corresponds to non-standard speech, whether an amount of the model data 2566 satisfies the model data threshold 2570, or whether the confidence level 2556 of the dominant audio signal 2550 satisfies the confidence level threshold 2560, as described herein.

Non-standard speech may correspond to at least one of noisy speech, emotional speech, repetitive syllables, reverberated speech, singing, humming, non-speech sound, or a particular language. For example, the audio signal analyzer 2506 may extract the features 2572 of the dominant audio signal 2550 and may determine whether the dominant audio signal 2550 corresponds to the non-standard speech based on the features 2572.

The features 2572 may include energy-related features, pitch-related features, or both. In a particular aspect, the energy-related features may include at least one of a mean energy, a standard deviation of energy, a relative maximum of an energy derivative relative to time, or a maximum of an absolute second derivative of energy. In a particular aspect, the pitch-related features may include at least one of a mean duration of voiced sounds, a standard deviation of durations of the voiced sounds, a rate of the voiced sounds, an average pitch, a standard deviation of pitch, a maximum pitch, a minimum pitch, a relative difference between the maximum pitch and the minimum pitch, a pitch derivative relative to time, a mean derivative of pitch, or a distance between pitch reversal points.

In a particular aspect, the audio signal analyzer 2506 may determine that the dominant audio signal 2550 corresponds to noisy speech in response to determining that a signal-to-noise ratio (SNR) of the dominant audio signal 2550 fails to satisfy a particular SNR threshold. The particular SNR threshold may be distinct (e.g., lower) than the SNR threshold 2544. The particular SNR threshold may be a default value.

In a particular aspect, the audio signal analyzer 2506 may classify the dominant audio signal 2550 into one or more emotional states (e.g., joy, anger, sadness, neutral, fear, surprise, and/or disgust) using a classifier (e.g., a Gaussian mixture model (GMM), a deep neural network (DNN), or a support vector machine (SVM)) based on the features 2572. The audio signal analyzer 2506 may determine that the dominant audio signal 2550 corresponds to emotional speech in response to a classification of the dominant audio signal 2550 into one or more of a subset (e.g., joy, anger, sadness, fear, surprise, and/or disgust) of the emotional states.

In a particular aspect, the audio signal analyzer 2506 may determine that the dominant audio signal 2550 corresponds to repetitive syllables, reverberated speech, singing, humming, and/or non-speech sound based on the features 2572 and a classifier (e.g., a support vector machine (SVM)). The classifier may detect repetitive syllables, humming, and/or singing based on analyzing a voice speech duration, a rate of voiced speech, a rate of speech pauses, a similarity measure between voiced speech intervals (e.g., corresponding to syllables), or a combination thereof. The classifier may detect the repetitive syllables, humming, and/or singing based on determining that the dominant audio signal 2550 corresponds to repetitive phrases, sounds associated with a longer pitch continuity than in standard speech, or both. In a particular aspect, the reverberated speech may indicate that the user 2552 provided the first audio signal 2540 at a particular distance (e.g., greater than or equal to 3 feet) from the microphones 2546.

In a particular aspect, the speaker model 2576 may correspond to a first language. The audio signal analyzer 2506 may determine that the dominant audio signal 2550 corresponds to the non-standard speech in response to determining that the dominant audio signal 2550 corresponds to a language other than the first language.

In a particular aspect, the enrollment module 2508 may generate (or update) multiple speaker models associated with the user 2552. Each speaker model (e.g., the speaker model 2576) may correspond to a particular language. The memory 2522 may include a UBM (e.g., the UBM 2578) corresponding to the particular language. In this aspect, the audio signal analyzer 2506 may determine that the dominant audio signal 2550 corresponds to non-standard speech in response to determining that the dominant audio signal 2550 corresponds to a first language and that the memory 2522 does not include a UBM corresponding to the first language.

The audio signal analyzer 2506 may determine that the dominant audio signal 2550 corresponds to extraneous speech in response to determining that the dominant audio signal 2550 corresponds to at least one of singing, repetitive syllables, or a particular language. The audio signal analyzer 2506 may discard the input audio signal 2534 in response to determining that the dominant audio signal 2550 corresponds to the extraneous speech.

The model updater 2512 may generate (or update) the speaker variability matrix 2562 based on the dominant audio signal 2550 in response to a determination that the dominant audio signal 2550 corresponds to the non-standard speech but does not correspond to the extraneous speech. In a particular aspect, the speaker model 2576 may represent speech patterns of the user 2552 when the user 2552 speaks in a neutral tone and the speaker variability matrix 2562 may represent changes to the speech patterns of the user 2552 when the user 2552 speaks in an emotional tone, speaks at a particular distance (e.g., greater than or equal to 3 feet) from the microphones 2546, speaks fast, speaks slow, or a combination thereof.

The model updater 2512 may generate (or update) the speaker model 2576 based on the dominant audio signal 2550 in response to a determination that the dominant audio signal 2550 corresponds to standard speech. In a particular aspect, the model updater 2512 may determine whether an amount of the model data 2566 satisfies the model data threshold 2570 in response to a determination that the dominant audio signal 2550 corresponds to standard speech. The speaker model 2576 may be based on the model data 2566. The model data threshold 2570 may be a default value.

The model updater 2512 may generate (or update) the speaker model 2576 in response to determining that the model data 2566 fails to satisfy the model data threshold 2570. In a particular aspect, the model updater 2512 may update (or generate) a particular speaker model (e.g., the speaker model 2576) associated with a particular language that corresponds to the dominant audio signal 2550.

The model updater 2512 may update (or generate) the model data 2566 based on the dominant audio signal 2550. For example, the model updater 2512 may update (or generate) the model data 2566 based on the features 2572. In a particular aspect, the model updater 2512 may add the dominant audio signal 2550, the features 2572, or both, to the model data 2566. The model updater 2512 may update (or generate) the speaker model 2576 based on the model data 2566.

In a particular aspect, the model updater 2512 may generate (or update) a speaker dictionary in response to determining that the model data 2566 fails to satisfy the model data threshold 2570. For example, the model updater 2512 may add the dominant audio signal 2550 to the speaker dictionary, such as by storing in the speaker dictionary data that corresponds to or is derived from the dominant audio signal 2550.

In response to determining that the model data 2566 satisfies the model data threshold 2570, the model updater 2512 may determine the confidence level 2556 associated with the dominant audio signal 2550. The confidence level 2556 may indicate a likelihood that the confidence level 2556 is associated with a user (e.g., the user 2552) corresponding to the speaker model 2576.

In a particular aspect, the model updater 2512 may determine a first score that measures a correspondence between the dominant audio signal 2550 and the speaker model 2576. The model updater 2512 may determine a second score that measures a correspondence between the dominant audio signal 2550 and the UBM 2578. The UBM 2578 may be generated based on a large data set of audio signals corresponding to multiple speakers representing various age groups and/or genders. The UBM 2578 may correspond to in a particular language.

The model updater 2512 may determine the confidence level 2556 of the dominant audio signal 2550 based on the first score and the second score. For example, the confidence level 2556 may be high if the first score is higher than the second score and a difference between the first score and the second score is high. As another example, the confidence level 2556 may be low if the difference between the first score and the second score is low. As a further example, the confidence level 2556 may be negative if the second score is higher than the first score and the difference between the second score and the first score is high.

In a particular aspect, the model updater 2512 may generate an alternative modality GUI in response to determining that the confidence level 2556 fails to satisfy the confidence level threshold 2560 and that a difference between the first score and the second score fails to satisfy (e.g., is below) a difference threshold. The alternative modality GUI may prompt the user 2552 to provide the authentication data 2538 (e.g., an iris scan, a finger print, an image of a face, a password, etc.). The model updater 2512 may determine whether the authentication data 2538 corresponds to a user (e.g., the user 2552) authorized to update the speaker model 2576.

The model updater 2512 may discard the input audio signal 2534 in response to determining that the confidence level 2556 fails to satisfy the confidence level threshold 2560. In a particular aspect, the model updater 2512 may discard the input audio signal 2534 in response to determining that the authentication data 2538 does not correspond to an authorized user. The model updater 2512 may update the speaker model 2576 based on the dominant audio signal 2550 such that the confidence level 2556 of the dominant audio signal 2550 calculated based on the updated speaker model 2576 may indicate a lower confidence level (e.g., have a lower value). The confidence level threshold 2560 may be a default value.

The model updater 2512 may update the speaker model 2576 in response to determining that the confidence level 2556 satisfies the confidence level threshold 2560 or that the authentication data 2538 corresponds to the authorized user (e.g., the user 2552). For example, the model updater 2512 may update the model data 2566 based on the features 2572, the dominant audio signal 2550, or both.

In a particular aspect, given an utterance (e.g., the dominant audio signal 2550), a new speaker-independent and channel-independent Gaussian mixture model (GMM) supervector may be rewritten as:

$$M = m + Tw, \qquad \text{Equation 2}$$

where m may be a speaker-independent and channel-independent supervector (e.g., correspond to the UBM 2578), T may be a rectangular matrix of low rank, and w may be a random vector having a standard normal distribution N(0, I). Components of the vector w may be total factors. The vectors (e.g., components of the vector w) may be referred to as identity vectors (i-vectors).

A process of training a total variability matrix T (e.g., the speaker variability matrix 2562) may differ in some respects from training an eigenvoice matrix. For example, during eigenvoice training all recordings of a given speaker may be considered to belong to a single person. On the other hand, during training of the total variability matrix T, a set of utterances may be regarded as having been produced by distinct speakers. For example, the module updater 2512 may assume that each utterance corresponds to a different speaker even when the utterances may correspond to a single speaker.

The total factor w may be a hidden variable. The total factor w may be defined by a posterior distribution of the total factor w conditioned to Baum-Welch statistics for a given utterance (e.g., corresponding to the dominant audio signal 2550). The posterior distribution may be a Gaussian distribution and a mean of the posterior distribution may correspond to an i-vector.

The dominant audio signal 2550 may correspond to a sequence of L frames $\{y_1, y_2, \ldots, y_L\}$, and the UBM 2578 may be composed of c mixture components.

$$w = (I + T^t \Sigma^{-1} N(u) T)^{-1} \cdot T^t \Sigma^{-1} \tilde{F}(u), \quad \text{Equation 3}$$

$$N_c = \Sigma_{t=1}^{L} P(c|y_t, \Omega), \quad \text{Equation 4}$$

$$\tilde{F}_c = \Sigma_{t=1}^{L} P(c|y_t, \Omega)(y_t - m_c), \quad \text{Equation 5}$$

where $\Omega$ represents the UBM 2578 and where $m_c$ is a mean of the c mixture components of the UBM 2578. N(u) may be defined as a diagonal matrix of dimension CF×CF. Diagonal blocks of N(u) may be defined as $N_c I$ (c=1, ..., C). $\tilde{F}(u)$ may be defined as a supervector of dimension CF×1. $\tilde{F}(u)$ may be obtained by concatenating all first-order Baum-Welch statistics $\tilde{F}_c$ for a particular utterance u. $\Sigma$ may be defined as a diagonal covariance matrix of dimension CF×CF. The model updater 2512 may estimate $\Sigma$ during training of the total variability matrix T (e.g., the speaker variability matrix 2562).

In a particular aspect, the confidence level 2556 (e.g., a score) may be determined based on a log likelihood comparison of hypothesis $\lambda_{hyp}$ (e.g., corresponding to the speaker model 2576) and $\lambda_{\overline{hyp}}$ (e.g., corresponding to the UBM 2578), as given by the following equation:

$$\Delta(X) = \log_p(X|\lambda_{hyp}) - \log p(X|\lambda_{\overline{hyp}}), \quad \text{Equation 6}$$

In an alternative aspect, the confidence level 2556 (e.g., the score) may be determined based on comparing a target i-vector (e.g., corresponding to the speaker model 2576) and a test i-vector (e.g., corresponding to the dominant audio signal 2550), as given by the following equation:

$$\text{score}(w_{target}, w_{test}) = \frac{\langle w_{target}, w_{test} \rangle}{\|w_{target}\| \|w_{test}\|} \geq \theta, \quad \text{Equation 7}$$

The model updater 2512 may compensate for channel variability by using a linear discriminant analysis (LDA) transform, as given by the following equation:

$$k(w_1, w_2) = \frac{(A^t w_1)^t (A^t w_2)}{\sqrt{(A^t w_1)^t (A^t w_1)} \sqrt{(A^t w_2)^t (A^t w_2)}}, \quad \text{Equation 8}$$

The LDA transform may be trained to maximum interspeaker difference while minimizing intra-speaker variability.

In a particular aspect, the confidence level 2556 of the dominant audio signal 2550 calculated based on the updated speaker model 2576 may indicate a higher confidence level (e.g., have a higher value).

In a particular aspect, the speaker model 2576 may correspond to multiple users of the mobile device 2502. A main (or authorized) user (e.g., the user 2552) may use the mobile device 2502 more often than one or more other users (e.g., temporary users) of the mobile device 2502. The model updater 2512 may initially (e.g., while the amount of the model data 2566 fails to satisfy the model data threshold 2570) update the model data 2566 based on the dominant audio signal 2550 without determining whether the dominant audio signal 2550 corresponds to the speaker model 2576. At this time (e.g., while the amount of the model data 2566 fails to satisfy the model data threshold 2570), the speaker model 2576 may not be representative of speech of the main user.

As the main user uses the mobile device 2502 more often than the temporary users, a first portion of the model data 2566 corresponding to the main user may grow larger and a second portion of the model data 2566 corresponding to the temporary users may grow relatively smaller. Subsequently, when the amount of the model data 2566 satisfies the model data threshold 2570, the speaker model 2576 may correspond to a more accurate representation of speech of the main user. At this time (e.g., when the amount of the model data 2566 satisfies the model data threshold 2570), the confidence level 2556 of the dominant audio signal 2550 may be less likely to satisfy the confidence level threshold 2560 when the dominant audio signal 2550 represents one of the temporary users and more likely to satisfy the confidence level threshold 2560 when the dominant audio signal 2550 represents the main user (e.g., the user 2552). The model updater 2512 may update the speaker model 2576 based on the dominant audio signal 2550 in response to determining that the confidence level 2556 satisfies the confidence level threshold 2560.

In a particular aspect, the enrollment module 2508 may generate the new user GUI 2526 in response to a determination that the confidence level 2556 fails to satisfy the confidence level threshold 2560 or that the authentication data 2538 does not correspond to the authorized user. The new user GUI 2526 may indicate that a temporary (e.g., new) user is detected, as further described with reference to FIG. 27. The enrollment module 2508 may provide the new user GUI 2526 to a display of the mobile device 2502.

In a particular aspect, the enrollment module 2508 may store the speaker model 2576 in a restricted access area (e.g., a trustzone) of the memory 2522. For example, the speaker model 2576 may be copied to an accessible area of the memory 2522 in response to the enrollment module 2508 determining that the authentication data 2538 (e.g., an iris scan, a finger print, an image of a face, a password, etc.) corresponds to a user (e.g., the user 2552) authorized to update the speaker model 2576. The enrollment module 2508 may move the speaker model 2576 back to the restricted access area subsequent to enrollment (e.g., subsequent to updating the speaker model 2576). For example, after the speaker model 2576 is updated, the enrollment module 2508 may copy the speaker model 2576 to the restricted access area and may delete the speaker model 2576 from the accessible area of the memory 2522.

In a particular aspect, the enrollment module 2508 may determine a phoneme (or articulation) coverage of the speaker model 2576. For example, the phoneme coverage may indicate how often each phoneme is included in the model data 2566 used to generate the speaker model 2576. The enrollment module 2508 may generate a phoneme GUI indicating the phoneme coverage. For example, the phoneme GUI may include a coverage map (e.g., a histogram) indicating the phoneme coverage. The enrollment module 2508 may provide the phoneme GUI to a display of the mobile device 2502. In a particular aspect, the phoneme GUI may include phoneme coverage maps corresponding to multiple speaker models associated with the user 2552. For example, each speaker model may correspond to a particular language. The user 2552 may be able to compare phoneme coverage corresponding to each language.

In a particular aspect, the phoneme GUI may indicate one or more phonemes that the user 2552 (e.g., a non-native speaker of a particular language associated with the speaker model 2576) pronounces differently than indicated by the UBM 2578 (e.g., corresponding to native speakers of the particular language). The phoneme GUI may be part of a language training application. For example, the user 2552 may modify a pronunciation of the one or more phonemes to be more similar to the pronunciation indicated by the UBM 2578 (e.g., to sound more like a native speaker of the particular language).

In a particular aspect, a health monitoring application of the mobile device 2502 may use the speaker model 2576 and the speaker variability matrix 2562. For example, the health monitoring application may monitor speech of the user 2552 to detect an anomaly (e.g., slurred speech) that may indicate a health condition (e.g., a stroke). The health monitoring application may compare particular features (e.g., the features 2572) of the dominant audio signal 2550 to the speaker model 2576 and the speaker variability matrix 2562. The particular features may be indicative of the anomaly. The health monitoring application may generate an alert in response to determining that the particular features are not within a particular threshold of characteristic features of the user 2552 as indicated by the speaker model 2576 and the speaker variability matrix 2562. The health monitoring application may provide the alert to a display of the mobile device 2502 and/or may provide the alert to remote health monitoring devices (e.g., at a hospital, of a caregiver of the user 2552, or both).

In another particular aspect, a noise canceling application may use the speaker dictionary. For example, the noise canceling application may replace utterances (e.g., a word, a portion of a word, a phoneme, etc.) of the user 2552 in an input signal with corresponding utterances of the user 2552 included in the speaker dictionary. The utterances in the speaker dictionary may correspond to a high SNR (e.g., above a particular threshold). The noise canceling application may improve a noise quality of the input signal by replacing the utterances.

In another particular aspect, a speaker verification application may verify that a speaker corresponds to an authorized user (e.g., the user 2552) associated with the speaker model 2576. For example, the speaker verification application may generate a confidence level of an audio signal based on the speaker model 2576. In response to determining that the confidence level satisfies a confidence level threshold, the speaker verification application may determine that the speaker verification is successful.

The system 2500 may enable passive speaker enrollment using an audio signal received from a user (e.g., while the user is engaged in a call). Passive speaker enrollment may be more convenient for the user and may result in a larger data set of audio signals. The larger data set may result in a more robust speaker model. Passive enrollment may be continued to be offered to a user until sufficient model data for the user has been generated or until a user elects to disable passive enrollment.

Figure 26:
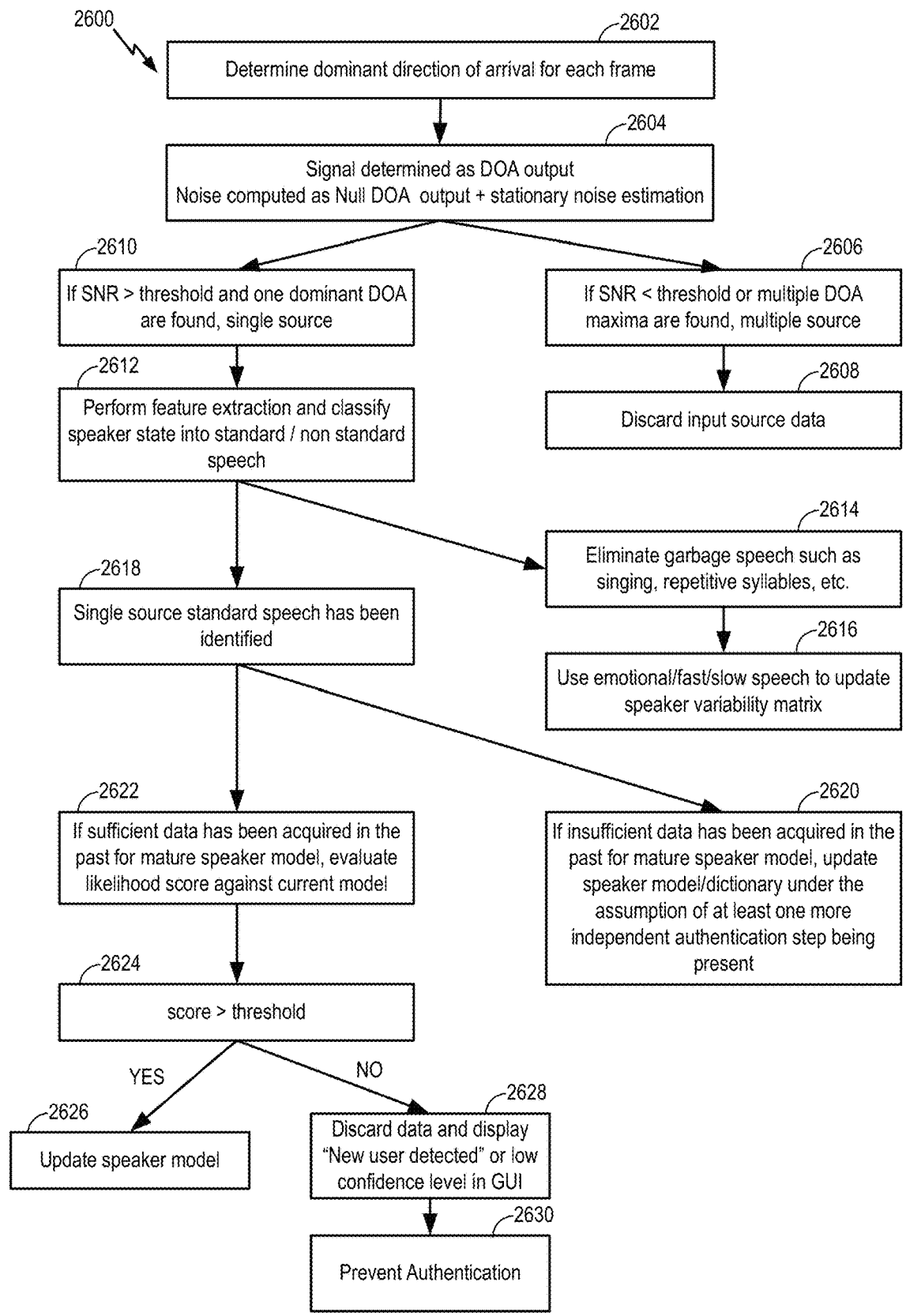
FIG. 26 is a flowchart to illustrate a particular aspect of a method of speaker enrollment.

Referring to FIG. 26, a flowchart of a particular aspect of a method of speaker enrollment is shown and generally designated 2600. In a particular aspect, the method 2600 may be performed by the enrollment module 2508 of FIG. 25.

The method 2600 includes determining a dominant direction of arrival (DOA) for each frame, at 2602. For example, the DOA analyzer 2504 of FIG. 25 may determine whether a particular frame of the input audio signal 2534 corresponds to a single dominant direction of arrival, as described with reference to FIG. 25. The DOA analyzer 2504 may determine the single dominant direction of arrival, as described with response to FIG. 25.

The method 2600 also includes determining a signal as DOA output and computing noise based on null DOA output and stationary noise estimation, at 2604. For example, the signal extractor 2510 of FIG. 25 may extract the dominant audio signal 2550 from the input audio signal 2534 based on the dominant direction of arrival, as described with reference to FIG. 25. The audio signal analyzer 2506 may compute a noise signal by applying a filter to the input audio signal 2534 that nulls the dominant audio signal 2550, as described with reference to FIG. 25. The audio signal analyzer 2506 may modify the noise signal based on a stationary noise estimation, as described with reference to FIG. 25.

The method 2600 further includes determining whether a signal-to-noise ratio (SNR) fails to satisfy (e.g., is less than) a threshold or whether multiple DOA maxima are found indicating multiple sources, at 2606. For example, the audio signal analyzer 2506 of FIG. 25 may determine whether the SNR 2558 fails to satisfy the SNR threshold 2544 or whether the input audio signal 2534 corresponds to multiple dominant directions of arrival, as described with reference to FIG. 25.

The method 2600 also includes, in response to determining that the SNR fails to satisfy the threshold or that multiple DOA maxima are found, discarding input source data, at 2608. For example, the audio signal analyzer 2506 may discard the input audio signal 2534 in response to determining that the SNR 2558 fails to satisfy the SNR threshold 2544 or that the input audio signal 2534 corresponds to multiple dominant directions of arrival, as described with reference to FIG. 25.

The method 2600 further includes, determining whether the SNR satisfies the threshold and one dominant DOA is found indicating a single source, at 2610. For example, the audio signal analyzer 2506 of FIG. 25 may determine whether the SNR 2558 satisfies the SNR threshold 2544 and whether the input audio signal 2534 corresponds to a single dominant DOA, as described with reference to FIG. 25.

The method 2600 also includes, in response to determining that the SNR satisfies the threshold and that one dominant DOA is found, performing feature extraction and classifying a speaker state into standard or non-standard speech, at 2612. For example, the audio signal analyzer 2506 of FIG. 25 may, in response to determining that the SNR 2558 satisfies the SNR threshold 2544 and that the input audio signal 2534 corresponds to a single dominant DOA, extract the features 2572 and may determine whether the input audio signal 2534 corresponds to standard or non-standard speech, as described with reference to FIG. 25.

The method 2600 further includes eliminating garbage speech such as singing, repetitive syllables, etc., at 2614. For example, the audio signal analyzer 2506 of FIG. 25 may discard the input audio signal 2534 in response to determining that the dominant audio signal 2550 corresponds to extraneous (e.g., garbage) speech, as described with reference to FIG. 25.

The method 2600 also includes using emotional, fast, and/or slow speech to update a speaker variability matrix, at 2616. For example, the model updater 2512 of FIG. 25 may update the speaker variability matrix 2562 in response to determining that the input audio signal 2534 corresponds to non-standard speech but not to extraneous speech, as described with reference to FIG. 25.

The method 2600 further includes determining that a single source standard speech has been identified, at 2618. For example, the audio signal analyzer 2506 may determine that the input audio signal 2534 corresponds to a single DOA and to standard speech, as described with reference to FIG. 25.

The method 2600 also includes, in response to determining that insufficient data has been acquired in the past for a mature speaker model, updating a speaker model and/or dictionary under the assumption of at least one more independent authentication step being present, at 2620. For example, the model updater 2512 may update the speaker model 2576, a speaker dictionary, or both, in response to determining that an amount of the model data 2566 fails to satisfy the model data threshold 2570 under the assumption that the authentication data 2538 has been determined to correspond to an authorized user, as described with reference to FIG. 25.

The method 2600 further includes evaluating likelihood score against current model in response to determining that sufficient data has been acquired in the past for a mature speaker model, at 2622. For example, the model updater 2512 may determine the confidence level 2556 of the dominant audio signal 2550 based on the speaker model 2576 in response to determining that the amount of the model data 2566 satisfies the model data threshold 2570, as described with reference to FIG. 25.

The method 2600 also includes determining whether the likelihood score satisfies a particular threshold, at 2624. For example, the model updater 2512 may determine whether the confidence level 2556 satisfies the confidence level threshold 2560, as described with reference to FIG. 25.

The method 2600 further includes updating a speaker model in response to determining that the likelihood score satisfies the particular threshold, at 2626. For example, the model updater 2512 may update the speaker model 2576 in response to determining that the confidence level 2556 satisfies the confidence level threshold 2560, as described with reference to FIG. 25.

The method 2600 also includes, in response to determining that the likelihood score fails to satisfy the particular threshold, discarding data and displaying a GUI indicating that a new user is detected, at 2628. For example, the model updater 2512 may, in response to determining that the confidence level 2556 fails to satisfy the confidence level threshold 2560, may discard the input audio signal 2534 and may provide the new user GUI 2526 to a display of the mobile device 2502, as described with reference to FIG. 25. The new user GUI 2526 may indicate that a new user is detected.

The method 2600 further includes preventing authentication, at 2640. For example, the enrollment module 2508 may prevent authentication to be performed based on the input audio signal 2534. To illustrate, the enrollment module 2508 may refrain from providing the input audio signal 2534 to the testing module 110 of FIG. 1.

The method 2600 may enable passive enrollment of the user by identifying a dominant audio signal corresponding to speech of the user and using the dominant audio signal to generate a speaker model of the user. The passive enrollment may be more convenient for the user. The passive enrollment may be performed during "normal" usage of a mobile device (e.g., during a call). For example, the user may be saved the inconvenience of participating in a training session.

Figure 27:
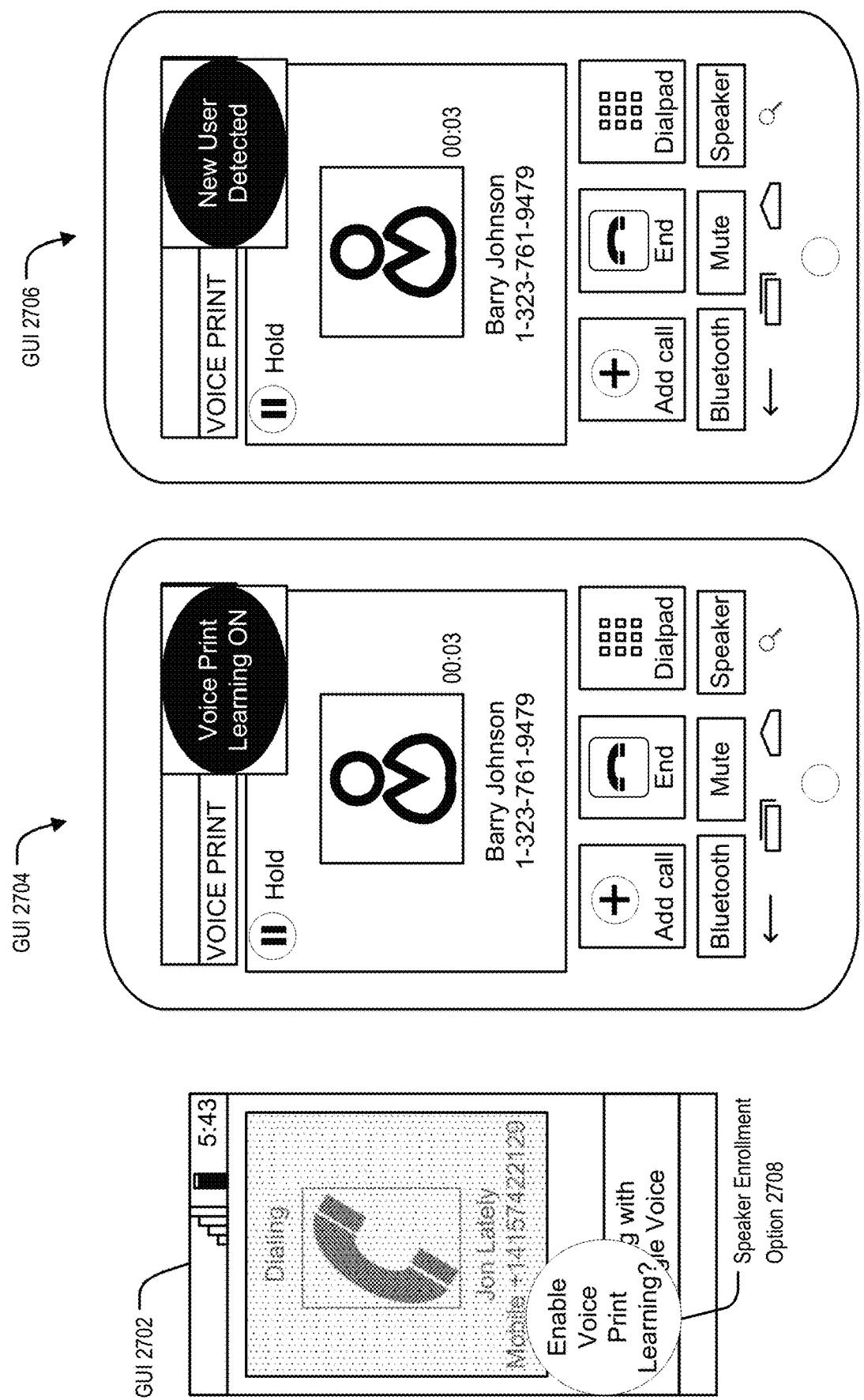
FIG. 27 is a diagram to illustrate particular aspects of graphical user interfaces (GUIs) that may be generated by the system of FIG. 1, the system of FIG. 25, or both.

Referring to FIG. 27, diagrams of particular aspects of graphical user interfaces (GUIs) are shown and generally designated 2702, 2704, and 2706. In a particular aspect, the enrollment module 2508 of FIG. 25 may generate one or more of the GUIs 2702, 2704, and 2706.

For example, the enrollment module 2508 of FIG. 25 may generate the GUI 2702 in response to receiving a selection of a call functionality of the mobile device 2502, as described with reference to FIG. 25. The GUI 2702 may include a speaker enrollment option 2708. The enrollment module 2508 may activate speaker enrollment in response to receiving a selection of the speaker enrollment option 2708, as described with reference to FIG. 25. For example, the enrollment module 2508 may begin receiving the input audio signal 2534.

The enrollment module 2508 may generate the GUI 2704 in response to receiving the selection of the speaker enrollment option 2708. The GUI 2704 may correspond to a particular aspect of the user notification GUI 2528. For example, the GUI 2704 may indicate that the speaker enrollment is activated, that audio signals received by the mobile device 2502 are being used to perform speaker enrollment, or both.

The model updater 2512 may generate the GUI 2706. The GUI 2706 may correspond to a particular aspect of the new user GUI 2526 of FIG. 25. The model updater 2512 may generate the GUI 2706 in response to determining that an amount of the model data 2566 satisfies the model data threshold 2570 and that the confidence level 2556 of the dominant audio signal 2550 fails to satisfy the confidence level threshold 2560, as described with reference to FIG. 25. The GUI 2706 may indicate that a new user is detected.

The GUIs 2702, 2704, and 2706 may provide information that may be useful to a user regarding speech enrollment. For example, the GUI 2702 may enable the user to specify which calls may be used to perform speech enrollment. The GUI 2704 may provide a visual indication to the user during speech enrollment. The GUI 2706 may provide a reason (e.g., new user detected) to the user that the call is not being used to perform speech enrollment. The GUIs 2702, 2704, and 2706 may build the user's trust. For example, the user may be more comfortable participating in passive speech enrollment because of visual indicators that inform the user when the speech enrollment is activated.

Figure 28:
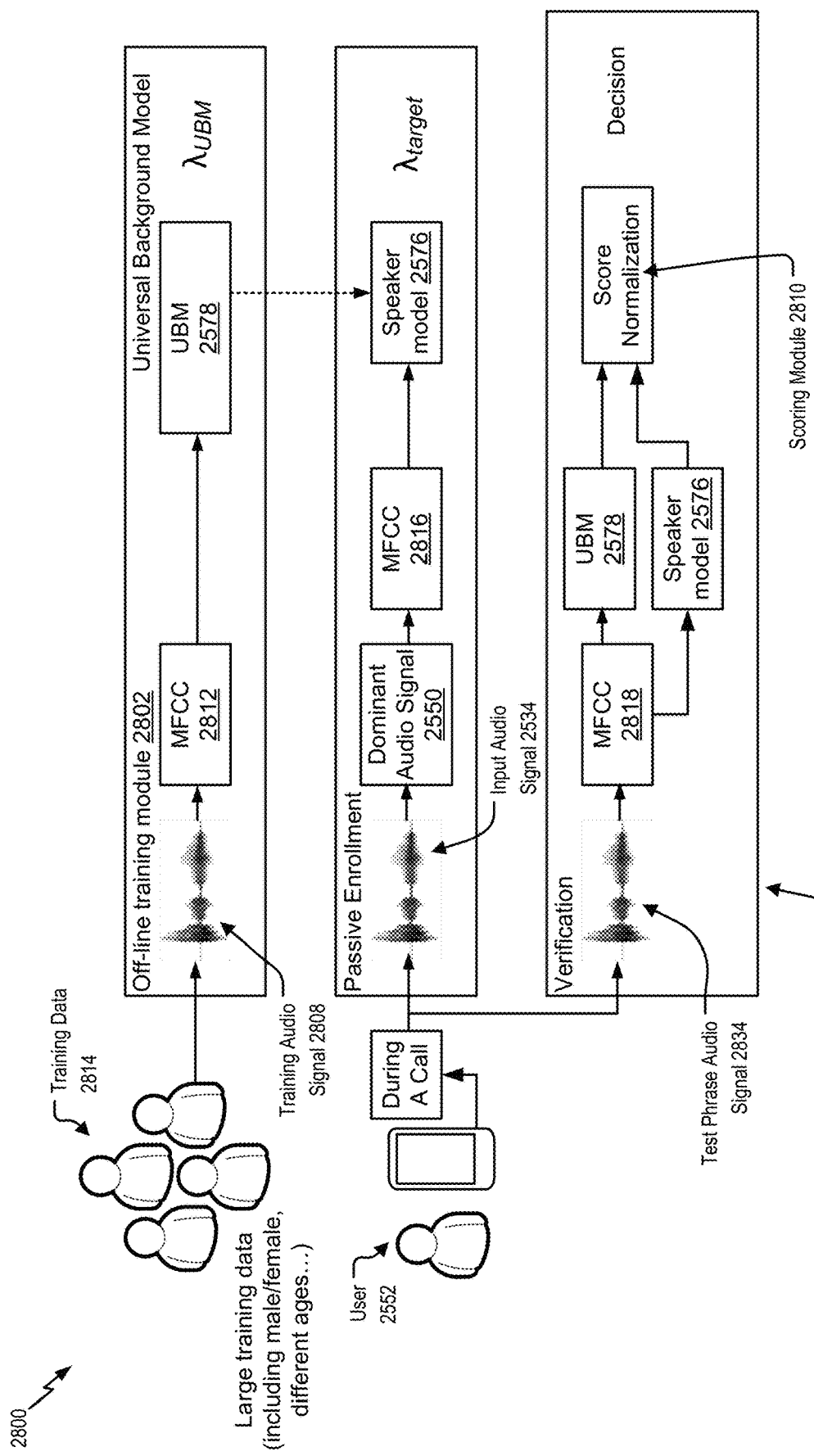
FIG. 28 is a diagram to illustrate another particular aspect of a system that is operable to perform speaker enrollment.

Referring to FIG. 28, a diagram of a particular aspect of a system of speaker enrollment is shown and generally designated 2800. In a particular aspect, one or more components of the system 2800 may correspond to or be included in the system 2500, the enrollment module 2508, or both, of FIG. 25.

The system 2800 includes an off-line training module 2802, the enrollment module 2508, and the speech verification application 2830. During operation, the offline-training module 2802 may receive a training audio signal 2808 from training data 2814. In a particular aspect, the training data 2814 may correspond to a large data set of training audio signals. For example, the training data 2814 may include multiple training audio signals corresponding to multiple speakers. The speakers may correspond to various age groups, to various genders, or both.

The offline-training module 2802 may generate the UBM 2578 corresponding to the training data 2814 (e.g., the training audio signal 2808) using mel-frequency cepstrum coefficients (MFCC). For example, the off-line training module 2802 may generate mel-frequency cepstrum coefficients (MFCC) 2812 corresponding to the training audio signal 2808. The off-line training module 2802 may generate (or update) the UBM 2578 based on the MFCC 2812.

The enrollment module 2508 may receive the input audio signal 2534 from the user 2552 during a call, as described with reference to FIG. 25. The enrollment module 2508 may generate (or update) the speaker model 2576 based on the input audio signal 2534. For example, the enrollment module 2508 may generate mel-frequency cepstrum coefficients (MFCC) 2816 corresponding to the input audio signal 2534. The enrollment module 2508 may generate (or update) the speaker model 2576 based on the MFCC 2816.

The speaker verification application 2830 may receive a test phrase audio signal 2834 corresponding to a test phrase. The speaker verification application 2830 may determine whether the test phrase audio signal 2834 satisfies a verification criterion based on the UBM 2578 and the speaker model 2576. For example, the speaker verification application 2830 may generate mel-frequency cepstrum coefficients (MFCC) 2818 corresponding to the test phrase audio signal 2834. The speaker verification application 2830 may determine a first score based on the MFCC 2818 and the UBM 2578. For example, the first score may indicate a likelihood that the test phrase audio signal 2834 corresponds to a generic speaker represented by the UBM 2578. The speaker verification application 2830 may determine a second score based on the MFCC 2818 and the speaker model 2576. For example, the second score may indicate a likelihood that the test phrase audio signal 2834 corresponds to a user (e.g., the user 2552) associated with the speaker model 2576.

The speaker verification application 2830 may include a scoring module 2810. The scoring module 2810 may normalize the first score and the second score to generate a speaker verification confidence level. For example, if the first score indicates a higher likelihood than the second score and a difference between the first score and the second score satisfies a first threshold (e.g., is large), then the speaker verification confidence level may indicate a low level of confidence that the test phrase audio signal 2834 corresponds to the user 2552. As another example, if the first score indicates a lower likelihood than the second score and a difference between the first score and the second score satisfies the first threshold (e.g., is large), then the speaker verification confidence level may indicate a high level of confidence that the test phrase audio signal 2834 corresponds to the user 2552. As a further example, if the difference between the first score and the second score does not satisfy the first threshold (e.g., is small or none), then the speaker verification confidence level may indicate a medium level of confidence that the test phrase audio signal 2834 corresponds to the user 2552.

The speaker verification application 2830 may determine that the test phrase audio signal 2834 satisfies the verification criterion in response to determining that the confidence level satisfies a speaker verification confidence level threshold.

The system 2800 enables generating a speaker model using passive speaker enrollment and using the speaker model to perform speaker verification. For example, the system 2800 may enable authenticating a user based on speech of the user.

Figure 29:
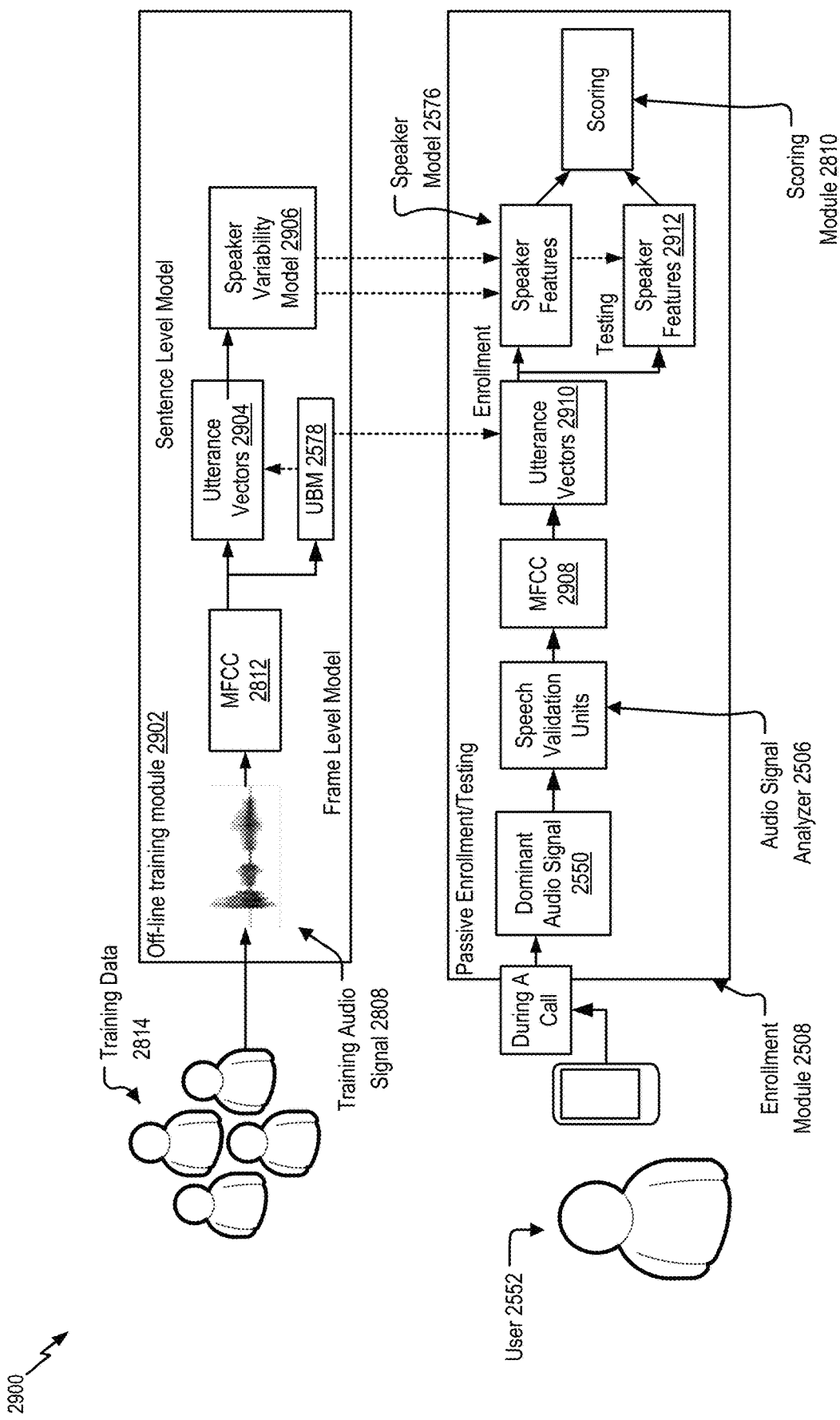
FIG. 29 is a diagram to illustrate another particular aspect of a system that is operable to perform speaker enrollment.

Referring to FIG. 29, a diagram of a particular aspect of a system of speaker enrollment is shown and generally designated 2900. One or more components of the system 2900 may correspond to, or be included in, the enrollment module 2508, the system 2500 of FIG. 25, or both.

The system 2900 includes an off-line training module 2902 and the enrollment module 2508. In a particular aspect, two or more components of the system 2900 may be combined into a single component. In a particular aspect, a particular component of the system 2900 may correspond to multiple components.

The off-line training module 2902 may generate the MFCC 2812 based on the training audio signal 2808, as described with reference to the off-line training module 2802 of FIG. 28. The off-line training module 2902 may generate (or update) the UBM 2578 based on the MFCC 2812, as described with reference to the off-line training module 2802 of FIG. 28. The off-line training module 2902 may generate utterance vectors 2904 based on the MFCC 2812. Each utterance vector may represent a speaker utterance corresponding to a particular sentence. The utterance vectors 2904 may have a uniform size regardless of a length of corresponding sentences. The utterance vectors 2904 may represent a generic speaker corresponding to the training data 2814.

The off-line training module 2902 may generate a speaker variability model 2906 based on the utterance vectors 2904. The speaker variability model 2906 may capture sentence-level features in a lower dimensional space.

During enrollment, the audio signal analyzer 2506 may generate MFCC 2908 corresponding to the dominant audio signal 2550 of FIG. 25 in response to determining that the input audio signal 2534 corresponds to a single dominant direction of arrival and that the dominant audio signal 2550 satisfies the classification criterion 2542. The audio signal analyzer 2506 may generate utterance vectors 2910 corresponding to the dominant audio signal 2550 based on the MFCC 2908. The utterance vectors 2910 may correspond to speech of the user 2552 received during a call. For example, each utterance vector may represent an utterance of the user 2552 corresponding to a particular sentence. The utterance vectors 2910 may have a uniform size regardless of lengths of corresponding sentences.

The model updater 2512 may generate the speaker model 2576 based on the utterance vectors 2910 corresponding to the dominant audio signal 2550. For example, the speaker model 2576 may indicate particular features corresponding to the utterance vectors 2910. To illustrate, the speaker model 2576 may indicate a manner in which the user 2552 combines particular sounds in a sentence. In a particular aspect, the speaker model 2576 may correspond to the speaker variability matrix 2562 corresponding to the user 2552. In a particular aspect, the speaker model 2576 may identify speaker features of the user 2552 that are distinctive from the speaker variability model 2906.

In a particular aspect, the enrollment module 2508 may include a speaker verification application. For example, the dominant audio signal 2550 may correspond to a test phrase audio signal. The test phrase audio signal may correspond to a test phrase spoken by the user 2552. During speaker verification (e.g., testing), the audio signal analyzer 2506 may generate the MFCC 2908 corresponding to the dominant audio signal 2550. In a particular aspect, the audio signal analyzer 2506 may generate the MFCC 2908 in response to determining that the test phrase audio signal corresponds to a single dominant direction of arrival and that the dominant audio signal 2550 satisfies the classification criterion 2542 (e.g., corresponds to standard speech). The audio signal analyzer 2506 may generate the utterance vectors 2910 based on the MFCC 2908 corresponding to the dominant audio signal 2550. The utterance vectors 2910 may correspond to a speaker (e.g., the user 2552) of the test phrase. The audio signal analyzer 2506 may generate speaker features 2912 based on the utterance vectors 2910 corresponding to the dominant audio signal 2550 associated with the test phrase audio signal. In a particular aspect, the speaker features 2912 may identify speaker features associated with the dominant audio signal 2550 that are distinctive from the speaker variability model 2906. The scoring module 2810 may compare the speaker features 2912 to the speaker model 2576 and may generate a score (e.g., a speaker verification confidence level) based on a similarity between the speaker features 2912 and the speaker model 2576.

The system 2900 may enable speaker verification based on a speaker model generated using passive enrollment. The passive enrollment may generate a robust speaker model based on a large data set. The robust speaker model may result in more reliable speaker verification. For example, a false alarm rate associated with unsuccessful speaker verification of authorized users may be reduced, a miss rate associated with success speaker verification of unauthorized users may be reduced, or both.

Figure 30:
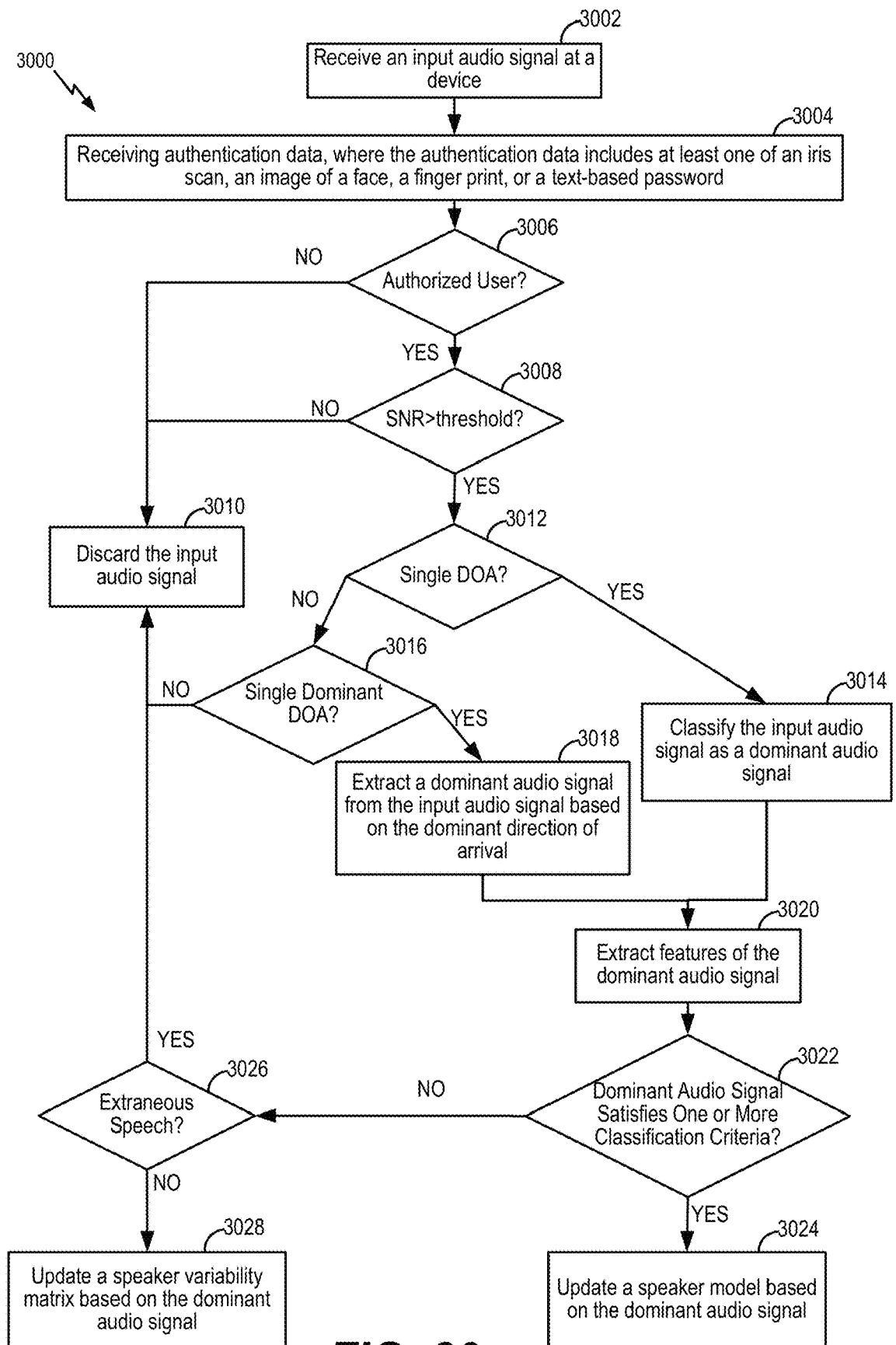
FIG. 30 is a diagram to illustrate another particular aspect of method of speaker enrollment.

Referring to FIG. 30, a flowchart of a particular aspect of a method of speaker enrollment is shown and generally designated 3000. The method 3000 may be performed by one or more components of the systems 2500 and 2800-2900 of FIGS. 25 and 28-29. For example, the method 3000 may be performed by the enrollment module 2508 of FIG. 25.

The method 3000 includes receiving an input audio signal at a device, at 3002. For example, the mobile device 2502 of FIG. 25 may receive the input audio signal 2534, as described with reference to FIG. 25.

The method 3000 also includes receiving authentication data, at 3004. The authentication data includes at least one of an iris scan, an image of a face, a finger print, a text-based password, or a combination thereof. For example, the enrollment module 2508 of FIG. 25 may receive the authentication data 2538, as described with reference to FIG. 25. The authentication data 2538 may include at least one of an iris scan, an image of a face, a finger print, or a text-based password.

The method 3000 further includes determining whether the authentication data corresponds to an authorized user, at 3006. For example, the enrollment module 2508 of FIG. 25 may determine whether the authentication data 2538 corresponds to a user (e.g., the user 2552) authorized to update (or generate) the speaker model 2576, as described with reference to FIG. 25.

The method 3000 further includes determining whether a signal-to-noise ratio (SNR) of the input audio signal satisfies a particular threshold, at 3008. For example, the enrollment module 2508 of FIG. 25 may determine whether the SNR 2558 of the input audio signal 2534 satisfies the SNR threshold 2544, as described with reference to FIG. 25.

The method 3000 also includes discarding the input audio signal in response to determining that the SNR fails to satisfy the particular threshold, at 3010. For example, the enrollment module 2508 of FIG. 25 may discard the input audio signal 2534 in response to determining that the SNR 2558 fails to satisfy the SNR threshold 2544, as described with reference to FIG. 25.

The method 3000 further includes determining whether the input audio signal corresponds to a single direction of arrival in response to determining that the SNR satisfies the particular threshold, at 3012. For example, the DOA analyzer 2504 of FIG. 25 may determine whether the input audio signal 2534 corresponds to a single direction of arrival in response to a determination that the SNR 2558 satisfies the SNR threshold 2544.

The method 3000 also includes classifying the input audio signal as a dominant audio signal in response to determining that the input audio signal corresponds to a single direction of arrival, at 3014. For example, the DOA analyzer 2504 of FIG. 25 may classify the input audio signal 2534 as the dominant audio signal 2550 in response to a determination that the input audio signal 2534 corresponds to a single direction of arrival, as described with reference to FIG. 25.

The method 3000 further includes determining whether the input audio signal corresponds to a single dominant direction of arrival in response to determining that the input audio signal corresponds to multiple directions of arrival, at 3016. For example, the DOA analyzer 2504 of FIG. 25 may determine whether the input audio signal 2534 corresponds to a single dominant direction of arrival in response to determining that the input audio signal 2534 corresponds to multiple directions of arrival, as described with reference to FIG. 25.

The method 3000 may continue to 3010 in response to determining that the input audio signal corresponds to multiple dominant directions of arrival. For example, the DOA analyzer 2504 of FIG. 25 may discard the input audio signal 2534 in response to determining that the input audio signal 2534 corresponds to multiple dominant directions of arrival, as described with reference to FIG. 25.

The method 3000 further includes extracting the dominant audio signal from the input audio signal based on the dominant direction of arrival in response to determining that the input audio signal corresponds to the single dominant direction of arrival, at 3018. For example, the signal extractor 2510 of FIG. 25 may extract the dominant audio signal 2550 from the input audio signal 2534 based on the dominant direction of arrival in response to determining that the input audio signal 2534 corresponds to the single dominant direction of arrival, as described with reference to FIG. 25.

The method 3000 also includes extracting features of the dominant audio signal, at 3020. For example, the audio signal analyzer 2506 of FIG. 25 may extract the features 2572 of the dominant audio signal 2550, as described with reference to FIG. 25.

The method 3000 further includes determining whether the dominant audio signal satisfies one or more classification criteria, at 3022. For example, the audio signal analyzer 2506 of FIG. 25 may determine whether the dominant audio signal 2550 satisfies the classification criterion 2542, as described with reference to FIG. 25.

The method 3000 also includes updating a speaker model based on the dominant audio signal in response to determining that the dominant audio signal satisfies one or more classification criteria, at 3024. For example, the model updater 2512 of FIG. 25 may update the speaker model 2576 based on the dominant audio signal 2550 in response to a determination that the dominant audio signal 2550 satisfies the classification criterion 2542, as described with reference to FIG. 25.

The method 3000 further includes determining whether the dominant audio signal corresponds to extraneous speech in response to determining that the dominant audio signal fails to satisfy the one or more classification criteria, at 3026. For example, the audio signal analyzer 2506 of FIG. 25 may determine whether the dominant audio signal 2550 corresponds to extraneous speech in response to determining that the dominant audio signal fails to satisfy the classification criterion 2542, as described with reference to FIG. 25.

The method 3000 may continue to 3010 in response to a determining that the dominant audio signal corresponds to extraneous speech. For example, the audio signal analyzer

2506 of FIG. 25 may discard the input audio signal 2534 in response to determining that the dominant audio signal 2550 corresponds to the extraneous speech, as described with reference to FIG. 25.

The method 3000 further includes updating a speaker variability matrix based on the dominant audio signal in response to determining that the dominant audio signal does not correspond to extraneous speech, at 3028. For example, the model updater 2512 may update the speaker variability matrix 2562 based on the dominant audio signal 2550 in response to a determination that the dominant audio signal 2550 does not correspond to the extraneous speech, as described with reference to FIG. 25.

The method 3000 of FIG. 30 may enable updating a speaker model or updating a speaker variability matrix based on a dominant audio signal. The dominant audio signal may be received during passive enrollment. For example, the dominant audio signal may be received while a user is engaged in a call. Passive enrollment may enable convenient generation (or update) of the speaker model (or speaker variability matrix), resulting in a larger data set of audio signals. The larger data set of audio signals may be used to generate a robust speaker model. For example, the speaker model may have wide phoneme coverage.

In particular aspects, the method 3000 of FIG. 30 may be implemented via hardware (e.g., a field-programmable gate array (FPGA) device, an application-specific integrated circuit (ASIC), etc.) of a processing unit, such as a central processing unit (CPU), a digital signal processor (DSP), or a controller, via a firmware device, or any combination thereof. As an example, the method 3000 of FIG. 30 can be performed by a processor that executes instructions, as described with respect to FIG. 42.

Figure 31:
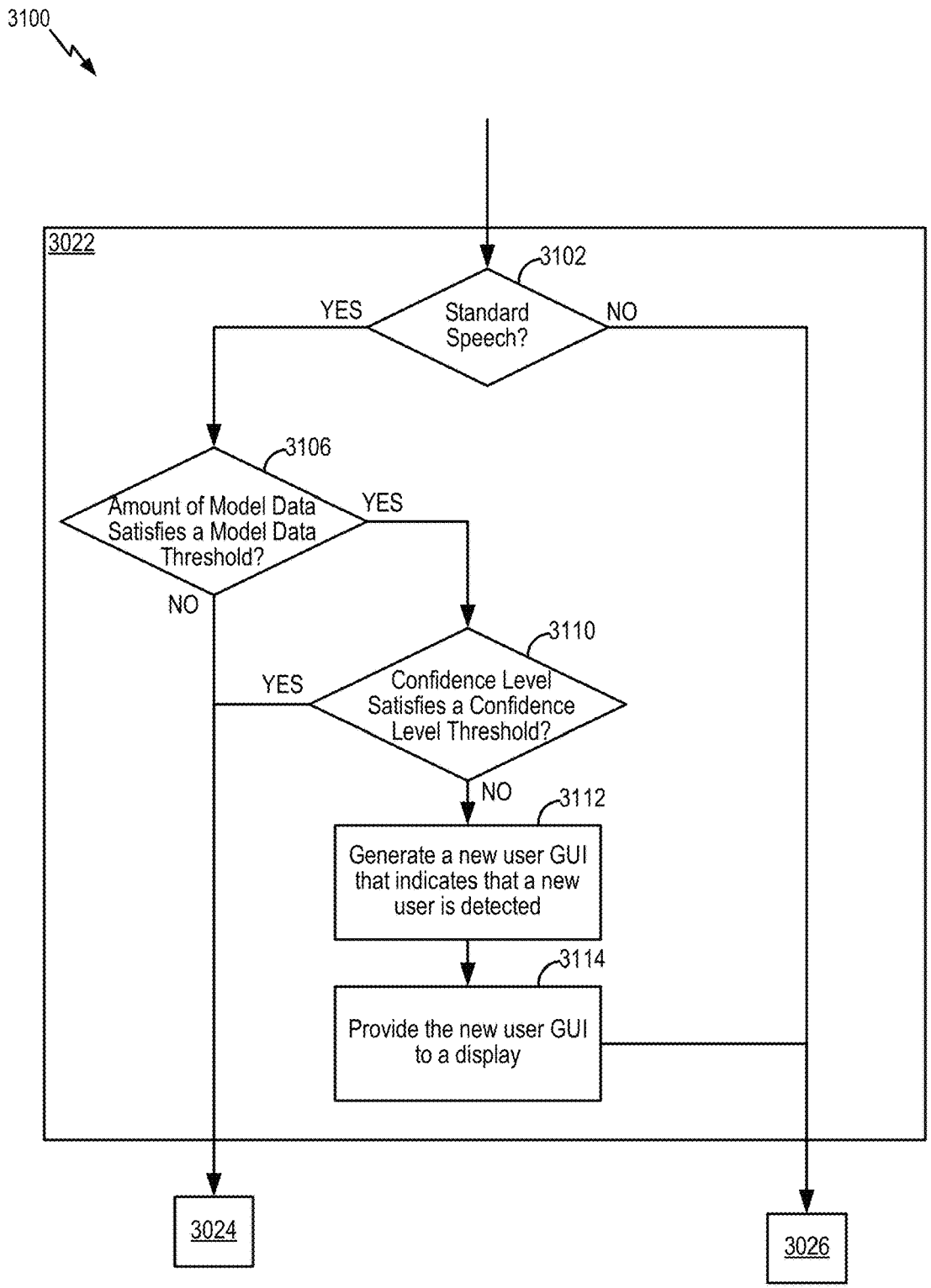
FIG. 31 is a flowchart to illustrate another particular aspect of a method of speaker enrollment.

Referring to FIG. 31, a flowchart of a particular aspect of a method of speaker enrollment is shown and generally designated 3100. The method 3100 may be performed by one or more components of the systems 2500 and 2800-2900 of FIGS. 25 and 28-29. For example, the method 3100 may be performed by the enrollment module 2508 of FIG. 25. In a particular aspect, the method 3100 may correspond to 822 of FIG. 8.

The method 3100 includes determining whether a dominant audio signal corresponds to standard speech, at 3102. For example, the audio signal analyzer 2506 of FIG. 25 may determine whether the dominant audio signal 2550 corresponds to standard speech, as described with reference to FIG. 25. The method 3100 may continue to 824 of FIG. 8 in response to determining that the dominant audio signal does not correspond to standard speech.

The method 3100 also includes determining whether an amount of model data satisfies a model data threshold in response to determining that the dominant audio signal corresponds to standard speech, at 3106. For example, the audio signal analyzer 2506 of FIG. 25 may determine whether an amount of the model data 2566 satisfies the model data threshold 2570 in response to determining that the dominant audio signal 2550 corresponds to the standard speech, as described with reference to FIG. 25. The method 3100 may continue to 824 of FIG. 8 in response to determining that the amount of model data fails to satisfy the model data threshold.

The method 3100 further includes determining whether a confidence level of the dominant audio signal satisfies a confidence level threshold, at 3110. For example, the audio signal analyzer 2506 of FIG. 25 may determine whether the confidence level 2556 of the dominant audio signal 2550 satisfies the confidence level threshold 2560, as described with reference to FIG. 25. The method 3100 may continue to 824 of FIG. 8 in response to determining that the confidence level satisfies the confidence level threshold.

The method 3100 also includes generating a new user graphical user interface (GUI) that indicates that a new user is detected in response to determining that the confidence level fails to satisfy the confidence level threshold, at 3112. For example, the audio signal analyzer 2506 of FIG. 25 may generate the new user GUI 2526 in response to determining that the confidence level 2556 fails to satisfy the confidence level threshold 2560, as described with reference to FIG. 25. The new user GUI 2526 may indicate that a new user is detected.

The method 3100 further includes providing the new user GUI to a display, at 3114. For example, the audio signal analyzer 2506 of FIG. 25 may provide the new user GUI 2526 to a display of the mobile device 2502, as described with reference to FIG. 25. The method 3100 may continue to 826 of FIG. 8.

The method 3100 of FIG. 31 may enable generation of a speaker model that evolves to better represent a main user of a mobile device. For example, while an amount of model data fails to satisfy a model data threshold, the model data may not be an accurate representation of speech of the main user. At this stage, the model data and the speaker model may be updated based on a dominant audio signal without determining whether the dominant audio signal is likely to correspond to a speaker represented by the speaker model. Once the amount of model data satisfies the model data threshold, the model data may be a more accurate representation of the speech of the main user. At this stage, the model data and the speaker model may be updated in response to determining that the dominant audio signal is likely to correspond to a speaker represented by the speaker model.

In particular aspects, the method 3100 of FIG. 31 may be implemented via hardware (e.g., a field-programmable gate array (FPGA) device, an application-specific integrated circuit (ASIC), etc.) of a processing unit, such as a central processing unit (CPU), a digital signal processor (DSP), or a controller, via a firmware device, or any combination thereof. As an example, the method 3100 of FIG. 31 can be performed by a processor that executes instructions, as described with respect to FIG. 42.

Figure 32:
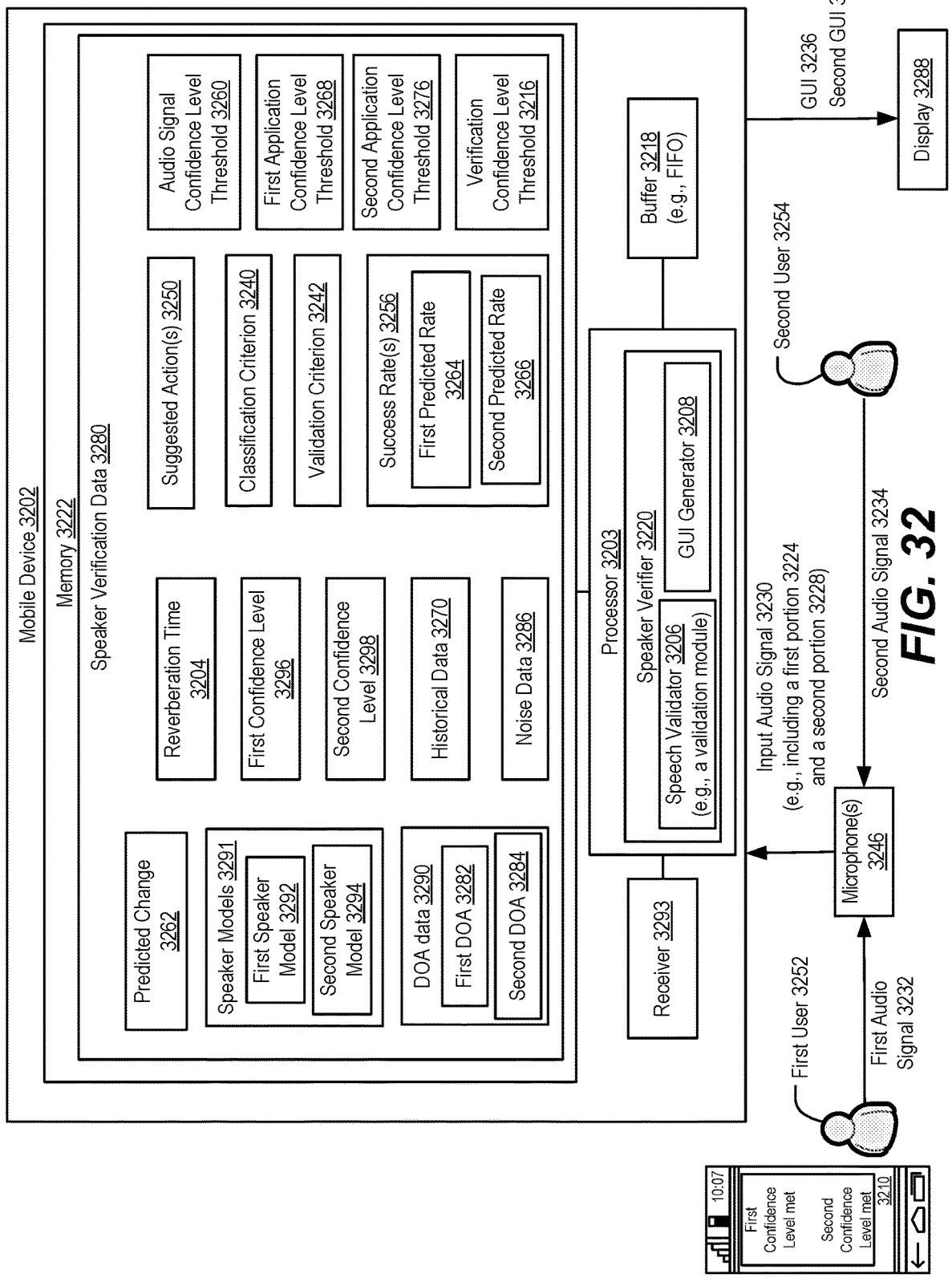
FIG. 32 is a diagram to illustrate a particular aspect of a system that is operable to perform speaker verification.

Referring to FIG. 32, a particular aspect of a system that is operable to perform speaker verification is shown and generally designated 3200. In a particular aspect, the system 3200 may correspond to the system 100 of FIG. 1, the system 2500 of FIG. 25, or both.

It should be noted that in the following description, various functions performed by the system 3200 of FIG. 32 are described as being performed by certain components or modules. However, this division of components and modules is for illustration only. In an alternate aspect, a function performed by a particular component or module may be divided amongst multiple components or modules. Moreover, in an alternate aspect, two or more components or modules of FIG. 32 may be integrated into a single component or module. Each component or module illustrated in FIG. 32 may be implemented using hardware (e.g., a field-programmable gate array (FPGA) device, an application-specific integrated circuit (ASIC), a digital signal processor (DSP), a controller, etc.), software (e.g., instructions executable by a processor), or any combination thereof.

The system 3200 includes a mobile device 3202 coupled, via a receiver 3293, to one or more microphones 3246. In a particular aspect, the mobile device 3202 may correspond to the mobile device 102 of FIG. 1, the mobile device 2502 of FIG. 25, or both. The mobile device 3202 may include a processor 3203 coupled to, or in communication with, a memory 3222. The mobile device 3202 may include a buffer 3218 (e.g., a first-in-first-out (FIFO) buffer) coupled to the processor 3203. The mobile device 3202 may be coupled to a display 3288. The processor 3203 may include a validation module. For example, the processor 3203 may include a speaker verifier 3220 and the speaker verifier 3220 may include a speech validator 3206. In a particular implementation, the speaker verifier 3220 may include a GUI generator 3208. In an alternate implementation, the display 3288 may include the GUI generator 3208. One or more operations of the systems, devices, and methods described herein may be performed by one or more processors (e.g., the processor 3203, a CPU, a DSP, or another processor). The memory 2522 may include speaker verification data 3280.

The speaker verification data 3280 may include speaker models 3291. The speaker models 3291 may include a first speaker model 3292, a second speaker model 3294, or both. The speaker verification data 3280 may include direction of arrival (DOA) data 3290. The DOA data 3290 may include a first DOA 3282, a second DOA 3284, or both. The speaker verification data 3280 may include noise data 3286, a reverberation time 3204, a first confidence level 3296, a second confidence level 3298, one or more suggested actions 3250, a predicted change 3262, a classification criterion 3240, a validation criterion 3242, an audio signal confidence level threshold 3260, a first application confidence level threshold 3268, a second application confidence level threshold 3276, a verification confidence level threshold 3216, historical data 3270, or a combination thereof. The speaker verification data 3280 may include success rates 3256. The success rates 3256 may include a first predicted rate 3264, a second predicted rate 3266, or both.

During operation, the mobile device 3202 may receive an input audio signal 3230, via the receiver 3293, from the microphones 3246. In a particular implementation, the input audio signal 3230 may correspond to the input audio signal 2534 of FIG. 25. The input audio signal 3230 may include a first audio signal 3232 from a first user 3252. In a particular implementation, the first audio signal 3232 may correspond to the test phrase audio signal 134, the audio command signal 132, the enrollment phrase audio signal 130 of FIG. 1, the first audio signal 2540 of FIG. 25, or a combination thereof. In a particular aspect, the input audio signal 3230 may be received during a voice call (e.g., a phone call or an internet call).

The input audio signal 3230 may include a first portion 3224 and a second portion 3228. The receiver 3293 may receive the first portion 3224 prior to receiving the second portion 3228. For example, the first portion 3224 may correspond to an initial portion of an utterance by the first user 3252 and the second portion 3228 may correspond to a subsequent portion of the utterance by the first user 3252. In a particular aspect, the mobile device 3202 (e.g., the speech validator 3206) may add frame data corresponding at least a portion of the input audio signal 3230 to the buffer 3218 in response to receiving the portion of the input audio signal 3230. The buffer 3218 may store audio data corresponding to a play back duration (e.g., greater than 20 seconds, approximately 1 minute, etc.). The buffer 3218 may include an enrollment buffer and an authentication buffer. During an enrollment phase, the speech validator 3206 may add the frame data to the enrollment buffer. During an authentication (or verification) phase, the speech validator 3206 may add the frame data to the authentication buffer. The speech validator 3206 may update the historical data 3270 based on processing the frame data in the buffer 3218. For example, the historical data 3270 may indicate an average verification success rate over a particular time period. As another example, the historical data 3270 may indicate an average number of frames for which the validation criterion 3242 has been satisfied over the particular time period.

A validation module (e.g., the speech validator 3206) of the speaker verifier 3220 may determine a confidence level associated with the input audio signal 3230 in real-time or near real-time. For example, the speech validator 3206 may, while the receiver 3293 is receiving the input audio signal 3230, determine a first confidence level 3296 associated with the first portion 3224 based on the first speaker model 3292, as described with reference to FIG. 1. The first speaker model 3292 may be associated with a user (e.g., an authorized user) of the mobile device 3202. The first confidence level 3296 may indicate a likelihood that the first portion 3224 corresponds to speech of the user (e.g., the authorized user) that is associated with the first speaker model 3292. The GUI generator 3208 may generate a first GUI 3210 associated with (e.g., indicating) the first confidence level 3296. The GUI generator 3208 may provide the first GUI 3210 to the display 3288 and the display 3288 may present the first GUI 3210.

The first GUI 3210 may indicate whether the first confidence level 3296 satisfies one or more confidence thresholds. For example, an audio signal that satisfies a confidence level threshold (e.g., the audio signal confidence level threshold 3260) may be used to update a speaker model (e.g., the first speaker model 3292), as described with reference to FIGS. 1 and 25. The first GUI 3210 may indicate whether the first confidence level 3296 satisfies the audio signal confidence level threshold 3260. As another example, an audio signal that satisfies a confidence level threshold (e.g., the verification confidence level threshold 3216) may be used for speaker verification, as described with reference to FIG. 1. The first GUI 3210 may indicate whether the first confidence level 3296 satisfies the verification confidence level threshold 3216. As a further example, an audio signal that satisfies an application confidence level threshold may be used for speaker verification to access the application, as described with reference to FIG. 35. To illustrate, a first application (e.g., a banking application) or functionality of the mobile device 3202 may have the first application confidence level threshold 3268. A second application (e.g., a web browsing application) or functionality of the mobile device 3202 may have the second application confidence level threshold 3276. The first application confidence level threshold 3268 may indicate a higher confidence level than the second application confidence level threshold 3276. The first GUI 3210 may indicate whether the first confidence level 3296 satisfies the first application confidence level threshold 3268, the second application confidence level threshold 3276, or both.

The speech validator 3206 may (e.g., during active enrollment or passive enrollment) update the first speaker model 3292, as described with reference to FIGS. 1 and 25, based on the first portion 3224. For example, the speech validator 3206 may extract features of the first portion 3224 and may update model data of the first speaker model 3292 to include the extracted features. The speech validator 3206 may, while the receiver 3293 is receiving the input audio signal 3230, use the updated first speaker model 3292 to determine the second confidence level 3298 associated with the second portion 3228 of the input audio signal 3230.

In a particular implementation, the second confidence level 3298 may indicate a higher level of confidence than the first confidence level 3296. The GUI generator 3208 may generate a second GUI 3226 associated with (e.g., indicating) the second confidence level 3298. The GUI generator 3208 may provide the second GUI 3226 to the display 3288 and the display 3288 may present the second GUI 3226. The second GUI 3226 may indicate whether the second confidence level 3298 satisfies one or more confidence thresholds. In a particular aspect, the display 3288 may display the first GUI 3210 at a first time and the second GUI 3226 at a second time that is subsequent to the first time. The speaker verifier 3220 may thus provide feedback to the first user 3252 indicating a confidence level that is dynamically updated based on the input audio signal 3230.

In a particular aspect, the input audio signal 3230 may be received via a plurality of microphones (e.g., the microphones 3246). The speech validator 3206 may determine DOA data (e.g., the DOA data 3290) indicating a plurality of directions of arrival associated with an input audio signal (e.g., the input audio signal 3230), as described with reference to FIG. 25. The plurality of directions of arrival may include the first DOA 3282 of the first audio signal 3232. In a particular implementation, the first DOA 3282 may correspond to a single dominant DOA and the first audio signal 3232 may correspond to a dominant audio signal, as described with reference to FIG. 25.

The speech validator 3206 may extract the first audio signal 3232 from the input audio signal based on the first DOA 3282. The speech validator 3206 may determine a plurality of confidence levels associated with the first audio signal 3232 based on the speaker models 3291. For example, the speech validator 3206 may determine the first confidence level 3296 associated with the first audio signal 3232 based on the first speaker model 3292. The speech validator 3206 may select the first speaker model 3292 based on the first confidence level 3296. The first confidence level 3296 associated with the first speaker model 3292 may correspond to a highest confidence level of the plurality of confidence levels, indicating that the first audio signal 3232 corresponds most closely to speech of a user associated with the first speaker model 3292, as compared to speech of users associated with the rest of the speaker models 3291. The speech validator 3206 may select the first speaker model 3292 in response to determining that the first confidence level 3296 associated with the first speaker model 3292 corresponds to a highest confidence level of the plurality of confidence levels. The GUI generator 3208 may generate the first GUI 3210 indicating the first confidence level 3296. For example, the first GUI 3210 may indicate whether the first confidence level 3296 satisfies one or more confidence level thresholds. In a particular aspect, the first portion 3224 may correspond to a first portion of the first audio signal 3232, and the second portion 3228 may correspond to a second portion of the first audio signal 3232.

In a particular aspect, the input audio signal 3230 may include speech signals received from multiple users (e.g., the first user 3252 and a second user 3254). For example, the plurality of directions of arrival indicated by the DOA data 3290 may include the second DOA 3284. The speech validator 3206 may extract a second audio signal 3234 from the input audio signal 3230 based on the second DOA 3284. The second audio signal 3234 may correspond to speech of the second user 3254. The speech validator 3206 may determine the second confidence level 3298 associated with the second audio signal 3234 based on the second speaker model 3294. The first speaker model 3292 may be associated with speech of a first authorized user (e.g., the first user 3252) and the second speaker model 3294 may be associated with speech of a second authorized user (e.g., the second user 3254). The first GUI 3210 may indicate the second confidence level 3298, and whether the second confidence level 3298 satisfies one or more confidence level thresholds. The speech validator 3206 may update the second speaker model 3294 based on at least a portion of the second audio signal 3234. The speaker verifier 3220 may thus provide feedback indicating confidence levels associated with multiple users. In a particular aspect, the speaker verifier 3220 may dynamically update a confidence level associated with each user based on the input audio signal 3230. In a particular aspect, the first portion 3224 may correspond to a first portion of the second audio signal 3234, and the second portion 3228 may correspond to a second portion of the second audio signal 3234.

In a particular implementation, a speaker model may correspond to one or more audio characteristics (e.g., a reverberation time, a noise level, and/or a signal-to-noise ratio). For example, the first speaker model 3292 may be generated (e.g., as described with reference to FIGS. 1 and 25) based on first audio signals having a first set of audio characteristics (e.g., a first reverberation time, a first noise level, and/or a first signal-to-noise ratio), and the second speaker model 3294 may be generated based on second audio signals having a second set of audio characteristics (e.g., a second reverberation time, a second noise level, and/or a second signal-to-noise ratio).

The speech validator 3206 may determine a set of audio characteristics of the input audio signal 3230 (e.g., the first portion 3224, the second portion 3228, the first audio signal 3232, or the second audio signal 3234). For example, the speech validator 3206 may determine the reverberation time 3204 based on the input audio signal 3230. As another example, the speech validator 3206 may generate the noise data 3286 indicating a noise level, a signal-to-noise ratio, or both, based on the input audio signal 3230. The speech validator 3206 may select a speaker model (e.g., the first speaker model 3292 or the second speaker model 3294) in response to determining that the speaker model has at least one audio characteristic in common with the set of audio characteristics based on the reverberation time 3204, the noise data 3286, or both.

The speech validator 3206 may determine a confidence level (e.g., the first confidence level 3296 or the second confidence level 3298) associated with the input audio signal 3230 based on the selected speaker model (e.g., the first speaker model 3292 or the second speaker model 3294). In a particular aspect, the speech validator 3206 may update the selected speaker model (e.g., the first speaker model 3292 or the second speaker model 3294) based on the input audio signal 3230, as described with reference to FIGS. 1 and 25.

The speech validator 3206 may determine whether the input audio signal 3230 (e.g., the first portion 3224, the second portion 3228, the first audio signal 3232, or the second audio signal 3234) satisfies the validation criterion 3242, as described with reference to FIG. 1. For example, the speech validator 3206 may determine whether the input audio signal 3230 is too noisy or too reverberated. As another example, the speech validator 3206 may determine whether the input audio signal 3230 corresponds to singing, humming, repetitive speech, and/or emotional speech. In response to determining that the input audio signal 3230 fails to satisfy the validation criterion 3242, the speech validator 3206 may generate a GUI 3236. In a particular aspect, the first GUI 3210, the second GUI 3226, or both, may include the GUI 3236. The display 3288 may present the GUI 3236. The speech validator 3206 may update the historical data 3270 based on determining whether the input audio signal 3230 satisfies the validation criterion 3242. The GUI 3236 may indicate data (e.g., an average validation rate) corresponding to the historical data 3270.

The GUI 3236 may include a variety of information that may be useful to a user (e.g., the first user 3252, the second user 3254, or both) in understanding why the speech validation was unsuccessful, how to increase a likelihood that a subsequent speech validation is successful, or both. For example, the GUI 3236 may indicate a reason that the input audio signal 3230 failed to satisfy the validation criterion 3242, as described with reference to FIGS. 1 and 25. As another example, the GUI 3236 may indicate the suggested action 3250 to be performed, as described with reference to FIG. 1. To illustrate, the suggested action 3250 may include at least one of moving to a quieter location, moving closer to a microphone of the device, reducing user background noise, speaking slower, speaking in a neutral tone, speaking at a lower volume, speaking at a higher volume, speaking in a different language, speaking a longer phrase, or enunciating more distinctly.

In a particular aspect, the GUI 3236 may indicate a predicted success rate (e.g., the first predicted rate 3264) associated with the input audio signal 3230 (e.g., the first portion 3224, the second portion 3228, the first audio signal 3232, or the second audio signal 3234), as described with reference to FIG. 1. For example, the speech validator 3206 may determine the first predicted rate 3264 based on a correlation between characteristics of the input audio signal 3230 and historical confidence levels, as described with reference to FIG. 1. The speech validator 3206 may determine the first predicted rate 3264 based on whether the historical confidence levels satisfy the verification confidence level threshold 3216.

The speech validator 3206 may determine a second predicted success rate (e.g., the second predicted rate 3266) based on a user (e.g., the first user 3252, the second user 3254, or both) performing the suggested action 3250 during speaker verification, as described with reference to FIG. 1. The speech validator 3206 may determine the predicted change 3262 based on a difference between the first predicted rate 3264 and the second predicted rate 3266. The GUI 3236 may indicate the predicted change 3262 in the predicted success rate based on the user performing the suggested action 3250 during the speaker verification. The GUI 3236 may indicate that modifying a value of a parameter (e.g., a security level, a confidence level threshold, or both) of speaker verification changes the predicted success rate, as described with reference to FIG. 1. For example, the speech validator 3206 may determine the verification confidence level threshold 3216 based on the security level. Modifying the verification confidence level threshold 3216, the security level, or both, may change the predicted success rate (e.g., the first predicted rate 3264, the second predicted rate 3266, or both).

In a particular aspect, the speech validator 3206 may determine whether the input audio signal 3230 (e.g., the first portion 3224, the second portion 3228, the first audio signal 3232, or the second audio signal 3234) satisfies one or more classification criteria (e.g., the classification criterion 3240) prior to updating a speaker model (e.g., the first speaker model 3292, the second speaker model 3294, or both), as described with reference to FIG. 25. The classification criterion 3240 may include whether the input audio signal 3230 corresponds to non-standard speech, as described with reference to FIG. 25. The classification criterion 3240 may include whether an amount of model data of the speaker model (e.g., the first speaker model 3292, the second speaker model 3294, or both) satisfies a model data threshold, as described with reference to FIG. 25. The classification criterion 3240 may include whether a confidence level (e.g., the first confidence level 3296, the second confidence level 3298, or both) of the input audio signal 3230 satisfies a confidence level threshold (e.g., the audio signal confidence level threshold 3260), as described with reference to FIG. 25.

The user (e.g., the first user 3252, the second user 3254, or both) may speak again into the microphones 3246, e.g., while or after performing the suggested action 3250. The mobile device 3202 may receive a second input audio signal via the receiver 3293, from the microphones 3246. The speech validator 3206 may determine that the second audio signal satisfies the validation criterion 3242. The second input audio signal may have better audio quality than the input audio signal 3230. In a particular aspect, the speech validator 3206 may perform enrollment (e.g., update a speaker model), perform speaker verification, or both, based on the input audio signal 3230 (e.g., the first portion 3224, the second portion 3228, the first audio signal 3232, or the second audio signal 3234) in response to determining that the input audio signal 3230 satisfies the validation criterion 3242.

The speaker verifier (e.g., the speech validator 3206 or the testing module 110 of FIG. 1) may, during speaker verification, determine whether the input audio signal 3230 satisfies a verification criterion. For example, the speech validator 3206 may determine the first confidence level 3296 (e.g., a numeric score) of the input audio signal 3230 based on a speaker model (e.g., the first speaker model 3292 or the second speaker model 3294) of an authorized (e.g., enrolled) user. The GUI generator 3208 may generate a success GUI in response to determining that the first confidence level 3296 satisfies the verification confidence level threshold 3216. The success GUI may indicate that the speaker verification is successful. In a particular aspect, the GUI generator 3208 may generate an alternative modality GUI that requests the user provide other authentication data (e.g., a text password, an iris scan, a finger print, and/or an image of the user's face) to access a functionality (e.g., an application or a feature) of the mobile device 3202 in response to determining that the first confidence level 3296 fails to satisfy the verification confidence level threshold 3216.

The speech validator 3206 may update the historical data 3270 based on determining whether the input audio signal 3230 satisfies the verification criterion. The GUI 3236 may indicate data (e.g., an average success rate) corresponding to the historical data 3270. In a particular aspect, the speaker verifier 3220 may perform speaker enrollment or speaker authentication in response to user input, in response to receiving an audio signal, periodically, in response to detecting an access to a particular application, or a combination thereof.

Figure 33:
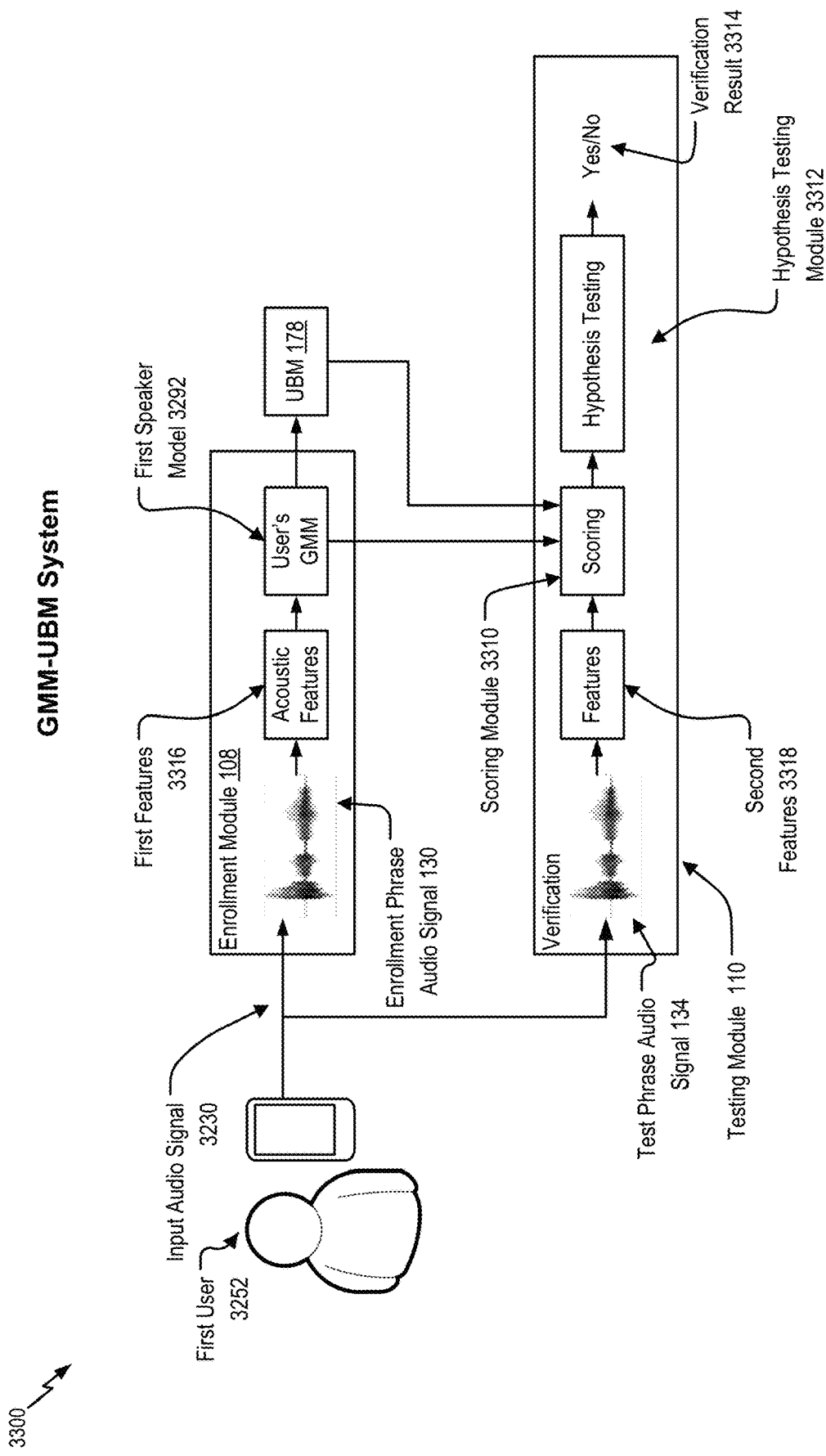
FIG. 33 is a diagram to illustrate a particular aspect of a system of speaker verification.

Referring to FIG. 33, a diagram of a particular aspect of a system of speaker verification is shown and generally designated 3300. In a particular aspect, one or more components of the system 3300 may correspond to or be included in the system 100 of FIG. 1, the system 2500 of FIG. 25, the system 3200 of FIG. 32, or a combination thereof.

The system 3300 includes the enrollment module 108 and the testing module 110 of FIG. 1. In a particular implementation, the speech validator 3206 of FIG. 32 may include the enrollment module 108, the testing module 110, or both. During operation, the enrollment module 108 and the testing module 110 may have access to the UBM 178 of FIG. 1. The UBM 178 may include features (e.g., mel-frequency cepstrum coefficients (MFCC)) generated from a set of training audio signals. The training audio signals may correspond to multiple speakers, where the multiple speakers may correspond to various age groups, to various genders, or both.

The enrollment module 108 may receive the input audio signal 3230 from the first user 3252, as described with reference to FIG. 32. For example, the input audio signal 3230 may correspond to the enrollment phrase audio signal 130 of FIG. 1. The enrollment module 108 may generate (or update) a speaker model (e.g., the first speaker model 3292) based on the input audio signal 3230. For example, the enrollment module 108 may extract first features 3316 (e.g., mel-frequency cepstrum coefficients (MFCC)) corresponding to the input audio signal 3230. The enrollment module 108 may generate (or update) the first speaker model 3292 based on the first features 3316.

The testing module 110 may also receive the input audio signal 3230. For example, the input audio signal 3230 may include the test phrase audio signal 134 corresponding to a test phrase. The testing module 110 may determine whether the input audio signal 3230 satisfies a verification criterion based on the UBM 178 and the first speaker model 3292. For example, the testing module 110 may extract second features 3318 (e.g., mel-frequency cepstrum coefficients (MFCC)) corresponding to the input audio signal 3230. The testing module 110 may determine a first score based on the second features 3318 and the UBM 178. For example, the first score may indicate a likelihood that the input audio signal 3230 corresponds to a generic speaker represented by the UBM 178. The testing module 110 may determine a second score based on the second features 3318 and the first speaker model 3292. For example, the second score may indicate a likelihood that the input audio signal 3230 corresponds to a user (e.g., the first user 3252) associated with the first speaker model 3292.

The testing module 110 may include a scoring module 3310. The scoring module 3310 may normalize the first score and the second score to generate a speaker verification confidence level. For example, if the first score is higher than the second score and a difference between the first score and the second score satisfies a first threshold (e.g., is large), then the speaker verification confidence level may indicate a low level of confidence that the input audio signal 3230 corresponds to the user associated with the first speaker model 3292. As another example, if the first score is lower than the second score and a difference between the first score and the second score satisfies the first threshold (e.g., is large), then the speaker verification confidence level may indicate a high level of confidence that the input audio signal 3230 corresponds to the user associated with the first speaker model 3292. As a further example, if the difference between the first score and the second score does not satisfy the first threshold (e.g., is small or none), then the speaker verification confidence level may indicate a medium level of confidence that the input audio signal 3230 corresponds to the user associated with the first speaker model 3292.

The testing module 110 may include a hypothesis testing module 3312. The hypothesis testing module 3312 may determine that the input audio signal 3230 satisfies the verification criterion in response to determining that the confidence level satisfies a speaker verification confidence level threshold (e.g., the verification confidence level threshold 3216 of FIG. 32). In a particular aspect, the hypothesis testing module 3312 may determine that the speaker verification is successful in response to determining that the input audio signal 3230 satisfies the verification criterion, that the input audio signal 3230 corresponds to a particular test phrase, or both. The hypothesis testing module 3312 may generate a verification result 3314 indicating whether the speaker verification is successful. The testing module 110 may generate a GUI indicating the verification result 3314. The display 3288 of FIG. 32 may present the GUI. The testing module 110 may authorize access to an application or functionality of the mobile device 3202 in response to determining that the speaker verification is successful. The testing module 110 may disable access to the application or the functionality of the mobile device 3202 in response to determining that the speaker verification is unsuccessful.

The system 3300 enables generating a speaker model using passive speaker enrollment and using the speaker model to perform speaker verification. For example, the system 3300 may enable authenticating a user based on speech of the user.

Figure 34:
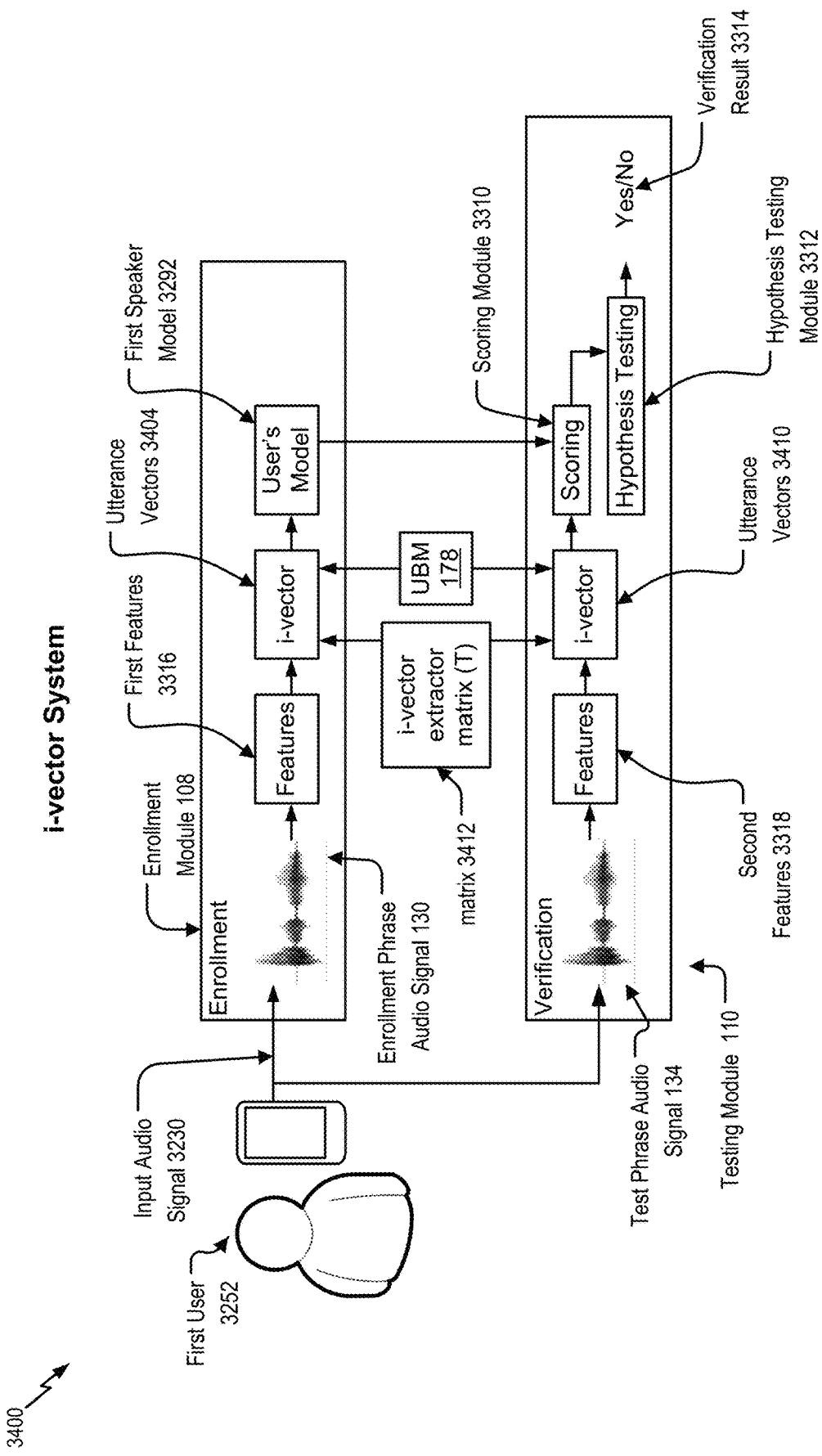
FIG. 34 is a diagram to illustrate a particular aspect of a system of speaker verification.

Referring to FIG. 34, a diagram of a particular aspect of a system of speaker verification is shown and generally designated 3400. One or more components of the system 3400 may correspond to, or be included in, the system 100 of FIG. 1, the system 2500 of FIG. 25, the system 3200 of FIG. 32, or a combination thereof.

The system 3400 includes the enrollment module 108 and the testing module 110. In a particular implementation, the speech validator 3206 of FIG. 32 may include the enrollment module 108, the testing module 110, or both. In a particular aspect, two or more components of the system 3400 may be combined into a single component. In a particular aspect, a particular component of the system 3400 may correspond to multiple components.

The enrollment module 108, the testing module 110, or both, may have access to the UBM 178, as described with reference to FIG. 33. The UBM 178 may include utterance vectors generated based on a set of training audio signals. Each utterance vector may represent a speaker utterance corresponding to a particular sentence. The utterance vectors may have a uniform size regardless of a length of corresponding sentences. The utterance vectors may represent a generic speaker corresponding to the training audio signals.

During enrollment, the enrollment module 108 may extract the first features 3316 based on the input audio signal 3230, as described with reference to FIG. 33. The enrollment module 108 may generate utterance vectors 3404 corresponding to the input audio signal 3230 based on the first features 3316. For example, the enrollment module 108 may generate the utterance vectors 3404 by applying a matrix 3412 to the first features 3316. The utterance vectors 3404 may correspond to speech of the first user 3252. For example, each utterance vector may represent an utterance of the first user 3252 corresponding to a particular sentence. The utterance vectors 3404 may have a uniform size regardless of lengths of corresponding sentences.

The enrollment module 108 may generate (or update) the first speaker model 3292 of FIG. 32 based on the utterance vectors 3404. For example, the first speaker model 3292 may indicate particular features corresponding to the utterance vectors 3404. To illustrate, the first speaker model 3292 may indicate a manner in which the first user 3252 combines particular sounds in a sentence.

The testing module 110 may receive the input audio signal 3230, as described with reference to FIG. 33. During speaker verification (e.g., testing), the testing module 110 may extract the second features 3318 from the input audio signal 3230, as described with reference to FIG. 33. The testing module 110 may generate utterance vectors 3410 based on the second features 3318. For example, the testing module 110 may generate the utterance vectors 3410 by applying the matrix 3412 to the second features 3318. The utterance vectors 3410 may correspond to a speaker (e.g., the first user 3252) of the input audio signal 3230. The scoring module 3310 may compare the utterance vectors 3410 to the first speaker model 3292 and may generate a score (e.g., the first confidence level 3296 of FIG. 32) based on a similarity between the utterance vectors 3410 and the first speaker model 3292.

The hypothesis testing module 3312 may determine that the input audio signal 3230 satisfies the verification criterion in response to determining that the first confidence level 3296 satisfies a speaker verification confidence level threshold (e.g., the verification confidence level threshold 3216 of FIG. 32). In a particular aspect, the hypothesis testing module 3312 may determine that the speaker verification is successful in response to determining that the input audio signal 3230 satisfies the verification criterion, that the input audio signal 3230 corresponds to a particular test phrase, or both. The hypothesis testing module 3312 may generate the verification result 3314 indicating whether the speaker verification is successful.

The system 3400 may enable speaker verification based on a speaker model generated using passive enrollment. The passive enrollment may generate a robust speaker model based on a large data set. The robust speaker model may result in more reliable speaker verification. For example, a false alarm rate associated with unsuccessful speaker verification of authorized users may be reduced, a miss rate associated with success speaker verification of unauthorized users may be reduced, or both.

Figure 35:
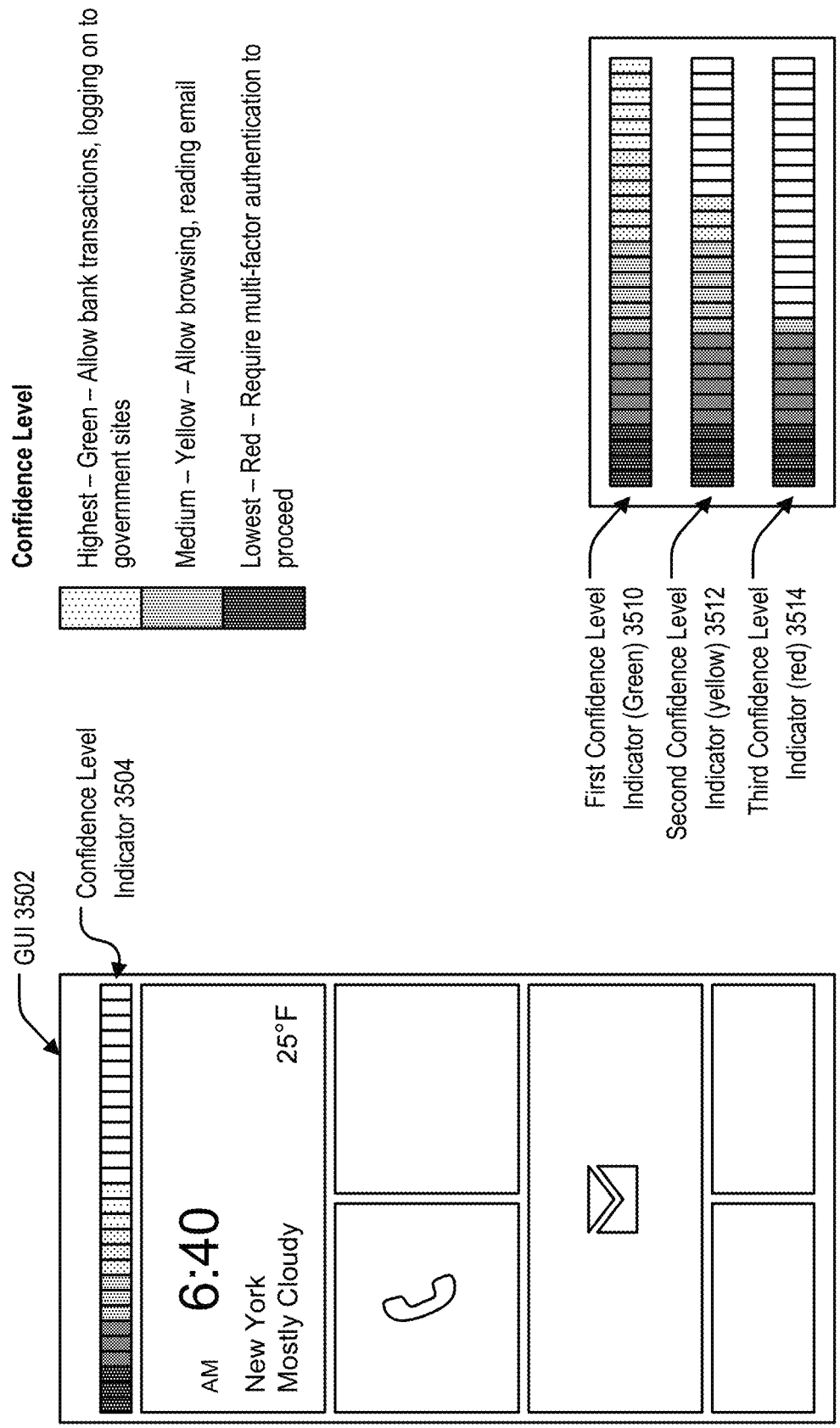
FIG. 35 is a diagram to illustrate a particular aspect of a GUI that may be generated by the system of FIG. 1, the system of FIG. 25, and/or the system of FIG. 32.

Referring to FIG. 35, a particular aspect of a GUI is shown and generally designated 3502. The GUI 3502 may be generated by the system 100 of FIG. 1, the system 2500 of FIG. 25, the system 3200 of FIG. 32, or a combination thereof.

For example, the GUI generator 3208 may generate the GUI 3502. The GUI 3502 may include a confidence level indicator 3504. The confidence level indicator 3504 may indicate the first confidence level 3296 of FIG. 32.

A size, a width, a length, a color, a shading pattern, or a combination thereof, of a confidence level indicator may indicate the first confidence level 3296. For example, a first confidence level indicator 3510 having a first color (e.g., green) and/or a long length may indicate that the first confidence level 3296 corresponds to a high level of confidence. As another example, a second confidence level indicator 3512 having a second color (e.g., yellow) and/or a medium length may indicate that the first confidence level 3296 corresponds to a medium level of confidence. As a further example, a third confidence level indicator 3514 having a third color (e.g., red) and/or a short length may indicate that the first confidence level 3296 corresponds to a low level of confidence. A particular level (e.g., the low level) of confidence may indicate that multi-factor authentication may have to be used for speaker verification.

The confidence level indicator 3504 may indicate whether the first confidence level 3296 satisfies the audio signal confidence level threshold 3260. For example, the confidence level indicator 3504 may indicate that the first confidence level 3296 satisfies the audio signal confidence threshold 3260 by indicating the medium level of confidence or the high level of confidence.

The confidence level indicator 3504 may indicate whether the first confidence level 3296 satisfies the first application confidence level threshold 3268, the second application confidence level threshold 3276, or both. For example, the confidence level indicator 3504 may indicate that the first confidence level 3296 satisfies the first application confidence level threshold 3268 by indicating a first level of confidence (e.g., the high level of confidence). As another example, the confidence level indicator 3504 may indicate that the first confidence level 3296 satisfies the second application confidence level threshold 3276 by indicating a second level of confidence (e.g., the medium level of confidence or the high level of confidence).

The confidence level indicator 3504 may indicate whether the first confidence level 3296 satisfies the verification confidence level threshold 3216. For example, the confidence level indicator 3504 may indicate that the first confidence level 3296 satisfies the verification confidence level threshold 3216 by indicating the medium level of confidence or the high level of confidence.

In a particular aspect, the GUI 3502 may dynamically update the confidence level indicator 3504 based on the input audio signal 3230. For example, the confidence level indicator 3504 may indicate the first confidence level 3296 at a first time and may indicate the second confidence level 3298 of FIG. 32 at a second time.

In a particular aspect, the GUI 3502 may include multiple confidence level indicators corresponding to multiple users. For example, the GUI 3502 may include a first confidence level indicator corresponding to the first confidence level 3296 and may include a second confidence level indicator corresponding to the second confidence level 3298. The first confidence level 3296 may be generated based on the first audio signal 3232 corresponding to speech of the first user 3252, and the second confidence level 3298 may be generated based on the second audio signal 3234 corresponding to speech of the second user 3254, as described with reference to FIG. 32.

The GUI 3502 may thus provide dynamic feedback to a user. Based on the feedback, the user may determine which applications or functionalities of a mobile device are accessible. The user may determine an effect of various actions on the confidence level. For example, the GUI 3502 may indicate a dynamically updated confidence level as the user moves from one location to another while speaking. The user may be able to determine which location corresponds to a sufficiently high confidence level to access a particular application.

Figure 36:
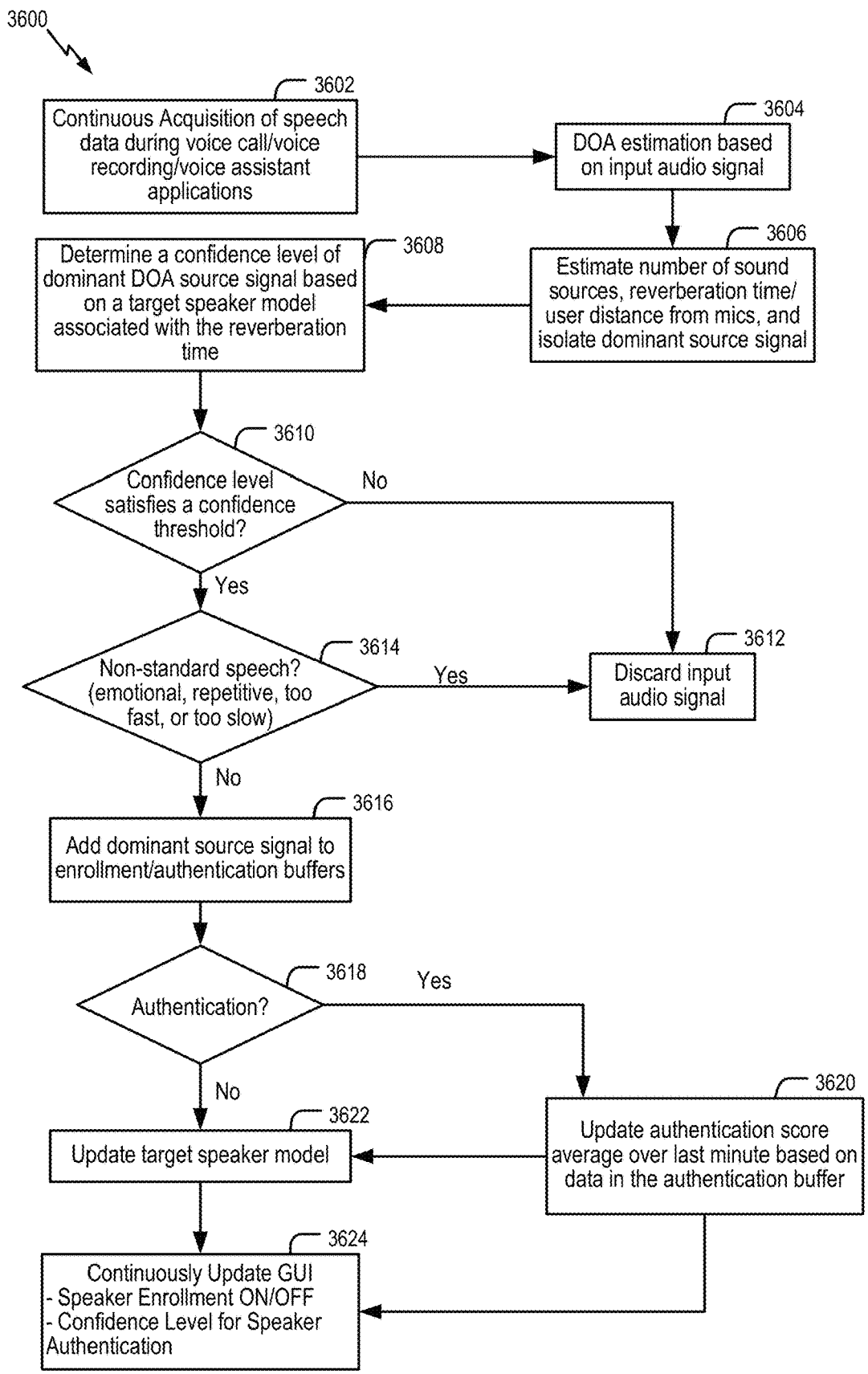
FIG. 36 is a flowchart to illustrate a particular aspect of a method of speaker verification.

Referring to FIG. 36, a particular aspect of a method of speaker verification is shown and generally designated 3600. The method 3600 may be performed by the system 100 of FIG. 1, the system 2500 of FIG. 25, the system 3200 of FIG. 32, or a combination thereof.

The method 3600 includes continuous acquisition of speech data during voice call/voice recording/voice assistant applications, at 3602. For example, the receiver 3293 of FIG. 32 may substantially continuously receive the input audio signal 3230. The input audio signal 3230 may correspond to speech of the first user 3252, the second user 3254, or both, during a voice call, a voice recording, use of a voice assistant application, or a combination thereof.

The method 3600 also includes DOA estimation based on an input audio signal, at 3604. For example, the speech validator 3206 of FIG. 32 may perform DOA estimation based on the input audio signal 3230. To illustrate, the speech validator 3206 may determine the DOA data 3290 based on the input audio signal 3230, as described with reference to FIG. 32.

The method 3600 further includes estimating a number of sound sources, reverberation time/user distance from microphones, and isolating a dominant source signal, at 3606. For example, the speech validator 3206 may determine a plurality of directions of arrival of the input audio signal 3230, as described with reference to FIG. 32. The speech validator 3206 may estimate a number of sound sources by determining that each of the plurality of directions of arrival corresponds to a particular sound source. The speech validator 3206 may isolate the first audio signal 3232 (e.g., a dominant source signal) corresponding to the first DOA 3282, as described with reference to FIG. 25. The speech validator 3206 may determine the reverberation time 3204 corresponding to the first audio signal 3232, as further described herein with reference to FIG. 37. The speech validator 3206 may estimate a distance of a sound source (e.g., the first user 3252) of the first audio signal 3232 from one or more of the microphones 3246 based on the reverberation time 3204.

The method 3600 also includes determining a confidence level of the dominant DOA source signal based on a target speaker model associated with the reverberation time, at 3608. For example, the speech validator 3206 may select the first speaker model 3292 based on the reverberation time 3204, as described with reference to FIG. 32. The speech validator 3206 may determine the first confidence level 3296 of the first audio signal 3232 based on the first speaker model 3292, as described with reference to FIG. 32.

The method 3600 further includes determining whether the confidence level satisfies a confidence threshold, at 3610. For example, the speech validator 3206 may determine whether the first confidence level 3296 satisfies the audio signal confidence level threshold 3260, as described with reference to FIG. 32.

The method 3600 also includes, in response to determining, at 3610, that the confidence level fails to satisfy the confidence threshold, discarding the input audio signal, at 3612. For example, the speech validator 3206 of FIG. 32 may discard the input audio signal 3230 in response to determining that the first confidence level 3296 fails to satisfy the audio signal confidence level threshold 3260.

The method 3600 further includes, in response to determining, at 3610, that the confidence level satisfies the confidence threshold, determining whether the dominant source signal corresponds to non-standard speech (e.g., emotional, repetitive, too fast, or too slow), at 3614. For example, the speech validator 3206 may determine whether the first audio signal 3232 corresponds to non-standard speech, as described with reference to FIGS. 1 and 25, in response to determining that the first confidence level 3296 satisfies the audio signal confidence level threshold 3260.

The method 3600 also includes, in response to determining, at 3614, that the dominant source signal corresponds to non-standard speech, proceeding to 3612 and discarding the input audio signal 3230. For example, the speech validator 3206 of FIG. 32 may discard the input audio signal 3230 in response to determining that the first audio signal 3232 corresponds to non-standard speech.

The method 3600 further includes, in response to determining that the dominant source signal does not correspond to non-standard speech, at 3614, adding the dominant source signal to an enrollment buffer, an authentication buffer, or both, at 3616. For example, the speech validator 3206 of FIG. 32 may add frame data corresponding to the first audio signal 3232 to the buffer 3218 in response to determining that the first audio signal 3232 does not correspond to non-standard speech.

The method 3600 also includes determining whether authentication is being performed, at 3618. For example, the speech validator 3206 may determine whether authentication is being performed in response to determining that the first audio signal 3232 corresponds to the audio command signal 132 or the test phrase audio signal 134, as described with reference to FIG. 1.

The method 3600 further includes, in response to determining, at 3618, that authentication is being performed, updating an authentication score average over a time period (e.g., the last minute) based on data in the authentication buffer, at 3620. For example, the speech validator 3206 may determine whether the first audio signal 3232 satisfies the verification criterion 144, as described with reference to FIG. 1. The speech validator 3206 may update the historical data 3270 based on determining whether the first audio signal 3232 satisfies the verification criterion 144, as described with reference to FIG. 32. For example, the historical data 3270 may include an authentication score average over a particular duration (e.g., a previous one minute). The speech validator 3206 may determine the first confidence level 3296 of the first audio signal 3232 based on the first speaker model 3292, as described with reference to FIG. 32. The speech validator 3206 may determine an authentication score corresponding to the first audio signal 3232 based on the first confidence level 3296. For example, the authentication score may include the first confidence level 3296, a first value (e.g., 1) indicating that the first confidence level 3296 satisfies the verification confidence level threshold 3216, or a second value (e.g., 0) indicating that the first confidence level 3296 fails to satisfy the verification confidence level threshold 3216. The speech validator 3206 may update the authentication score average based on the authentication score. The method 3600 may proceed to 3622 to update the first speaker model 3292 based on the first audio signal 3232 or may proceed to 3624 without updating the first speaker model 3292. For example, the speech validator 3206 of FIG. 32 may refrain from updating the first speaker model 3292 in response to determining that an amount of model data of the first speaker model 3292 satisfies a model data threshold.

The method 3600 includes, in response to determining, at 3618, that authentication is not being performed, updating a target speaker model, at 3622. For example, the speech validator 3206 may, during an enrollment phase, update the first speaker model 3292 based on the first audio signal 3232, as described with reference to FIG. 32. To illustrate, the speech validator 3206 may determine that enrollment is being performed (e.g., authentication is not being performed) in response to determining that the first audio signal 3232 corresponds to the enrollment phrase audio signal 130 of FIG. 1.

The method 3600 further includes continuously updating a GUI to indicate whether speaker enrollment is activated, to indicate a confidence level for speaker authentication, or both, at 3624. For example, the GUI generator 3208 may substantially continuously update a GUI (e.g., the first GUI 3210, the second GUI 3226, the GUI 3236, or a combination thereof) to indicate whether speaker enrollment is activated, as described with reference to FIG. 27. As another example, the GUI generator 3208 may substantially continuously update a GUI (e.g., the first GUI 3210, the second GUI 3226, the GUI 3236, or a combination thereof) to indicate a confidence level (e.g., the first confidence level 3296, the second confidence level 3298, or both) for speaker authentication, as described with reference to FIG. 35.

Figure 37:
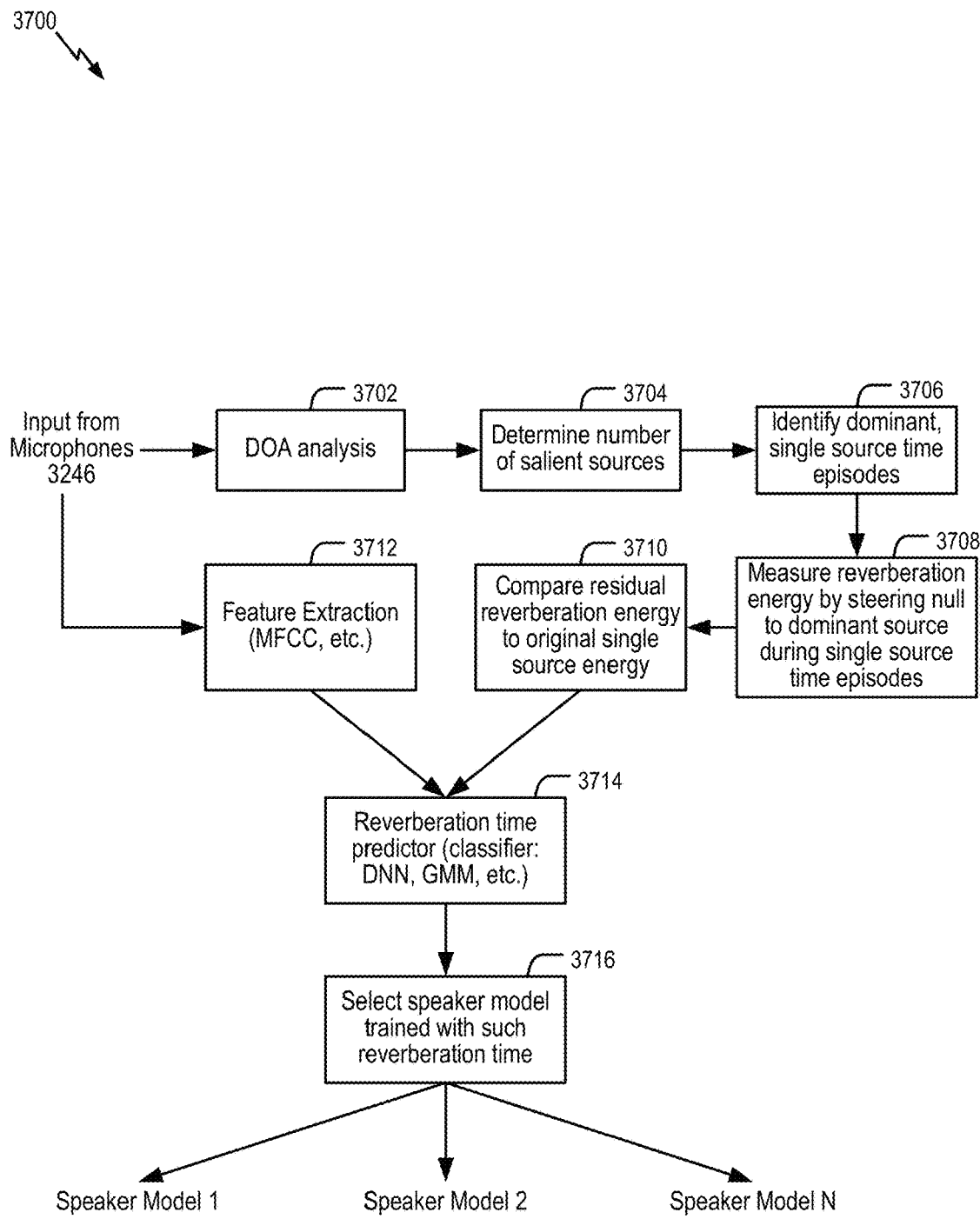
FIG. 37 is a flowchart to illustrate a particular aspect of a method of speaker verification.

Referring to FIG. 37, a particular aspect of a method of speaker verification is shown and generally designated 3700.

The method 3700 may be performed by the system 100 of FIG. 1, the system 2500 of FIG. 25, the system 3200 of FIG. 32, or a combination thereof.

The method 3700 includes performing DOA analysis, at 3702. For example, the speech validator 3206 of FIG. 32 may perform DOA analysis based on the input audio signal 3230. To illustrate, the speech validator 3206 may determine the DOA data 3290 based on the input audio signal 3230, as described with reference to FIG. 32.

The method 3700 also includes determining a number of salient sources, at 3704. For example, the speech validator 3206 may determine a plurality of directions of arrival of the input audio signal 3230, as described with reference to FIG. 32. The speech validator 3206 may estimate a number of sound sources by determining that each of the plurality of directions of arrival corresponds to a particular sound source.

The method 3700 further includes identifying dominant, single source time episodes, at 3706. For example, the speech validator 3206 of FIG. 32 may determine one or more portions (e.g., the first portion 3224, the second portion 3228, or both) of the input audio signal 3230 that correspond to a single dominant DOA, as described with reference to FIG. 25. The first portion 3224, the second portion 3228, or both may correspond to a particular time at which the input audio signal 3230 included a single dominant audio signal (e.g., the first audio signal 3232). For example, the second user 3254 may have been silent at the particular time.

The method 3700 also includes measuring reverberation energy by steering null to dominant source during single source time episodes, at 3708. For example, the speech validator 3206 of FIG. 32 may measure reverberation energy by applying a filter to the first portion 3224, the second portion 3228, or both. The filter may null a dominant audio signal (e.g., the first audio signal 3232) corresponding to the dominant DOA.

The method 3700 further includes comparing residual reverberation energy to original single source energy, at 3710. For example, the speech validator 3206 of FIG. 32 may compare residual reverberation energy (e.g., the measured reverberation energy) to reverberation energy of the first portion 3224, the second portion 3228, or both.

The method 3700 also includes performing feature extraction, at 3712. The speech validator 3206 of FIG. 32 may extract features of the input audio signal 3230 (e.g., the first portion 3224, the second portion 3228, or both).

The method 3700 further includes predicting a reverberation time, at 3714. For example, the speech validator 3206 of FIG. 32 may determine the reverberation time based on the extracted features and the comparison of the residual reverberation energy and the reverberation energy of the first portion 3224, the second portion 3228, or both. The speech validator 3206 may determine the reverberation time based on a model (e.g., a Gaussian mixture model (GMM), a deep neural network (DNN), or another model).

The method 3700 also includes selecting a speaker model trained with the predicted reverberation time, at 3716. For example, the speech validator 3206 may select a speaker model (e.g., the first speaker model 3292) based on the predicted reverberation time, as described with reference to FIG. 32.

Figure 38:
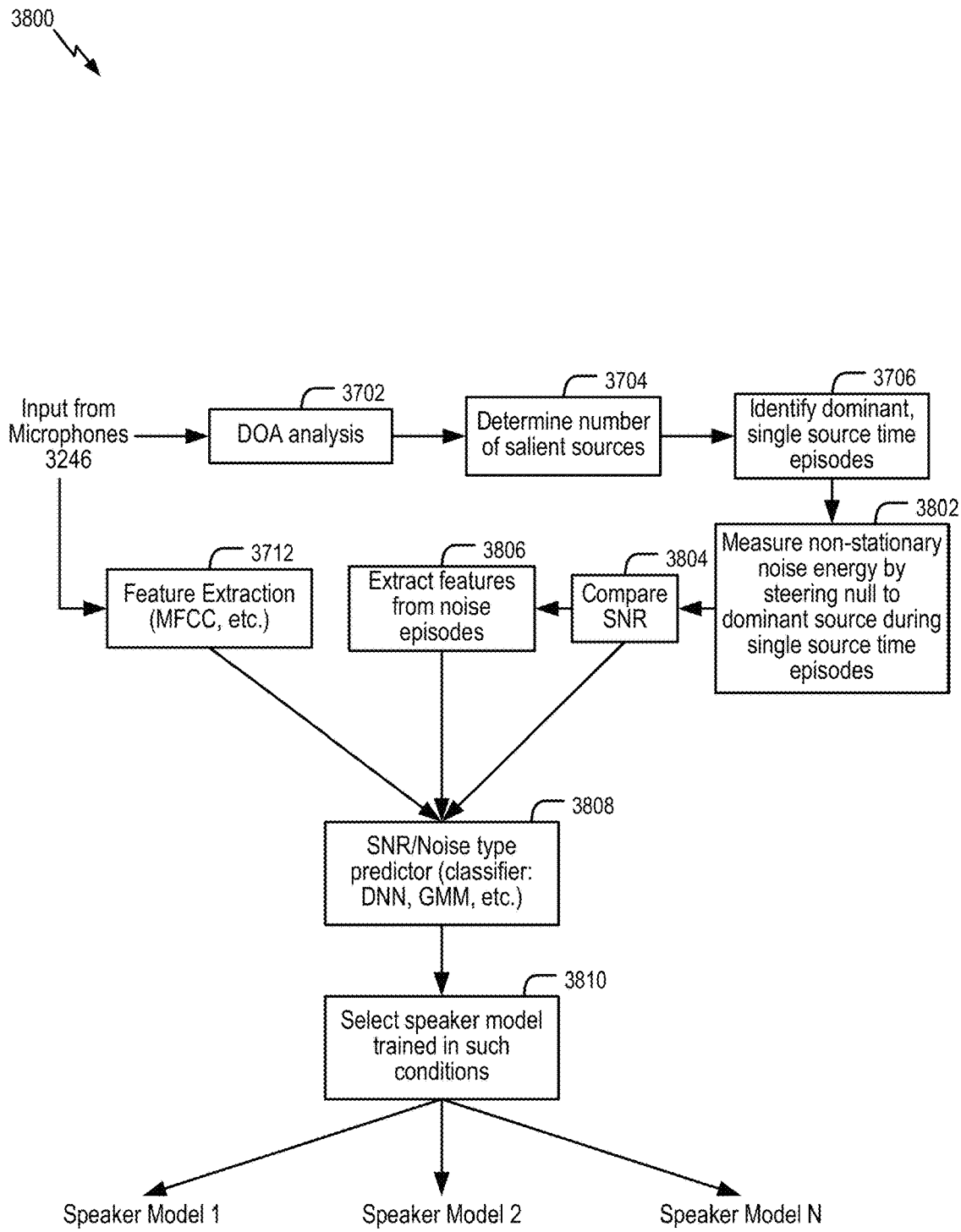
FIG. 38 is a flowchart to illustrate a particular aspect of a method of speaker verification.

Referring to FIG. 38, a particular aspect of a method of speaker verification is shown and generally designated 3800. The method 3800 may be performed by the system 100 of FIG. 1, the system 2500 of FIG. 25, or the system 3200 of FIG. 32. The method 3800 includes the steps 3702, 3704, 3706, and 3712 of the method 3700 of FIG. 37.

The method 3800 also includes measuring non-stationary noise energy by steering null to dominant source during single source time episodes, at 3802. For example, the speech validator 3206 of FIG. 32 may apply a filter to the first portion 3224, the second portion 3228, or both, to measure non-stationary noise energy. The filter may null the dominant audio signal (e.g., the first audio signal 3232).

The method 3800 further includes comparing signal-to-noise ratio (SNR), at 3804. For example, the speech validator 3206 of FIG. 32 may determine a first SNR based on the measured non-stationary noise energy. The speech validator 3206 may determine a second SNR based on the first portion 3224, the second portion 3228, or both. The speech validator 3206 may compare the first SNR and the second SNR.

The method 3800 also includes extracting features from noise episodes, at 3806. The speech validator 3206 may extract second features from the input audio signal 3230 (e.g., the first portion 3224, the second portion 3228, or both), as described with reference to FIG. 1. In a particular aspect, the speech validator 3206 may extract the second features from particular portions of the input audio signal 3230 that correspond to noise. To illustrate, the first user 3252 and the second user 3254 may be silent at a particular time corresponding to the particular portions of the input audio signal 3230, and the particular portions may correspond to user background noise.

The method 3800 further includes predicting SNR, noise, or both, at 3808. For example, the speech validator 3206 of FIG. 32 may predict SNR, noise, or both, based on the extracted features (e.g., as described with reference to step 3712), the extracted second features, the comparison of the first SNR and the second SNR, or a combination thereof. The speech validator 3206 may estimate the SNR, noise, or both, based on a model (e.g., a GMM, a DNN, or another model).

The method 3800 also includes selecting a speaker model trained in conditions corresponding to the predicted SNR, noise, or both, at 3810. For example, the speech validator 3206 of FIG. 32 may select a speaker model (e.g., the first speaker model 3292) based on the predicted SNR, noise, or both, as described with reference to FIG. 32.

Figure 39:
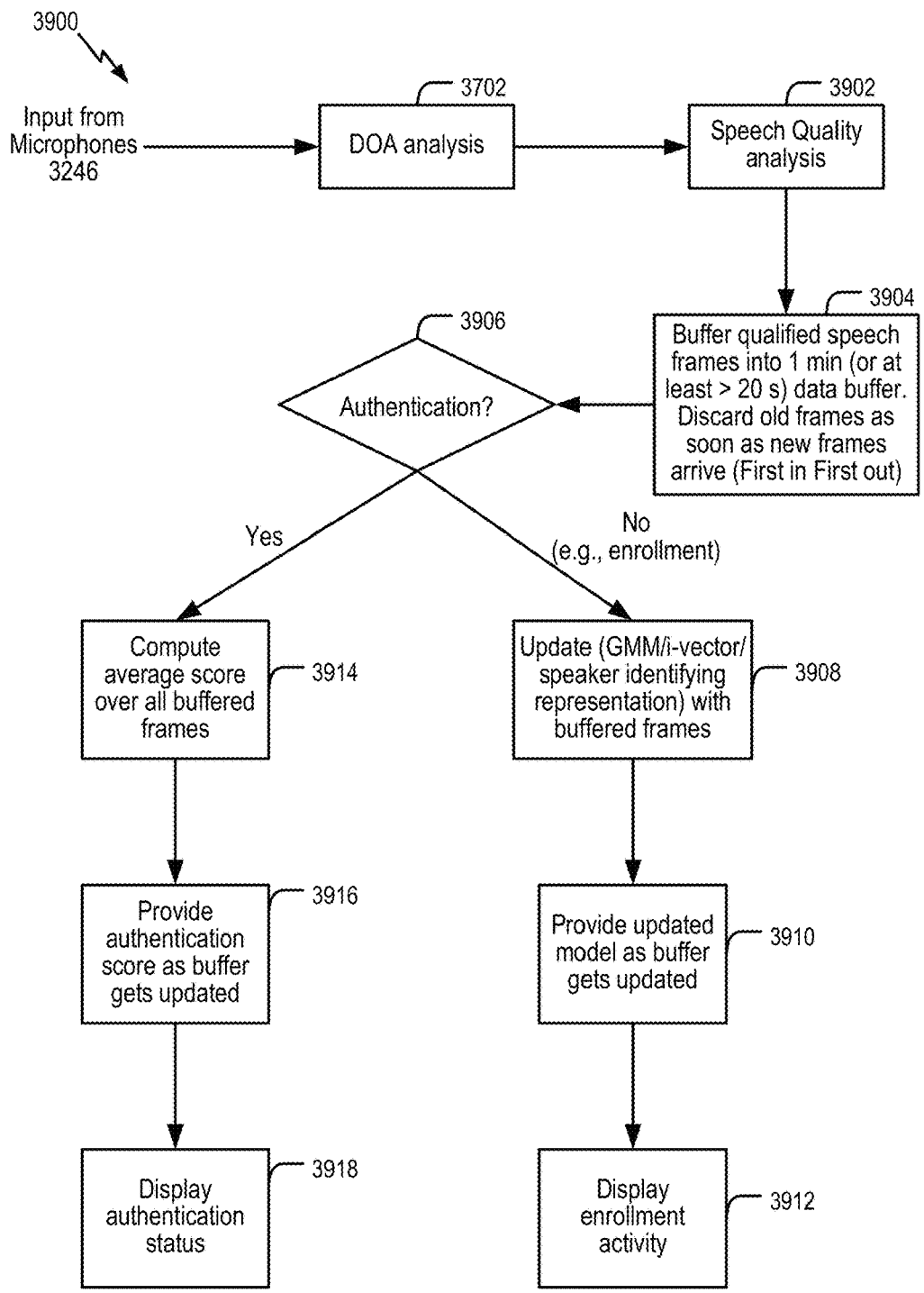
FIG. 39 is a flowchart to illustrate a particular aspect of a method of speaker verification.

Referring to FIG. 39, a particular aspect of a method of speaker verification is shown and generally designated 3900. The method 3900 may be performed by the system 100 of FIG. 1, the system 2500 of FIG. 25, or the system 3200 of FIG. 32. The method 3900 includes step 3702 of FIG. 37.

The method 3900 also includes performing speech quality analysis, at 3902. For example, the speech validator 3206 may determine whether the input audio signal 3230 (e.g., the first audio signal 3232, the second audio signal 3234, the first portion 3224, or the second portion 3228) satisfies the validation criterion 3242, as described with reference to FIGS. 1 and 32.

The method 3900 further includes buffering qualified speech frames into a data buffer and discarding old frames as soon as new frames arrive, at 3904. For example, the speech validator 3206 of FIG. 32 may, in response to determining that the input audio signal 3230 (e.g., the first audio signal 3232, the second audio signal 3234, the first portion 3224, or the second portion 3228) satisfies the validation criterion 3242, add frame data corresponding to the input audio signal 3230 to the buffer 3218, as described with reference to FIG. 32. To illustrate, the speech validator 3206 may replace the first portion 3224 in the buffer 3218 with the second portion 3228 in response to determining that the second portion 3228 satisfies the validation criterion 3242.

The method 3900 also includes determining whether authentication is being performed at 3906. For example, the speech validator 3206 of FIG. 32 may determine that authentication is being performed in response to determining that the input audio signal 3230 corresponds to the test phrase audio signal 134, the audio command signal 132, or both, of FIG. 1. In a particular aspect, the speech validator 3206 may determine that authentication is being performed in response to receiving a user input indicating that authentication is to be performed.

The method 3900 further includes, in response to determining, at 3906, that authentication is not being performed, updating a speaker model (e.g., GMM, i-vector, or other speaker identifying representation) based on the buffered frames, at 3908. For example, the speech validator 3206 may, in response to determining that enrollment is being performed (e.g., authentication is not being performed) may update the first speaker model 3292 based on the second portion 3228, as described with reference to FIG. 32. To illustrate, the speech validator 3206 may update the first speaker model 3292 based on the frame data in the buffer 3218 that corresponds to the second portion 3228.

The method 3900 also includes providing an updated speaker model as the buffer gets updated, at 3910. For example, the speech validator 3206 of FIG. 32 may determine a confidence level (e.g., the first confidence level 3296 or the second confidence level 3298) of a subsequent portion of the input audio signal 3230 based on the updated speaker model (e.g., the first speaker model 3292).

The method 3900 further includes displaying enrollment activity, at 3912. For example, the display 3288 of FIG. 32 may present one or more of the GUIs 124, one or more of the GUIs 2524, the first GUI 3210, the second GUI 3226, the GUI 3236, or a combination thereof.

The method 3900 includes, in response to determining, at 3906, that authentication is being performed, computing an average score over all buffered frames, at 3914. For example, the historical data 3270 of FIG. 32 may include an authentication score average for buffered frames. The speech validator 3206 of FIG. 32 may add frame data corresponding to a portion (e.g., the first portion 3224) of the input audio signal 3230 in the buffer 3218 in response to determining that the first portion 3224 satisfies the validation criterion 3242. The speech validator 3206 may determine the first confidence level 3296 of the first portion 3224 based on the first speaker model 3292, as described with reference to FIG. 32. The speech validator 3206 may determine an authentication score corresponding to the first portion 3224 based on the first confidence level 3296. For example, the authentication score may include the first confidence level 3296, a first value (e.g., 1) indicating that the first confidence level 3296 satisfies the verification confidence level threshold 3216, or a second value (e.g., 0) indicating that the first confidence level 3296 fails to satisfy the verification confidence level threshold 3216. The speech validator 3206 may update the authentication score average for buffered frames based on the authentication score.

The method 3900 further includes providing an authentication score as the buffer gets updated, at 3916. For example, the speech validator 3206 of FIG. 32 may update the authentication score average for buffered frames in the historical data 3270 as subsequent portions of the input audio signal 3230 are processed.

The method 3900 also includes displaying an authentication status, at 3918. For example, the display 3288 may present a GUI (e.g., one or more of the GUIs 124, one or more of the GUIs 2524, the first GUI 3210, the second GUI 3226, the GUI 3236, or a combination thereof) indicating whether the input audio signal 3230 (e.g., the first portion 3224, the second portion 3228, or both) satisfies a verification criterion, as described with reference to FIGS. 1 and 32.

Figure 40:
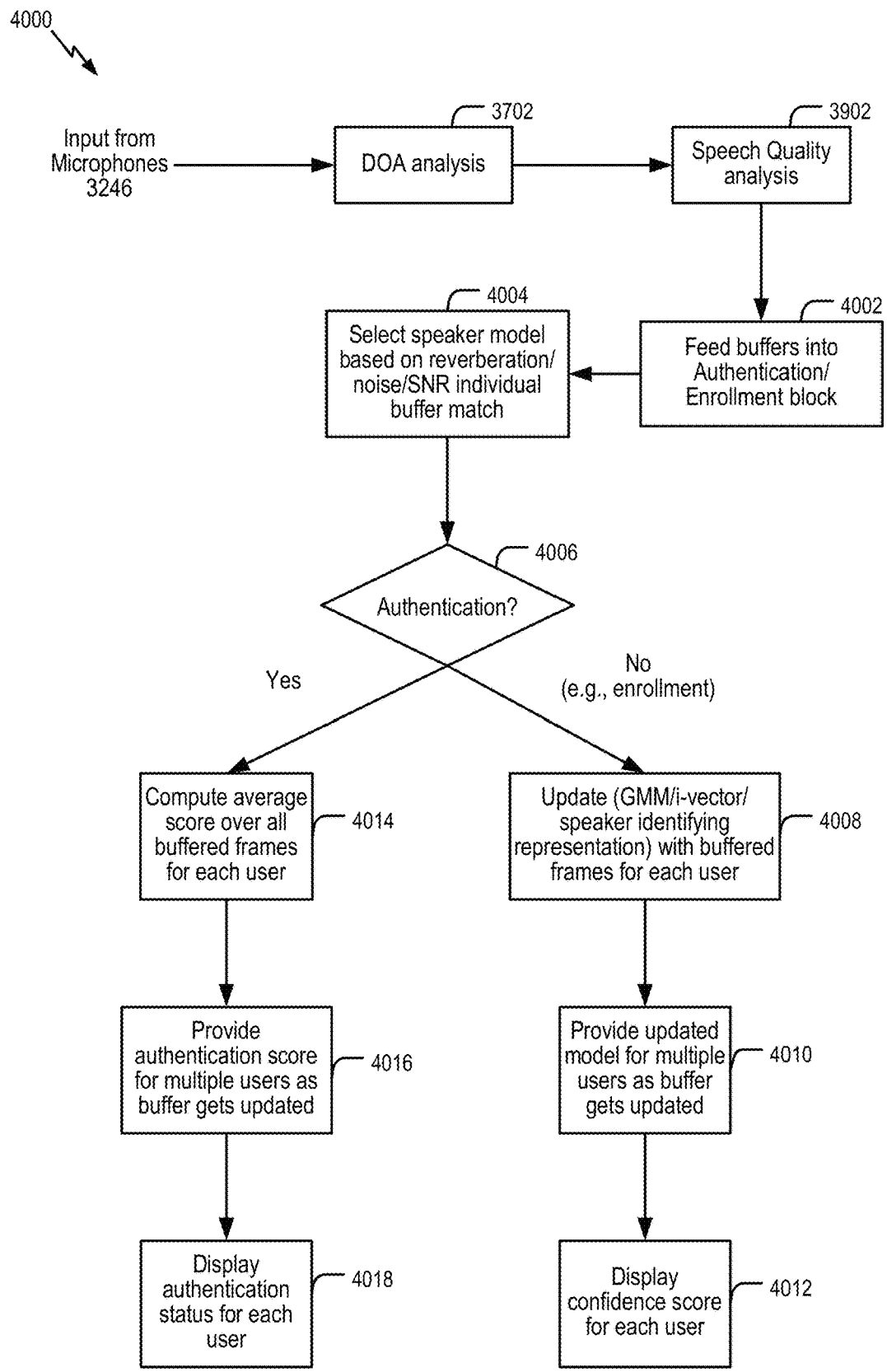
FIG. 40 is a flowchart to illustrate a particular aspect of a method of speaker verification.

Referring to FIG. 40, a particular aspect of a method of speaker verification is shown and generally designated 4000. The method 4000 may be performed by the system 100 of FIG. 1, the system 2500 of FIG. 25, or the system 3200 of FIG. 32. The method 4000 includes step 3702 of FIG. 37. The method 4000 also includes step 3902 of FIG. 39.

The method 4000 further includes feeding buffers into an authentication or enrollment block, at 4002. For example, the speaker verifier 3220 of FIG. 32 may add frame data corresponding to at least a portion (e.g., the first portion 3224, the second portion 3228, or both) of the input audio signal 3230 into the buffer 3218, as described with reference to FIG. 32. The speaker verifier 3220 may provide the frame data to the speech validator 3206. In a particular aspect, the speech verifier 120 of FIG. 1 may provide the frame data to the speech validator 106, the enrollment module 108, the testing module 110 of FIG. 1, or a combination thereof.

The method 4000 also includes selecting a speaker model based on reverberation, noise, and/or SNR individual buffer match, at 4004. For example, the speech validator 3206 of FIG. 32 may determine the reverberation time 3204, the noise data 3286, or both, as described with reference to FIG. 32, based on the frame data corresponding to the buffered portion (e.g., the first portion 3224) of the input audio signal 3230. The speech validator 3206 may select a speaker model (e.g., the first speaker model 3292) based on the reverberation time 3204, the noise data 3286, or both, as described with reference to FIG. 32.

The method 4000 further includes determining whether authentication is being performed, at 4006. For example, the speech validator 3206 of FIG. 32 may determine that authentication is being performed in response to determining that the input audio signal 3230 corresponds to the test phrase audio signal 134 or the audio command signal 132 of FIG. 1.

The method 4000 also includes, in response to determining, at 4006, that authentication is not being performed, updating a speaker model (e.g., GMM, i-vector, or other speaker identifying representation) based on buffered frames for each user, at 4008. For example, the speech validator 3206 may determine that enrollment is being performed (e.g., authentication is not being performed) in response to determining that the input audio signal 3230 corresponds to the enrollment phrase audio signal 130 of FIG. 1. In a particular aspect, the speech validator 3206 may determine that enrollment is being performed in response to receiving a user input indicating that enrollment is to be performed. The speech validator 3206 may, during an enrollment phase, update one or more speaker models based on data received from the buffer 3218. For example, the speech validator 3206 may extract first frame data (or second frame data) corresponding to the first audio signal 3232 (or the second audio signal 3234) from the buffered data. The speech validator 3206 may determine first features of the first audio signal 3232 based on the first frame data, may determine second features of the second audio signal 3234 based on the second frame data, or both. The speech validator 3206 may update the first speaker model 3292 based on the first features of the first audio signal 3232, may update the second speaker model 3294 based on the second features of the second audio signal 3234, or both, as described with reference to FIG. 32.

The method 4000 further includes providing the updated speaker model(s) for multiple users as buffer gets updates, at 4010. For example, the speech validator 3206 of FIG. 32 may use the updated speaker models to process subsequent portions of audio signals corresponding to each of the multiple users. To illustrate, the speech validator 3206 may determine the first confidence level 3296 of a subsequent portion of the first audio signal 3232 based on the updated first speaker model 3292, may determine the second confidence level 3298 of a subsequent portion of the second audio signal 3234 based on the updated second speaker model 3294, or both.

The method 4000 also includes displaying a confidence score for each user, at 4012. For example, the display 3288 of FIG. 32 may display a GUI (e.g., the first GUI 3210, the second GUI 3226, the GUI 3236, or a combination thereof) that indicates the first confidence level 3296, the second confidence level 3298, or both.

The method 4000 includes, in response to determining, at 4006, that authentication is being performed, computing an average score over all buffered frames for each user, at 4014. For example, the historical data 3270 may include a first average authentication score corresponding to the first user 3252 and a second average authentication score corresponding to the second user 3254. The speech validator 3206 may determine a first authentication score based on the first confidence level 3296. The first confidence level 3296 may correspond to at least a portion of the first audio signal 3232 associated with the first frame data. The speech validator 3206 may update the first average authentication score based on the first authentication score. The speech validator 3206 may determine a second authentication score based on the second confidence level 3298. The second confidence level 3298 may correspond to at least a portion of the second audio signal 3234 associated with the second frame data. The speech validator 3206 may update the second average authentication score based on the second authentication score.

The method 4000 also includes providing an authentication score for multiple users as the buffer is updated, at 4016. For example, the speech validator 3206 of FIG. 32 may provide the first average authentication score and the second average authentication score to the GUI generator 3208.

The method 4000 further includes displaying an authentication status for each user, at 4018. For example, the display 3288 may present a GUI (e.g., the first GUI 3210, the second GUI 3226, the GUI 3236, or a combination thereof) that indicates whether at least a portion of the first input audio signal 3232 corresponding to the first user 3252 satisfies the verification criterion 144 of FIG. 1, indicates whether at least a portion of the second input audio signal 3234 corresponding to the second user 3254 satisfies the verification criterion 144, or both, as described with reference to FIGS. 1 and 32.

Figure 41:
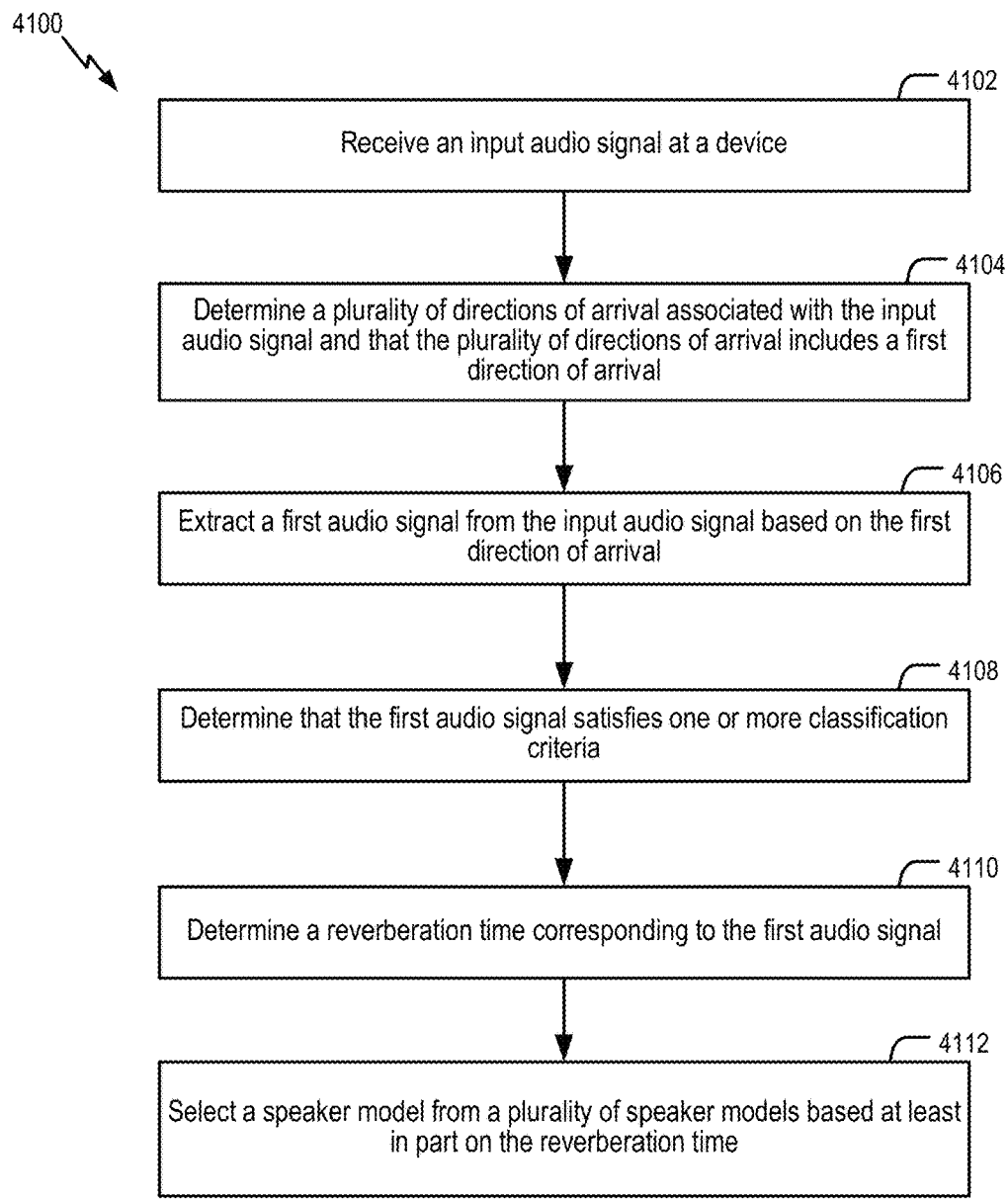
FIG. 41 is a flowchart to illustrate a particular aspect of a method of speaker verification.

Referring to FIG. 41, a particular aspect of a method of speaker verification is shown and generally designated 4100. The method 4100 may be performed by the system 100 of FIG. 1, the system 2500 of FIG. 25, the system 3200 of FIG. 32, or a combination thereof.

The method 4100 includes receiving an input audio signal at a device, at 4102. For example, the mobile device 3202 of FIG. 32 may receive the input audio signal 3230.

The method 4100 also includes determining a plurality of directions of arrival associated with the input audio signal and that the plurality of directions of arrival includes a first direction of arrival, at 4104. For example, the speech validator 3206 may determine the DOA data 3290 corresponding to a plurality of directions of arrival associated with the input audio signal 3230, as described with reference to FIG. 32. The plurality of directions of arrival may include the first DOA 3282.

The method 4100 further includes extracting a first audio signal from the input audio signal based on the first direction of arrival, at 4106. For example, the speech validator 3206 may extract the first audio signal 3232 from the input audio signal 3230 based on the first DOA 3282, as described with reference to FIG. 32.

The method 4100 also includes determining that the first audio signal satisfies one or more classification criteria, at 4108. For example, the speech validator 3206 may determine whether the first audio signal 3232 satisfies one or more classification criteria (e.g., the classification criterion 3240), as described with reference to FIG. 32.

The method 4100 further includes determining a reverberation time corresponding to the first audio signal, at 4110. For example, the speech validator 3206 may determine the reverberation time 3204 corresponding to the first audio signal 3232, as described with reference to FIG. 32.

The method 4100 also includes selecting a speaker model from a plurality of speaker models based at least in part on the reverberation time, at 4112. For example, the speech validator 3206 may select the first speaker model 3292 from the speaker models 3291 based at least in part on the reverberation time 3204, as described with reference to FIG. 32.

Figure 42:
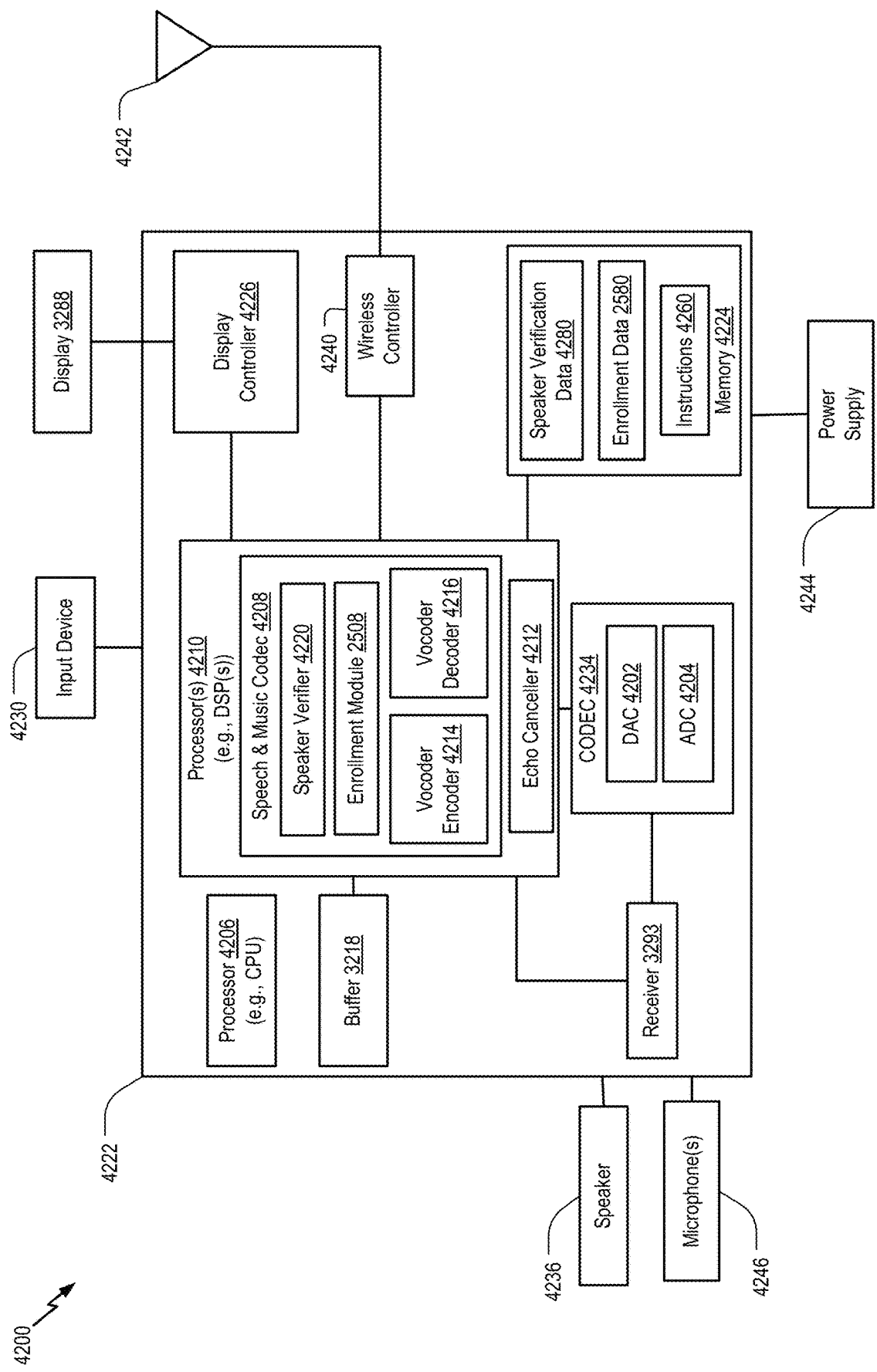
FIG. 42 is a block diagram of a device operable to perform speaker verification in accordance with the systems and methods of FIGS. 1-41.

Referring to FIG. 42, a block diagram of a particular illustrative aspect of a device (e.g., a wireless communication device) is depicted and generally designated 4200. In various implementations, the device 4200 may have fewer or more components than illustrated in FIG. 42. In an illustrative implementation, the device 4200 may correspond to the mobile device 102 of FIG. 1, the mobile device 2502 of FIG. 25, the mobile device 3202 of FIG. 32, or a combination thereof. In an illustrative aspect, the device 4200 may operate according to one or more methods or systems described with reference to FIGS. 1-41.

In a particular aspect, the device 4200 includes a processor 4206 (e.g., a central processing unit (CPU)). The device 4200 may include one or more additional processors 4210 (e.g., one or more digital signal processors (DSPs)). At least one of the processor 4206 or the additional processors 4210 may correspond to the processor 3203 of FIG. 32. The processors 4210 may include a speech and music coder-decoder (CODEC) 4208 and an echo canceller 4212. The speech and music CODEC 4208 may include a vocoder encoder 4214, a vocoder decoder 4216, or both.

The device 4200 may include a memory 4224 and a CODEC 4234. The memory 4224 may correspond to the memory 122 of FIG. 1, the memory 2522 of FIG. 25, the memory 3222 of FIG. 32, or a combination thereof. The device 4200 may include the receiver 3293, the buffer 3218, or both. The device 4200 may include a wireless controller 4240 coupled to an antenna 4242. The device 4200 may include the display 3288 coupled to a display controller 4226. A speaker 4236, one or more microphones 4246, or both may be coupled to the CODEC 4234. The microphones 4246 may correspond to the microphones 146 of FIG. 1, the microphones 2546 of FIG. 25, the microphones 3246 of FIG. 32, or a combination thereof. The CODEC 4234 may include a digital-to-analog converter (DAC) 4202 and an analog-to-digital converter (ADC) 4204.

In a particular aspect, the CODEC 4234 may receive analog signals from the one or more microphones 4246, convert the analog signals to digital signals using the analog-to-digital converter 4204, and provide the digital signals to the speech and music codec 4208. The speech and music codec 4208 may process the digital signals. In a particular aspect, the speech and music codec 4208 may provide digital signals to the CODEC 4234. The CODEC 4234 may convert the digital signals to analog signals using the digital-to-analog converter 4202 and may provide the analog signals to the speaker 4236.

The device 4200 may include a speaker verifier 4220, the enrollment module 2508 of FIG. 25, or both. In a particular aspect, the speaker verifier 4220 may correspond to the speaker verifier 120 of FIG. 1, the speaker verifier 3220 of FIG. 32, or both. In a particular aspect, one or more components of the speaker verifier 4220 may be included in the processor 4206, the processors 4210, the speech and music codec 4208, the vocoder decoder 4216, the CODEC 4234, or a combination thereof. In a particular aspect, one or more components of the enrollment module 2508 may be included in the processor 4206, the processors 4210, the speech and music codec 4208, the vocoder decoder 4216, the CODEC 4234, or a combination thereof.

The memory 4224 may include instructions 4260 executable by the processor 4206, the processors 4210, the CODEC 4234, one or more other processing units of the device 4200, or a combination thereof, to perform methods and processes disclosed herein, such as the method 2300 of FIG. 23, the method 2400 of FIG. 24, the method 2600 of FIG. 26, the method 3000 of FIG. 30, the method 3100 of FIG. 31, the method 3600 of FIG. 36, the method 3700 of FIG. 37, the method 3800 of FIG. 38, the method 3900 of FIG. 39, the method 4000 of FIG. 40, the method 4100 of FIG. 41, or a combination thereof. The memory 4224 may include speaker verification data 4280. The speaker verification data 4280 may correspond to the speaker verification data 180 of FIG. 1, the speaker verification data 3280 of FIG. 32, or both. The memory 4224 may include the enrollment data 2580 of FIG. 25.

One or more components of the systems 100, 200, 2000, 2100, 2500, 2800, 2900, 3200, 3300, and/or 3400 may be implemented via dedicated hardware (e.g., circuitry), by a processor executing instructions to perform one or more tasks, or a combination thereof. As an example, the memory 4224 or one or more components of the speech and music CODEC 4208 may be a memory device, such as a random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). The memory device may include instructions (e.g., the instructions 4260) that, when executed by a computer (e.g., a processor in the CODEC 4234, the processor 4206, and/or the processors 4210), may cause the computer to perform at least a portion of one of the methods described herein. As an example, the memory 4224 or the one or more components of the speech and music CODEC 4208 may be a non-transitory computer-readable medium that includes instructions (e.g., the instructions 4260) that, when executed by a computer (e.g., a processor in the CODEC 4234, the processor 4206, and/or the processors 4210), cause the computer perform at least a portion of the methods described herein.

In a particular aspect, the device 4200 may be included in a system-in-package or system-on-chip device (e.g., a mobile station modem (MSM)) 4222. In a particular aspect, the processor 4206, the processors 4210, the display controller 4226, the memory 4224, the CODEC 4234, the receiver 3293, the buffer 3218, and the wireless controller 4240 are included in a system-in-package or the system-on-chip device 4222. In a particular aspect, an input device 4230, such as a touchscreen and/or keypad, and a power supply 4244 are coupled to the system-on-chip device 4222. Moreover, in a particular aspect, as illustrated in FIG. 42, the display 3288, the input device 4230, the speaker 4236, the one or more microphones 4246, the antenna 4242, and the power supply 4244 are external to the system-on-chip device 4222. However, each of the display 3288, the input device 4230, the speaker 4236, the one or more microphones 4246, the antenna 4242, and the power supply 4244 can be coupled to a component of the system-on-chip device 4222, such as an interface or a controller.

The device 4200 may include a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a decoder system, or any combination thereof.

In an illustrative aspect, the processors 4210 may be operable to perform all or a portion of the methods or operations described with reference to FIGS. 1-41. For example, the one or more microphones 4246 may capture an audio signal (e.g., the audio command signal 132 of FIG. 1). The ADC 4204 may convert the captured audio signal from an analog waveform into a digital waveform comprised of digital audio samples. The processors 4210 may process the digital audio samples. A gain adjuster may adjust the digital audio samples. The echo canceller 4212 may reduce echo that may have been created by an output of the speaker 4236 entering the one or more microphones 4246. The speaker verifier 4220 may receive an output of the echo canceller 4212. The output of the echo canceller 4212 may correspond to the enrollment phrase audio signal 130, the audio command signal 132, the test phrase audio signal 134 of FIG. 1, the input audio signal 2534 of FIG. 25, or the input audio signal 3230 of FIG. 32. The speaker verifier 4220 may generate the validation GUI 126, the test GUI 128, the success GUI 140, the enrollment GUI 184, the liveness test GUI 190, the alternative modality GUI 192, the configuration GUI 194, one or more of the GUIs 2524 of FIG. 25, the first GUI 3210, the second GUI 3226, the GUI 3236 of FIG. 32, or a combination thereof, as described with reference to FIGS. 1-41.

In conjunction with the described aspects, an apparatus is disclosed that includes means for determining whether an input audio signal satisfies a speaker verification validation criterion. For example, the means for determining may include the speech validator 106 of FIG. 1, the validation module 202 of FIG. 2, the audio signal analyzer 2506 of FIG. 25, the speech validator 3206 of FIG. 32, one or more devices configured to determine whether the input audio signal satisfies the speaker verification validation criterion (e.g., a processor executing instructions at a non-transitory computer readable storage medium), or any combination thereof.

The apparatus also includes means for predicting, in response to determining that the input audio signal fails to satisfy the validation criterion, a success rate associated with the speaker verification based at least in part on one or more characteristics of the input audio signal. For example, the means for predicting may include the speech validator 106 of FIG. 1, the success rate predictor 210 of FIG. 2, the audio signal analyzer 2506 of FIG. 25, the speech validator 3206 of FIG. 32, one or more devices configured to determine predict the success rate (e.g., a processor executing instructions at a non-transitory computer readable storage medium), or any combination thereof.

The apparatus further includes means for presenting a graphical user interface that indicates the predicted success rate. For example, the means for presenting may include the display 3288 of FIG. 32.

Those of skill would further appreciate that the various illustrative logical blocks, configurations, modules, circuits, and algorithm steps described in connection with the aspects disclosed herein may be implemented as electronic hardware, computer software executed by a processing device such as a hardware processor, or combinations of both. Various illustrative components, blocks, configurations, modules, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the aspects disclosed herein may be embodied directly in hardware, in a software module executed by a processor, or in a combination of the two. A software module may reside in a memory device, such as random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). An exemplary memory device is coupled to the processor such that the processor can read information from, and write information to, the memory device. In the alternative, the memory device may be integral to the processor. The processor and the storage medium may reside in an application-specific integrated circuit (ASIC). The ASIC may reside in a computing device or a user terminal. In the alternative, the processor and the storage medium may reside as discrete components in a computing device or a user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
   a memory configured to store a speaker model;
   a receiver configured to receive an input audio signal associated with sound in a sector or in multiple sectors of a region proximate to the receiver, the sound associated with at least one phrase;
   a processor configured to:
      determine a first confidence level associated with a first portion of the input audio signal based on the speaker model, the first portion of the input audio signal corresponding to a first portion of the at least one phrase;
      update the speaker model based on the first portion of the input audio signal; and
      determine a second confidence level associated with a second portion of the input audio signal based on the speaker model, the second portion of the input audio signal corresponding to a second portion of the at least one phrase; and
   a display configured to present a graphical user interface based on analysis performed at the processor, the graphical user interface associated with the first confidence level or associated with the second confidence level and including information associated with a histogram, the histogram configured to indicate, for each sector of the multiple sectors, a detection of sounds or of directional sources of sounds associated with the sector.

2. The device of claim 1, wherein:
   the speaker model corresponds to one of a Gaussian mixture model (GMM), a Deep Neural Network (DNN), or a Support Vector Machine (SVM),
   the detection includes a percentage, and
   the processor is further configured to perform directional analysis to determine a single direction of arrival or a single dominant direction of arrival for the input audio signal.

3. The device of claim 1, wherein the input audio signal is based on a substantially continuous stream of audio frames that includes a first part and a second part corresponding to the first portion of the input audio signal and the second portion of the input audio signal, respectively, and wherein the processor is further configured to:
   extract features of the first portion of the input audio signal; and
   add the features of the first portion of the input audio signal to model data of the speaker model to update the speaker model.

4. The device of claim 1, wherein:
   the at least one phrase comprises multiple words, a word, or a portion of a word captured from a user utterance,
   the second confidence level is greater than the first confidence level,
   the analysis includes a directional analysis performed on frames of the input audio signal, and
   the histogram indicates results of the directional analysis.

5. The device of claim 1, wherein the processor is further configured to:
   determine a plurality of directions of arrival associated with the input audio signal;
   determine that the plurality of directions of arrival includes a single dominant direction of arrival; and
   in response to determining that the plurality of directions of arrival includes the single dominant direction of arrival, extract a first audio signal from the input audio signal based on the single dominant direction of arrival, wherein the first confidence level is determined based on a first portion of the first audio signal and the second confidence level is determined based on a second portion of the first audio signal.

6. The device of claim 5, wherein the first audio signal corresponds to a dominant audio signal, and wherein the processor is further configured to:

determine whether the first audio signal corresponds to standard speech or to non-standard speech;

extract features of the first audio signal;

determine a reverberation time based on the extracted features; and in response to a determination that the first audio signal corresponds to standard speech, select the speaker model from a plurality of speaker models based at least in part on the reverberation time.

7. The device of claim 6, wherein the input audio signal is received during a voice call, and wherein the processor is further configured to:

update the speaker model based on the first audio signal by adding the features to model data of the speaker model;

determine a noise level associated with the first audio signal; and determine a signal-to-noise ratio associated with the first audio signal, wherein the speaker model is selected further based on determining that the speaker model is associated with the signal-to-noise ratio, the noise level, or both.

8. The device of claim 6, wherein the speaker model is associated with a first user, wherein a second speaker model is associated with a second user, and wherein the processor is further configured to:

determine that the plurality of directions of arrival includes a second direction of arrival;

extract a second audio signal from the input audio signal based on the second direction of arrival;

determine that the second audio signal satisfies one or more classification criteria;

determine a second reverberation time corresponding to the second audio signal;

select a second speaker model from the plurality of speaker models based at least in part on the second reverberation time; and update the second speaker model based on the second audio signal.

9. The device of claim 8, wherein the processor is further configured to:

determine a first particular confidence level associated with the first audio signal based on the speaker model;

determine a second particular confidence level associated with the second audio signal based on the second speaker model; and generate a first graphical user interface that indicates the first particular confidence level and the second particular confidence level.

10. The device of claim 8, wherein the processor is further configured to:

determine a plurality of confidence levels associated with the first audio signal based on the plurality of speaker models, wherein a first particular confidence level associated with the first audio signal is determined based on the speaker model, and wherein the speaker model is selected based on determining that the first particular confidence level indicates a highest confidence level of the plurality of confidence levels; and generate a first graphical user interface that indicates the first particular confidence level.

11. The device of claim 10, wherein the processor is further configured to generate a second graphical user interface that indicates whether the first particular confidence level satisfies each of a plurality of confidence level thresholds associated with a plurality of applications.

12. The device of claim 1, wherein:

the memory is further configured to store a plurality of speaker models including the speaker model, the first portion of the input audio signal and the second portion of the input audio signal correspond to a particular time period during which the input audio signal includes a single dominant audio signal, and the processor is further configured to classify the input audio signal as the single dominant audio signal in response to determining that the input audio signal corresponds to a single direction of arrival or a single dominant direction of arrival.

13. The device of claim 12, wherein the processor is further configured to:

buffer input frames of the first portion of the input audio signal and of the second portion of the input audio signal into a data buffer;

discard old frames from the data buffer concurrently with storage of the input frames at the data buffer;

determine a plurality of confidence levels associated with the first portion of a first audio signal based on a plurality of speaker models;

determine that the first confidence level is a highest confidence level of the plurality of confidence levels; and select the speaker model.

14. The device of claim 1, wherein the second portion of the input audio signal corresponds to second speech of audio that is captured immediately subsequent to capture of first speech of audio that corresponds to the first portion of the input audio signal.

15. The device of claim 14, wherein the processor is further configured to:

extract a second audio signal from the input audio signal;

determine a third confidence level associated with the second audio signal based on a second speaker model;

extract a first audio signal from the input audio signal;

update the speaker model based on the first audio signal; and update the second speaker model based on the second audio signal.

16. The device of claim 1, wherein the processor is further configured to determine whether the input audio signal corresponds to live speech based at least in part on a range of spectrum parameters of the input audio signal.

* * * * *